(12) United States Patent
Kunishige et al.

(10) Patent No.: US 10,904,419 B2
(45) Date of Patent: Jan. 26, 2021

(54) IMAGE MAGNIFICATION RATIO INDICATING DEVICE AND IMAGE PICKUP APPARATUS

(71) Applicant: Olympus Corporation, Hachioji (JP)

(72) Inventors: Keiji Kunishige, Hachioji (JP); Masashi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/435,439

(22) Filed: Jun. 7, 2019

(65) Prior Publication Data
US 2020/0014832 A1    Jan. 9, 2020

(30) Foreign Application Priority Data

Jul. 4, 2018   (JP) ................... 2018-127776

(51) Int. Cl.
*H04N 5/225*    (2006.01)
*H04N 5/232*    (2006.01)

(52) U.S. Cl.
CPC ....... *H04N 5/2259* (2013.01); *H04N 5/23212* (2013.01); *H04N 5/23216* (2013.01); *H04N 5/23245* (2013.01); *H04N 5/23296* (2013.01); *H04N 5/232933* (2018.08); *H04N 5/232941* (2018.08)

(58) Field of Classification Search
CPC ........... H04N 5/2259; H04N 5/232941; H04N 5/232933; H04N 5/23296; H04N 5/23216; H04N 5/23245; H04N 5/23212; H04N 5/232935; H04N 5/232939; H04N 5/232; H04N 1/393; G09G 5/00; G09G 5/12

See application file for complete search history.

(56) References Cited

U.S. PATENT DOCUMENTS

| | | | |
|---|---|---|---|
| 2005/0189501 A1* | 9/2005 | Sato | H01J 37/28 250/492.22 |
| 2009/0153649 A1* | 6/2009 | Hirooka | H04N 5/23212 348/47 |
| 2014/0015943 A1* | 1/2014 | Dixon | H04N 1/00037 348/61 |
| 2017/0295286 A1* | 10/2017 | Haneda | H04N 5/2628 |

FOREIGN PATENT DOCUMENTS

JP    3534101 B    3/2004

* cited by examiner

*Primary Examiner* — Yogesh K Aggarwal
(74) *Attorney, Agent, or Firm* — John C. Pokotylo; Pokotylo Patent Services

(57) ABSTRACT

An image magnification ratio indicating device of the invention includes a processor having hardware, and the processor is configured to: magnify, or not, an image at a predetermined magnification ratio and transmit the image; switch an image transmission destination; instruct change of an image as a transmission target, and change a first magnification ratio to a second magnification ratio according to the change of the image as the transmission target or the switching of the image transmission destination and indicate the magnification ratio.

18 Claims, 30 Drawing Sheets

FIG. 32

| | IMAGE PIXEL SIZE | | BACK MONITOR (3:2) | | EVF (4:3) | | REPRODUCTION MAGNIFICATION RATIO SERIES FOR DOT-BY-DOT PIXEL MAGNIFICATION 2x 3x 5x 7x 10x 14x | |
|---|---|---|---|---|---|---|---|---|
| | | | LONG SIDE | SHORT SIDE | LONG SIDE | SHORT SIDE | BACK MONITOR (3:2) | EVF (4:3) |
| | LONG SIDE A | SHORT SIDE B | C 720 | D 480 | E 1024 | F 768 | | |
| | | | MAGNIFICATION RATIO CALCULATION FOR DOT-BY-DOT PIXEL MAGNIFICATION | | | | | |
| | | | LONG SIDE A/C | SHORT SIDE B/D | LONG SIDE A/E | SHORT SIDE B/F | | |
| Large | 5184 | 3888 | 7.2 | 8.1 | 5.0625 | 5.0625 | 7x | 5x |
| Midlle | 3200 | 2400 | 4.44444 | 5 | 3.125 | 3.125 | 5x | 3x |
| | 2560 | 1920 | 3.55556 | 4 | 2.5 | 2.5 | 3x | 2x |
| | 1920 | 1440 | 2.66667 | 3 | 1.875 | 1.875 | 3x | 2x |
| | 1600 | 1200 | 2.22222 | 2.5 | 1.5625 | 1.5625 | 3x | 2x |
| Small | 1280 | 960 | 1.77778 | 2 | 1.25 | 1.25 | 2x | 2x (※1) |
| | 1024 | 768 | 1.42222 | 1.6 | 1 | 1 | 2x | 2x (※1) |
| NORMAL RAW (SCREEN NAIL) | 3200 | 2400 | 4.44444 | 5 | 3.125 | 3.125 | 5x | 3x |
| HIGH RESOLUTION JPEG (50M) | 8160 | 6120 | 11.3333 | 12.75 | 7.96875 | 7.96875 | 14x | 7x |
| HIGH RESOLUTION JPEG (25M) | 5760 | 4360 | 8 | 9.08333 | 5.625 | 5.67708 | 10x | 5x |
| HIGH RESOLUTION RAW (SCREEN NAIL) | 3200 | 2400 | 4.44444 | 5 | 3.125 | 3.125 | 5x | 3x |
| PANORAMA (RIGHT-AND-LEFT SWING) | | 2400 | | 5 | | 3.125 | 5x | 3x |
| PANORAMA (UP-AND-DOWN SWING) | 3200 | | 6.66667 | | 4.16667 | | 7x | 5x |

(※1) EXCEPTION SETTINGS BASED ON LOWEST MAGNIFICATION RATIO RESTRICTION

IMAGE MAGNIFICATION RATIO INDICATING DEVICE AND IMAGE PICKUP APPARATUS

CROSS REFERENCE TO RELATED APPLICATION

This application claims the benefit of Japanese Application No. 2018-127776 filed in Japan on Jul. 4, 2018, the contents of which are incorporated herein by this reference.

BACKGROUND OF THE INVENTION

1. Field of the Invention

The present invention relates to an image magnification ratio indicating device for indicating a magnification ratio of an image based on acquired image data according to a situation (the number of pixels of image data or the number of display pixels of a display device on which the image will be displayed) when the image based on the acquired image data is magnified and displayed, and an image pickup apparatus having the image magnification ratio indicating device.

2. Description of the Related Art

Conventionally, an image pickup apparatus such as a digital camera configured to have a live view function, a recording function and a display function has been generally practically used and widely spread. In the live view function, an optical image formed by an image pickup optical system is sequentially converted into an image signal by using an image pickup device or the like, and images based on the thus-obtained image signals are sequentially and continuously displayed by using a display device. In the recording function, when an image pickup instruction signal is generated, an image signal at the time of the generation of the instruction signal or an image signal over a predetermined time period before or after the generation of the instruction signal is acquired, and the image signal is converted into image data for recording to be recorded in a recording medium. The display function can display on the display device an image based on image data which have been recorded in the recording medium when a display instruction signal is generated.

This type of conventional image pickup apparatus may be used, for example, in such a manner that a reproducing (displaying) operation is executed immediately after execution of an image pickup operation to check a just-recorded image (for example, check an image pickup result such as composition, focus or degree of blur, exposure, and white balance).

Under such circumstances, for example, Japanese Patent No. 3534101 and the like have proposed various kinds of image pickup apparatus which are enabled to magnify and display an image of a predetermined area (for example, an AF area set under an image pickup operation or a predetermined area containing an arbitrarily specified position) at a pre-specified magnification ratio or a dot-by-dot pixel magnification or a magnification ratio near to the dot-by-dot pixel magnification only by performing a single operation of a predetermined operation member when an image is being displayed on a display panel of a display device (with a so-called one-push dot-by-dot pixel magnification function), and these image pickup apparatuses have been practically used.

Here, the dot-by-dot pixel magnification display is one of display modes when an image based on image data is reproduced (displayed) in a display area of a display device. The dot-by-dot pixel magnification display is a display mode of a method (called dot-by-dot or the like) for displaying image data, making one pixel of the image data correspond to one dot of the display device.

The "magnification ratio" means an "enlargement ratio" for a state where an entire image is displayed over an entire area of a reproduction area in a reproduction device.

That is, "to magnify and display an image" means, for example, "to enlarge a partial area of an image and display the enlarged partial area by using an entire area of a predetermined display area".

A case where "an image is not magnified" corresponds to a mode in which an entire image of image data is displayed by using the entire area of the display area of the reproduction device, which corresponds to a display mode called "one frame display".

The image pickup apparatus disclosed in Japanese Patent No. 3534101 or the like is configured to be capable of magnifying and displaying an image based on image data acquired through an image pickup operation at a magnification ratio for dot-by-dot pixel magnification corresponding to the number of display pixels of the display panel of the display device by a single operation of a predetermined operation member.

Furthermore, the image pickup apparatus disclosed in Japanese Patent No. 3534101 or the like is configured to be capable of changing and setting a pickup image size (the numbers of pixels in vertical and horizontal directions). Accordingly, the image pickup apparatus is configured so that when magnifying display is performed immediately after an image pickup operation, the magnifying display is performed at a magnification ratio preset according to a set picked up image size.

In this type of image pickup apparatus, apparatuses each having a plurality of (for example, two) display devices at the same time have recently been put to practical use and have been becoming popular in general.

For example, a display device called a back-side monitor which is fixed or movably provided to a back-side portion of an image pickup apparatus and has a relatively large-size (e.g., about 3-inch type) display panel is known as one style of a display device in the above type of image pickup apparatus. A display device called an electronic viewfinder (EVF), for example, which has a relatively small-size (for example, about 0.5-inch type) display panel and is configured so as to look into the display panel through a magnifying optical system is known as another style of a display device in the above type of image pickup apparatus.

Image pickup apparatuses having such styles, that is, plural (for example, two types of) display devices are configured so that a live view image or a recorded image can be displayed in substantially the same style even when any of the display devices is used. In a usual case, either one of these two types of display devices is switched and used as necessary.

SUMMARY OF THE INVENTION

In order to attain the above object, an image magnification ratio indicating device according to a first aspect of the present invention includes a processor having hardware, and the processor is configured to magnify, or not, an image at a predetermined magnification ratio and transmit the image; switch an image transmission destination; instruct change of an image as a transmission target; and change a first magnification ratio to a second magnification ratio according to the change of the image as the transmission target or the switching of the image transmission destination and indicate the magnification ratio.

An image pickup apparatus according to an aspect of the present invention includes: an image magnification ratio indicating device including a processor having hardware, the processor being configured to: magnify, or not, an image at a predetermined magnification ratio and transmit the image; switch an image transmission destination; instruct change of an image as a transmission target; and change a first magnification ratio to a second magnification ratio according to the change of the image as the transmission target or the switching of the image transmission destination and indicate the magnification ratio; an acquiring device configured to acquire an image; a plurality of display devices that are different in number of display pixels from one another and receive an image transmitted from the processor to display the image; and a magnification ratio changing operation member configured to indicate the second magnification ratio.

An image magnification ratio indicating device according to a second aspect of the present invention includes a processor having hardware, and the processor is configured to: magnify, or not, an image at a predetermined magnification ratio and transmit the image; switch an image transmission destination; instruct change of an image as a transmission target; and change a first magnification ratio to a second magnification ratio according to the change of the image as the transmission target and indicate the magnification ratio.

An image magnification ratio indicating device according to a third aspect of the present invention includes a processor having hardware, and the processor is configured to: acquire a plurality of images having different numbers of pixels from one another as a set of images; magnify, or not, an image and transmit the image; switch an image transmission destination; instruct change of a transmission image; and change a first magnification ratio to a second magnification ratio according to an image that can be displayed and has a largest number of pixels among the set of images and the change of the transmission image or the switching of the image transmission destination and indicate the magnification ratio.

An image magnification ratio indicating device according to a fourth aspect of the present invention includes a processor having hardware, and the processor is configured to: acquire a movie; acquire an image; magnify, or not, an image and transmit the image; switch a transmission destination to which at least one of the movie and the image is transmitted; and change a first magnification ratio to a second magnification ratio and indicate a magnification ratio to one transmission destination while stopping transmission of the image and transmitting the movie to another transmission destination, in response to the switching of the transmission destination.

The advantage of the invention will become further obvious by the following detailed description.

BRIEF DESCRIPTION OF THE DRAWINGS

FIG. 32 is a table showing calculation values of magnification ratio values when magnifying display is performed under dot-by-dot pixel magnification;

DETAILED DESCRIPTION OF THE PREFERRED EMBODIMENT(S)

Figure 1:
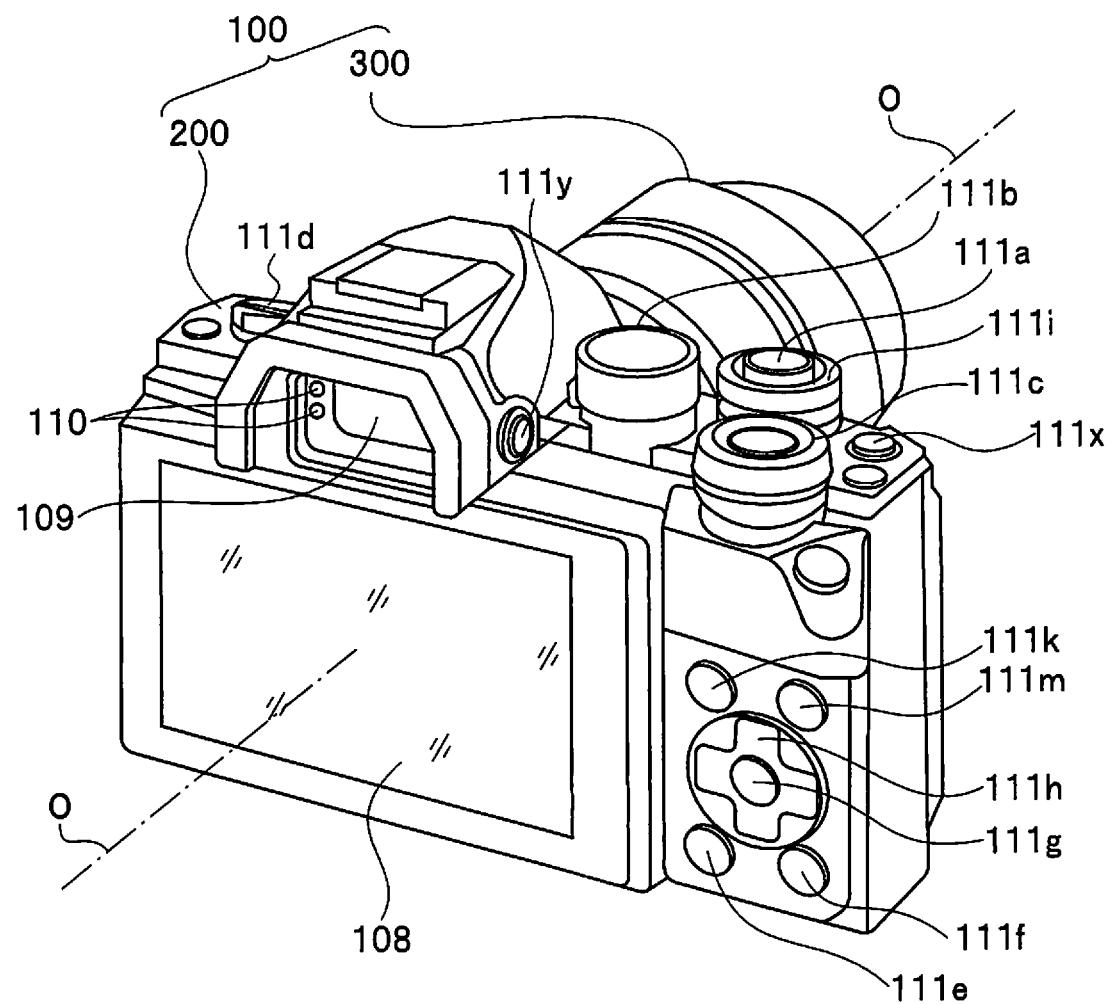
FIG. 1 is an external appearance perspective view which mainly shows an external appearance of a back side of an image pickup apparatus including an image magnification ratio indicating device according to an embodiment of the present invention.

Hereinafter, the present invention will be described with an illustrated embodiment. Each figure used with respect to the following description is schematically shown and in order to show respective components with sizes which make the components recognizable on the figures, respective members may be shown so that dimensional relationships, scales, and the like of the respective members may be made different among the components. Accordingly, the present invention is not limited only to the illustrated styles with respect to the numbers of respective components shown in each figure, the shapes of the respective components, the ratio of the sizes of the respective components, the relative positional relationship of the respective components, etc.

An embodiment of the present invention shows an example in which an image magnification ratio indicating device of the present invention is applied to an image pickup apparatus (specifically, for example, a digital camera) which is configured to include, for example, plural image display devices such as a liquid crystal display (LCD) and an organic electroluminescence (organic EL; OEL) display. The plural image display devices successively subject an optical image formed by, for example, an image pickup optical system to photoelectric conversion by using a photoelectric conversion device or the like (hereinafter referred to as image pickup device) such as a CCD (charge coupled device) image sensor or a CMOS (complementary metal oxide semiconductor) type image sensor, record into a storage medium a thus-obtained image signal as image data having a predetermined format (for example, digital image data representing a still image or a movie), and display a still image or a movie (video) based on the digital image data recorded in the storage medium.

The image magnification ratio indicating device of the present invention is a device for indicating a magnification ratio of an image in accordance with various settings when the image is magnified and displayed by switching plural display devices.

A so-called lens-interchangeable type image pickup apparatus, a style of which is configured so that a lens barrel unit is freely detachably mounted on a main body of the image pickup apparatus, is exemplified in the embodiment described below. However, the style of the image pickup apparatus to which the present invention can be applied is not limited to the lens-interchangeable type apparatus. For example, the present invention can be similarly applied to a so-called lens-integrated type image pickup apparatus, a style of which is configured so that a lens barrel unit is integrally fixed to the main body of the image pickup apparatus.

In the embodiment of the present invention, respective surfaces of the image pickup apparatus are defined as follows. A surface which faces an object when the image pickup apparatus is used is defined as a front surface. A surface which faces a user when the image pickup apparatus is used is defined as a back surface. A surface on which a shutter release button out of plural operation members provided to the image pickup apparatus is arranged is defined as a top surface. A surface opposed to the top surface of the image pickup apparatus is defined as a bottom surface. Surfaces that are arranged on right and left sides when the image pickup apparatus is viewed from an object side to the front surface of the image pickup apparatus are defined as a right-side surface and a left-side surface. In this case, distinction between "right" and "left" is made by defining, as "right", the right-side as facing the front surface of the image pickup apparatus and defining, as "left", the left-side as facing the front surface of the image pickup apparatus.

In the embodiment of the present invention, an optical axis of the image pickup optical system is represented by reference sign O. In a direction along the optical axis O, a side facing the image pickup optical system provided on the front surface of the image pickup apparatus (a side on which the object exists) is defined as a front side. In addition, in the direction along the optical axis O, a side on which a light flux passing through the image pickup optical system is emitted (a side on which a light-receiving surface (image forming surface) of the image pickup apparatus exists) and a side opposed to a display surface of a display device provided to the back surface of the image pickup apparatus is defined as a back side.

In the following description, it is assumed that a term of "reproduction" when image data are dealt with is synonymous with "display". That is, "reproducing" an image based on image data by using the display device is the same as "displaying" the same image on a display panel of the display device. Furthermore, it is assumed that "reproduction device" and "display device" are synonymous with each other and represent the same device.

Embodiment

Figure 2:
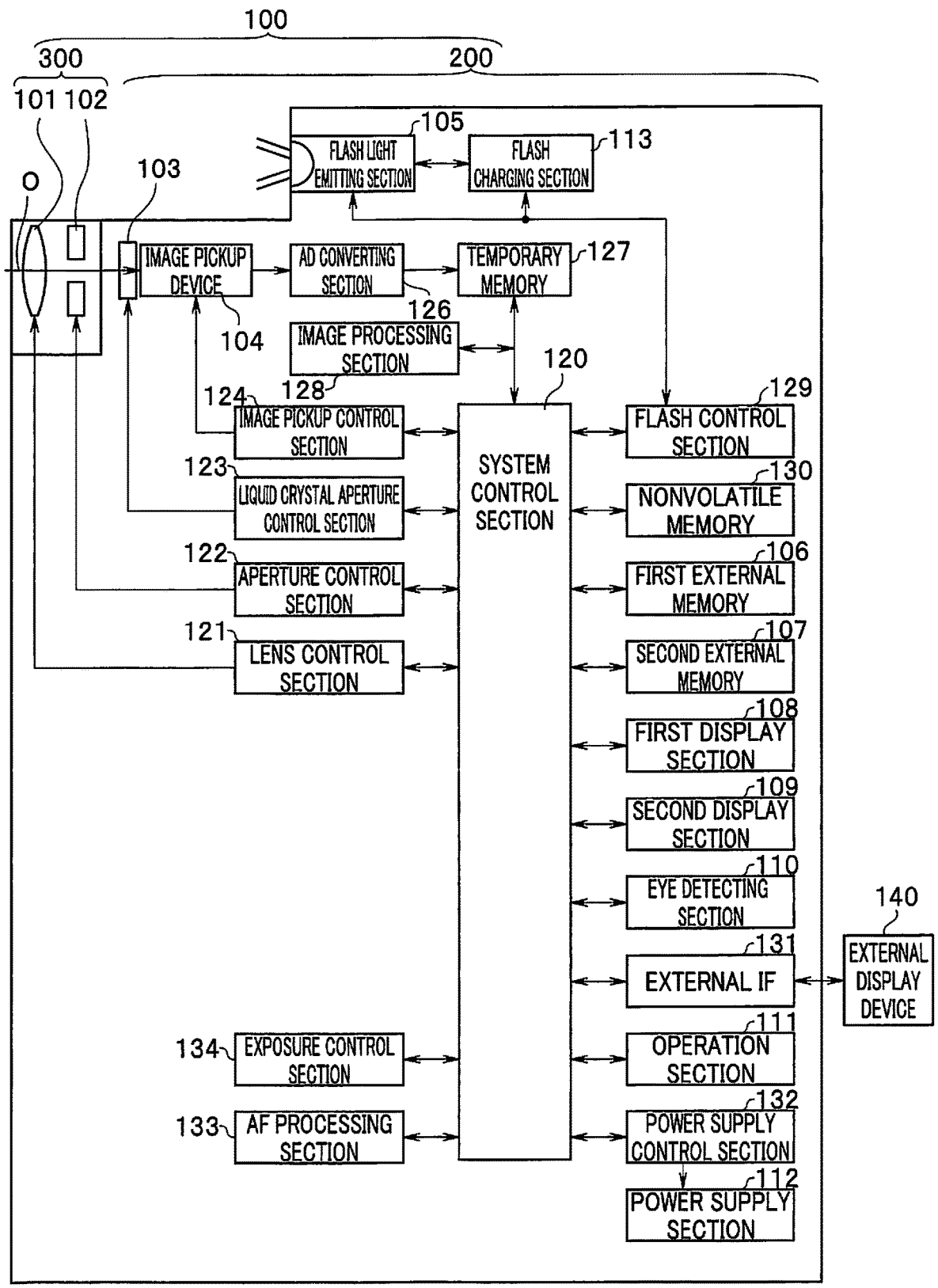
FIG. 2 is a block configuration diagram schematically showing an internal configuration of the image pickup apparatus of FIG. 1.

FIG. 1 and FIG. 2 are diagrams showing the image pickup apparatus including the image magnification ratio indicating device according to the embodiment of the present invention. FIG. 1 is an external appearance perspective view mainly showing an external appearance of the back side of the image pickup apparatus of the present embodiment. FIG. 2 is a block configuration diagram schematically showing an internal configuration of the image pickup apparatus of the present embodiment.

As shown in FIG. 1 and FIG. 2, the image pickup apparatus 100 of the present embodiment is mainly configured by a body 200 and a lens barrel 300.

The body 200 is a box-shaped body which has a substantially rectangular shape as a whole and has an internal space. Various kinds of component units are accommodated in the internal space of the body 200. In addition, plural operation members are provided on the outer surface of the body 200.

A back monitor 108 which is a first display section is provided on the back surface of the body 200. An electronic viewfinder 109 (hereinafter abbreviated as EVF 109) which is a second display section is arranged at a substantially center portion of the top surface of the body 200. In the image pickup apparatus 100 of the present embodiment, plural (two) display devices (108, 109) are devices which have different numbers of display pixels from each other, receive an image transmitted from an image transmitting section (described later) and display the image.

The lens barrel 300 is freely detachably provided on the front surface of the body 200.

Various styles of operation members such as a push button type operation member and a rotation operation type operation member are applied as plural operation members provided on the outer surface of the body 200. Specifically, for example, a shutter release button 111a, an operation mode switching dial 111b, plural operation dials 111c and 111i, a power supply switch 111d, a magnifying button 111x and the like are provided on the top surface of the body 200. An erasing button 111e, a reproducing button 111f, a check (OK) button 111g, a cross button 111h, a menu button 111k, an information display (INFO) button 111m and the like are provided on the back surface of the body 200. A monitor switching button 111y is provided in the vicinity of EVF 109 (second display section) provided on the top surface of the body 200. Although not specifically shown, a touch panel (not shown) provided on the surface of the display panel of the back monitor 108 is also included as an operation member.

These plural operation members have configurations and functions which are substantially the same as the configurations and functions of operation members applied to image pickup apparatuses which have been conventionally generally used. Accordingly, detailed description of each operation member is omitted. The operation members which are particularly related to the present invention among these plural operation members are the magnifying button 111x, the monitor switching button 111y, the reproducing button 111f, the cross button 111h, and the like.

The magnifying button 111x is an operation member configured to perform a magnifying operation, etc. on an image being displayed by operating the magnifying button 111x when the image is being displayed by using the display devices (108, 109).

The monitor switching button 111y is a switching operation member configured to perform switching between the two display devices (108, 109). When the monitor switching button 111y is operated, a changeover switch (not shown) acts to generate a monitor switching instruction signal, and the monitor switching instruction signal is transmitted to a system control section 120. Upon receiving the monitor switching instruction signal, the system control section 120 performs switching control of the two display devices, whereby the monitor switching button 111y and the system control section 120 function as an image transmission destination switching section configured to perform control to switch an image transmission destination (the reproduction device, the display device).

The reproducing button 111f is an operation member configured to perform switching between the image pickup mode and the reproduction mode out of the operation modes of the image pickup apparatus 100. For example, when the reproducing button 111f is operated while the image pickup apparatus 100 is operated in the image pickup mode, the image pickup mode is switched to the reproduction mode. When the reproducing button 111f is operated while the image pickup apparatus 100 is operated in the reproduction mode, the reproduction mode is switched to the image pickup mode.

The cross button 111h has four button portions of up, down, right and left, and for example, the right and left buttons are used for a display image changing operation in the reproduction mode (frame advance operation and frame return operation). During image magnifying display in the reproduction mode, the up, down, right and left buttons function as operation members configured to move a magnified frame right and left. In the setting mode, the up, down, right and left buttons are used as operation members during a shift operation and a selecting operation among items on a menu. The cross button 111h has other uses, but detailed description of the other uses is omitted.

As described above, the EVF 109 which is the second display section is provided at a substantially center portion of the top surface of the body 200. In this case, the display panel (not shown) of the EVF 109 is arranged inside the body 200 so as to face the back side. Therefore, the EVF 109 is configured to have an opening facing the back side of the body 200. This opening serves as a viewing window for looking into the internal display panel (not shown). An eye sensor 110 which is an eye detecting section is provided in the vicinity of the viewing window.

The eye sensor 110 is a sensor device including an infrared light projecting section and an infrared light receiving section. The eye sensor 110 is a sensor configured to receive by the infrared light receiving section the infrared light projected from the infrared light projecting section to detect whether an object approaches to the vicinity of the eye sensor 110, that is, the vicinity of the EVF 109. A detection signal of the eye sensor 110 is used to control the switching between the EVF 109 (the second display device) and the back monitor 108 (first display section).

Specifically, the eye sensor 110 is set to an ON state, for example, when a user approaches his/her eye (face) to the viewing window (opening) to use the EVF 109 in a state where the image pickup apparatus 100 is activated.

For example, when the back monitor 108 is being used just before the above state, upon receiving the detection signal of the eye sensor 110 at this time, the system control section 120 (see FIG. 2 described later) of the image pickup apparatus 100 sets the use state of the back monitor 108 to OFF, and simultaneously turns on the EVF 109. That is, the system control section 120 performs the control of switching the display section to be used.

When the user's eye (face) leaves the viewing window (opening) from the state where the user looks into the EVF 109, the eye sensor 110 is set to OFF state. As a result, the system control section 120 of the image pickup apparatus 100 sets the use state of the EVF 109 to OFF, and simultaneously turns on the back monitor 108 to perform the control of switching the display section to be used.

As described above, the eye sensor 110 and the system control section 120 function as an image transmission destination switching section configured to control switching the image transmission destination (reproduction device, display device).

The lens barrel 300 is a component unit that is provided on the front surface of the body 200 and forms an optical image of an object as an image pickup target on a light receiving surface of an image pickup device 104 (see FIG. 2 described later). The lens barrel 300 is a cylindrical box-shaped body which has a substantially cylindrical shape as a whole and has an internal space. Various component units are accommodated in the internal space of the lens barrel 300. For example, as shown in FIG. 2, not only the image pickup optical system 101 including an optical lens and the like, a light amount adjusting device (aperture device) 102, etc., but also a driving mechanism configured to move a part of the image pickup optical system 101 in a direction along an optical axis O, etc. are provided in the lens barrel 300. Note that the lens barrel 300 has a configuration which is substantially the same as the configuration of a lens barrel which has been conventionally generally used, and thus detailed description of the lens barrel is omitted.

Next, the internal configuration (mainly electrical configuration) of the body 200 in the image pickup apparatus 100 of the present embodiment will be briefly described below with reference to FIG. 2.

The body 200 of the image pickup apparatus 100 includes a liquid crystal aperture device 103, an image pickup device 104, a flash light emitting section 105, a first external memory 106 (first recording section), a second external memory 107 (second recording section), a back monitor 108 which is a first display section, an EVF 109 which is a second display section, an eye sensor 110 which is an eye detecting section, an operation section 111, a power supply section 112, a flash charging section 113, and the like.

The liquid crystal aperture device 103 is a device configured to adjust the amount of light by electrically controlling the light transmittance of the liquid crystal panel. Therefore, the liquid crystal aperture device 103 is arranged on the optical axis of the image pickup optical system 101 of the lens barrel 300, on a back side of the lens barrel 300, and on a front side of the image pickup device 104.

The image pickup device 104 is a photoelectric conversion device configured to receive an optical image formed by the image pickup optical system 101 and perform photoelectric conversion processing on the optical image to generate an image signal. The image signal generated by the image pickup device 104 is passed through an AD converting section 126, transmitted to a temporary memory 127, and temporarily stored in a temporary memory 127 as described later. As described above, the image pickup device 104 functions as an acquiring section configured to acquire an image of an object.

The flash light emitting section 105 is a flash light emitting device including a flash light emitting portion configured to emit illumination light to an object.

The first external memory 106 and the second external memory 107 are external storage media configured to record image data for recording in a predetermined format which are created based on the image signal generated by the image pickup device 104. The storage medium is configured to be freely detachably attached to the image pickup apparatus 100, and a card-type storage medium called a memory card or the like which has a semiconductor memory or the like inside and is formed in a card-like shape as a whole is applied. The image pickup apparatus of the present embodiment is configured so that two card slots of substantially the same specification are provided, and two external memories can be mounted in the two card slots at the same time (a so-called double slot structure).

In a case where the image pickup apparatus 100 is used while memory cards (storage media) adapted to the two card slots respectively are mounted, for example, when an image quality mode is set to "RAW+JPEG" mode, JPEG image data can be recorded in the first external memory 106 as one external memory while RAW image data are recorded in the second external memory 107 as the other external memory (according to setting). The same contents can be recorded in the memory cards (storage media) mounted in the two card slots, respectively.

According to a user's operation, image data stored in the first external memory 106 and the second external memory 107 are read out into the temporary memory 127, etc. as necessary, converted to image signals in predetermined formats, and then transmitted to, for example, the display devices (108, 109) to display images under the control of the system control section 120. In this case, the first external memory 106, the second external memory 107, and the system control section 120 function as acquiring sections for acquiring images. Note that although not shown in the figures, in the image pickup apparatus 100 according to the present embodiment, for example, a communication section configured to communicate with other external equipment and acquire image data may be provided as another configuration example of the acquiring section for acquiring an image.

The back monitor 108 which is the first display section is a display device fixed or provided movably to, for example, the back-side portion of the image pickup apparatus 100. The back monitor 108 is a display device including a relatively large-size display panel of, for example, about 3-inch type. The back monitor 108 can perform live view image display for continuously displaying images based on image signals acquired by the image pickup device 104, and also display images based on image data recorded in the storage medium. When the above image display is performed, the back monitor 108 can simultaneously display various kinds of information appended to image data of images being displayed with characters, icons or the like in various styles like the characters, the icons or the like are superimposed on or arranged beside the displayed images. In addition to these display styles, the back monitor 108 can perform so-called menu display in which various items for performing various settings of the image pickup apparatus 100 are displayed in a list format or the like.

The EVF 109 which is the second display section is a display device provided, for example, at a substantially center portion or the like of the top surface of the body 200 of the image pickup apparatus 100. The EVF 109 is a display device which has a relatively small-size display panel of about 0.5-inch type, for example, and is configured to be looked into through a magnifying optical system (not shown).

Note that an example in which the EVF 109 is provided at the substantially center portion or the like of the top surface of the image pickup apparatus 100 is shown in the present embodiment, but the present embodiment is not limited to this example. The EVF 109 may be provided, for example, at a corner on the left side of the top surface of the body 200 of the image pickup apparatus 100.

As described above, the eye sensor 110 which is the eye detecting section is a sensor configured to detect the proximity of a user's eye to the EVF 109. Upon receiving a detection signal of the eye sensor 110, the system control section 120 (described later) of the image pickup apparatus 100 performs ON/OFF control of the back monitor 108 and the EVF 109 to switch the display device to be used.

The operation section 111 includes electrical parts and electrical circuits corresponding to the above-described plural operation members (see FIG. 1; 111a, 111b, 111c, 111i, 111d, 111x, the erasing button 111e, the reproducing button 111f, the check (OK) buttons 111g, 111h, 111k, 111m, 111y, etc.), respectively. An operation signal outputted from the operation section 111 is outputted to the system control section 120 described later. Upon receiving the operation signal, the system control section 120 generates a corresponding control signal.

The power supply section 112 is a component unit configured to receive electric power supplied from a battery or an external commercial power supply by cable connection, and supply necessary electric power to each component unit of the image pickup apparatus 100 as necessary under the control of a power supply control section 132 described later.

The flash charging section 113 is a power supply section configured to supply electric power to the flash light emitting section 105, and is a component unit including, for example, a secondary battery (battery) such as a dry battery or a lithium battery.

Electronic circuit boards (plural; not shown) on which various electronic circuits configured to control the above-described various component units respectively are mounted are provided in the body 200. Various control circuits or processing circuits (for example, the system control section 120, the lens control section 121, the aperture control section 122, the liquid crystal aperture control section 123, the image pickup control section 124, an AD converting section 126, the temporary memory 127, an image processing section 128, a flash control section 129, a nonvolatile memory 130, an external interface (IF) 131, the power supply control section 132, an AF processing section 133, an exposure control section 134, and the like) are mounted on the plural electronic circuit boards.

The system control section 120 is a control circuit configured to collectively control the entire system of the image pickup apparatus 100 and also control each of the various component units of the image pickup apparatus 100 at an appropriate predetermined timing. The system control section 120 is configured by a control circuit including a processor (processing device) using electronic components such as CPU (central processing unit) and ASIC (application specific integrated circuit), etc. The system control section 120 executes various kinds of control by operating according to programs pre-stored in a nonvolatile memory 130 described later, and the like. The system control section 120 controls, for example, the first external memory 106, the second external memory 107, the back monitor 108, the EVF 109, the eye sensor 110, the operation section 111, and the like.

The lens control section 121 is a control circuit configured to control driving of the aperture control section 122. The liquid crystal aperture control section 123 is a control circuit configured to control the liquid crystal aperture device 103. The image pickup control section 124 is a control circuit configured to control the image pickup device 104. The flash control section 129 is a control circuit configured to control the flash light emitting section 105 and the flash charging section 125.

The AD converting section 126 is a signal conversion circuit having a function of receiving an image signal (analog signal) generated by the image pickup device 104 and outputted from the image pickup device 104, and converting the image signal into a digital signal.

The temporary memory 127 is a semiconductor memory configured to temporarily store the digital image signal generated by the AD converting section 126. Furthermore, the temporary memory 127 is used as a temporary storage area for temporarily storing image data read out from the first external memory 106 and the second external memory 107 when an operation instruction for causing the image pickup apparatus 100 to operate in the reproduction mode is given.

The image processing section 128 is a processing circuit configured to perform various kinds of image signal processing based on the digital image signal temporarily stored in the temporary memory 127. The image data which have been subjected to various kinds of image signal processing in the image processing section 128 are transmitted to the back monitor 108 or the EVF 109, the first external memory 106, the second external memory 107, and the like. In this case, when the image data are transmitted from the image processing section 128 to the back monitor 108 or the EVF 109, for example, the image data may be subjected to image magnification processing or the like. Accordingly, at this time, the image processing section 128 functions as the image transmitting section configured to transmit an image with magnifying the image at a predetermined magnification ratio or without magnifying the image.

The nonvolatile memory 130 is a memory section configured to pre-store, for example, various control programs, a menu display program used in the setting mode, etc. and retain various set and specified values and the like by the user. The system control section 120 reads out necessary programs from the nonvolatile memory 130 as necessary.

The external interface (IF) 131 is an interface to which a connection terminal of a connection cable configured to connect the external interface (IF) 131 and an external display device 140 is fitted. The external interface 131 includes a connection terminal conforming to a standard such as HDMI (registered trademark; High Definition Multimedia Interface) or the like, a processing circuit configured to treat a video signal inputted via the connection terminal as necessary, and the like.

The power supply control section 132 is a control circuit configured to control the power supply section 112. The AF processing section 133 is a processing circuit configured to execute predetermined autofocus (AF) processing based on an image signal which is acquired by the image pickup device 104 and has been subjected to various processing, for example. The exposure control section 134 is a processing circuit configured to execute predetermined exposure adjustment processing based on an image signal which is acquired by the image pickup device 104 and has been subjected to various processing, for example. Under the control of the system control section 120, the exposure control section 134 controls the aperture control section 122, the liquid crystal aperture control section 123, the image pickup control section 124, and the like.

Note that these various control circuits and processing circuits have configurations which are substantially the same as the configurations of control circuits and processing circuits applied in image pickup apparatuses that have been conventionally generally used. Accordingly, detailed description on these control circuits and processing circuits is omitted, and only points related to the present invention will be described below in detail.

An operation of the thus-configured image pickup apparatus 100 of the present embodiment will be described below with reference to flowcharts of FIGS. 3 to 31.

Figure 3:
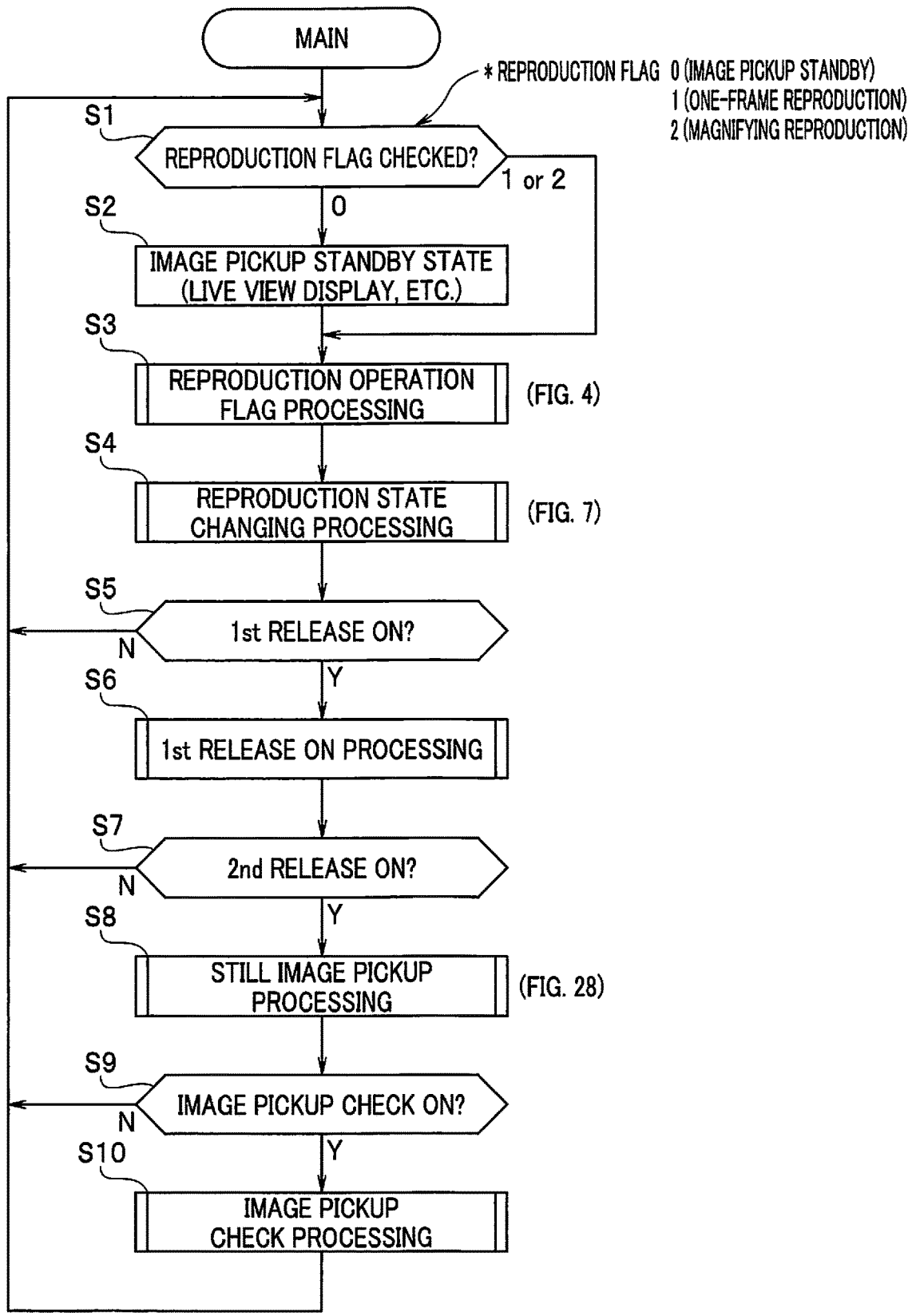
FIG. 3 is a basic flowchart (main routine) of the image pickup apparatus according to an embodiment of the present invention.

First, it is assumed that the image pickup apparatus 100 of the present embodiment is set to a power-on state. Under this state, a main routine of FIG. 3 is started. That is, in step S1 of FIG. 3, the system control section 120 executes reproduction flag check processing. Here, in the case of the reproduction flag=0, it is assumed that the image pickup apparatus 100 is set to an image pickup standby mode (live view (LV) display state), and the processing proceeds to processing of step S2. In the case of the reproduction flag=1 (one-frame reproduction mode) or the reproduction flag=2 (magnifying reproduction mode), the processing proceeds to processing of step S3. That is, when the reproduction flag is set (in the case of the reproduction flag=1 or 2), an operation instruction in the reproduction mode has been made, and thus the processing of step S2 is skipped.

In step S2, the system control section 120 executes various operations under the image pickup standby state, for example, live view display processing and the like. Here, the live view display processing is general display processing for continuously displaying images based on image signals acquired by the image pickup device 104.

Figure 4:
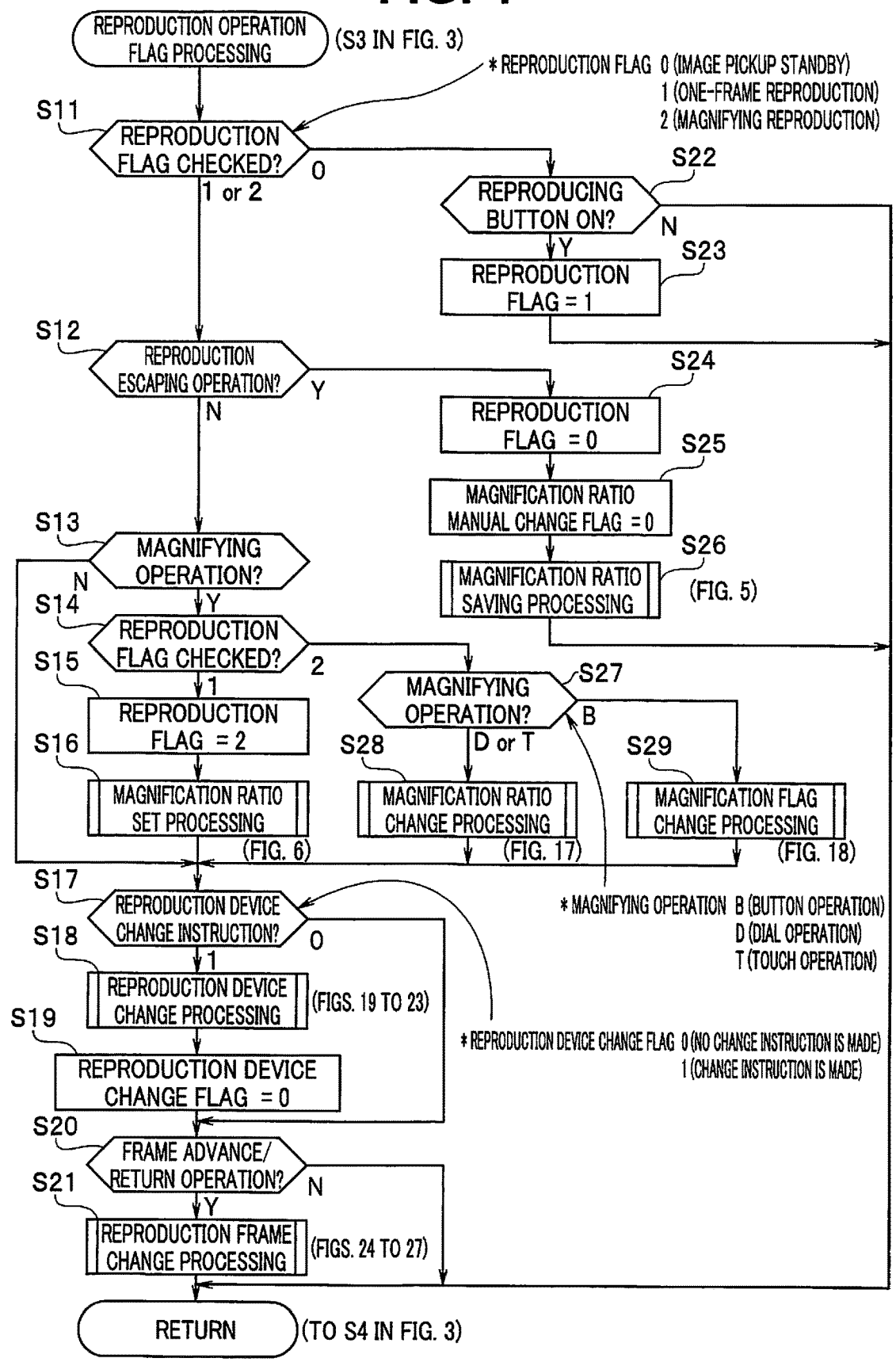
FIG. 4 is a subroutine of processing of step S3 (reproducing operation flag processing) in FIG. 3.

Next, in step S3, the system control section 120 executes reproducing operation flag processing. FIG. 4 shows a subroutine of this reproducing operation flag processing. This reproducing operation flag processing is a processing routine for indicating an operation instruction based on the reproducing operation member as a flag. Processing of changing the reproduction state (processing of step S4 of FIG. 3) is executed according to the flag indicated here.

Here, the reproducing operation flag processing will be described in detail with reference to FIG. 4. In the reproducing operation flag processing, the user operates a predetermined operation member (for example, the reproducing button 111f, the plural operation dials 111c and 111i, the shutter release button 111a, the power supply switch 111d, etc.) at a predetermined timing as necessary, thereby performing processing of generating a flag for instructing each of various operations relating to reproduction such as various actions in the reproduction mode, for example, one-frame reproducing action, a magnifying reproducing action, a changing action (switching operation) of the reproduction device, a display image changing operation (frame advancing and frame returning operation), etc. as well as an action (operation) of switching to the reproduction mode, and a release action (operation) from the reproduction mode (which is also referred to as reproduction escaping action (operation) or the like).

As described above, when the processing proceeds to the processing of step S3 in the case of the reproduction flag=1 or 2 in step S1 of FIG. 3 or after the processing of step S2 in FIG. 3, the reproducing operation flag processing is executed.

In the reproducing operation flag processing, as shown in FIG. 4, the system control section 120 first executes the reproduction flag check processing in step S11. The reproduction flag check processing is the same as the processing of step S1 in FIG. 3.

Here, in the case of the reproduction flag=0, it is assumed that the image pickup apparatus 100 is set to the image pickup standby mode (live view (LV) display state), and the processing proceeds to processing of step S22. On the other hand, in the case of the reproduction flag=1 (one-frame reproduction mode) or reproduction flag=2 (magnifying reproduction mode), the processing proceeds to processing of step S12.

In step S22, the system control section 120 checks whether a reproduction ON signal is generated by operating the reproducing button 111f. Here, when the reproduction ON signal is confirmed, the processing proceeds to processing of step S23. On the other hand, when no reproduction ON signal is confirmed, a series of processing in FIG. 4 is terminated, and proceeds to the processing of step S4 in FIG. 3.

In step S23, the system control section 120 sets the reproduction flag to 1 (one-frame reproduction mode). Thereafter, a series of processing of FIG. 4 is terminated, and proceeds to the processing of step S4 in FIG. 3.

In step S12, the system control section 120 performs check processing as to whether the reproduction escaping operation has been performed. This reproduction escaping operation is an operation of switching a state in the reproduction mode to a state in another mode, that is, an operation of seceding from the reproduction mode. Specific examples of the reproduction escaping operation include, for example, a depressing operation of a first-stage switch of the shutter release button 111a (referred to as a first (1st.) release-on operation), a depressing operation of the reproducing button 111f, an OFF operation of the power supply switch 111d, and the like.

Here, when execution of the reproduction escaping operation has been confirmed, the processing proceeds to the processing of step S24. On the other hand, when execution of the reproduction escaping operation has not been confirmed, the processing proceeds to the processing of step S13.

In step S24, the system control section 120 sets the reproduction flag to 0. Thereafter, the processing proceeds to processing of step S25.

In step S25, the system control section 120 sets a magnification ratio manual change flag to 0 (flag clear).

Note that the magnification ratio manual change flag is a flag relating to an operation of changing the setting of the magnification ratio (magnifying operation) by the user. When the manual change of the magnification ratio by the user has not been performed, the magnification ratio manual change flag is 0. When the manual change of the magnification ratio by the user has been performed, the magnification ratio manual change flag is 1.

When the magnification ratio is manually set, an operation of selecting any one magnification ratio value from a predetermined series of magnification ratios is performed. In the image pickup apparatus 100 of the present embodiment, it is assumed that magnification ratio values such as 2×, 3×, 5×, 7×, 10×, and 14× are prepared in advance as the series of magnification ratios. Note that the magnification ratio manually selecting operation includes, for example, a touch or slide operation on the touch panel as well as a rotating operation of the operation dial 111c and a depressing operation of the magnifying button 111x. In this case, these operation members (111c, 111x, etc.) function as a magnification ratio changing operation section for indicating one magnification ratio of the magnification ratio series (second magnification ratios).

Figure 5:
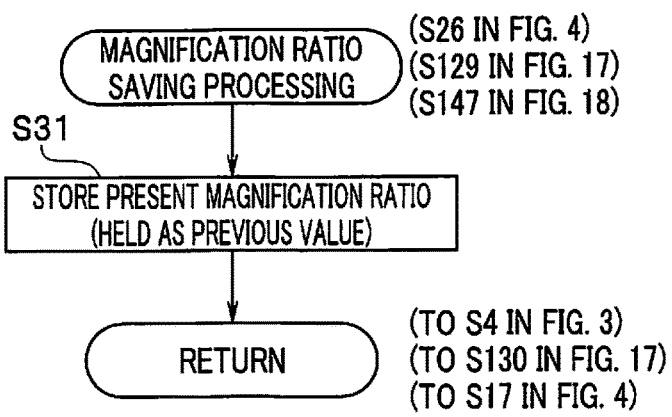
FIG. 5 is a subroutine of processing of step S26 (magnification ratio saving processing) of FIG. 4.

Subsequently, in step S26, the system control section 120 executes a magnification ratio saving processing. A subroutine of this magnification ratio saving processing is shown in FIG. 5. The magnification ratio saving processing is processing which is called at a predetermined timing, for example, at the time of seceding from the reproduction mode and manually set or automatically instructed to save a set value of a currently set magnification ratio as a previous value.

Here, a subroutine of the magnification ratio saving processing will be described with reference to FIG. 5. In step S31 of FIG. 5, the system control section 120 stores the set value of the currently set magnification ratio in a predetermined area of the nonvolatile memory 130. As a result, the set value of the magnification ratio which is manually set by the user is saved as a previous set value. Accordingly, when the reproduction mode is set at a next time, the set value of the magnification ratio saved here is called up. Thereafter, a series of processing in FIG. 5 is terminated, and proceeds to the processing of step S4 in FIG. 3.

Returning to FIG. 4, in step S13, the system control section 120 checks whether the magnifying operation is performed by the user. This magnifying operation is an operation of magnifying and displaying an image being displayed under a state which has been in the reproduction mode. Specific examples of the magnifying operation include, for example, a depressing operation of the magnifying button 111x, a rotating operation of the operation dial 111c, a touch operation (pinch-out, pinch-in, double tapping, etc.) on the display panel of the back monitor 108 and the like.

Here, when execution of the magnifying operation is confirmed, the processing proceeds to the processing of step S14. When execution of the magnifying operation is not confirmed, the processing proceeds to processing of step S17.

In step S14, the system control section 120 executes a reproduction flag check processing. Here, in the case of the reproduction flag=1 (one-frame reproduction mode), the processing proceeds to processing of step S15. In the case of the reproduction flag=2 (magnifying reproduction mode), the processing proceeds to processing of step S27.

In step S15, the system control section 120 sets the reproduction flag to 2 (magnifying reproduction mode).

Figure 6:
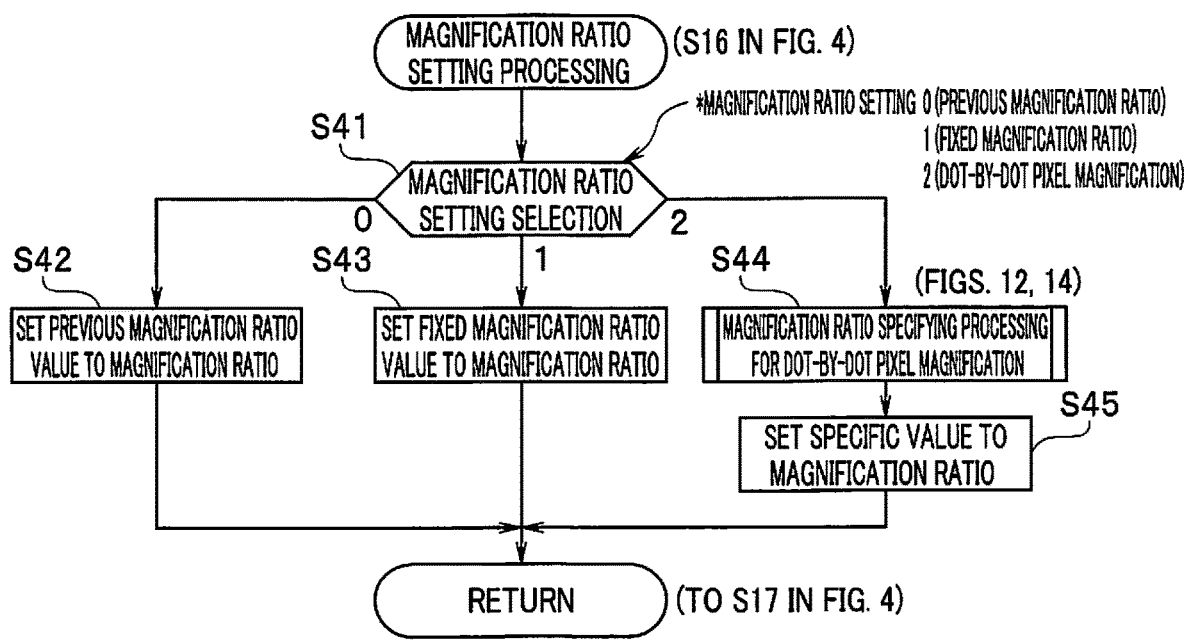
FIG. 6 is a subroutine of processing of step S16 (magnification ratio setting processing) of FIG. 4.

Subsequently, in step S16, the system control section 120 executes magnification ratio setting processing. FIG. 6 shows a subroutine of the magnification ratio setting processing. The magnification ratio setting processing is a processing routine for setting the magnification ratio. The magnification ratio setting processing is processing which is called at an operation timing for instructing magnifying display, that is, when the user performs a magnifying operation (step S13), and sets a magnification ratio according to a mode preset from three modes (a previous magnification ratio mode, a fixed magnification ratio mode, and a dot-by-dot pixel magnification mode) on "magnification ratio setting menu".

In the image pickup apparatus 100 according to the present embodiment, plural operation styles (which magnification ratio is used to perform magnifying display) when the magnifying display operation is executed in the reproduction mode are prepared. One of the plural operation styles is set in advance by the magnification ratio setting processing. As a result, the magnifying display operation to be executed when the user performs the magnifying operation can be set as a preset desired operation style.

In the image pickup apparatus 100 according to the present embodiment, when the magnifying display operation is executed in the reproduction mode, for example, an operation based on the previous magnification ratio mode, the fixed magnification ratio mode, the dot-by-dot pixel magnification mode or the like is executed.

Here, the previous magnification ratio mode is an operation style in which the magnifying display operation is performed with a magnification ratio value used during execution of the previous magnifying display operation regardless of the number of display pixels of the reproduction device (display device) or the number of pixels of an image as a reproduction target. In this operation style, since a magnification ratio which might be set to a preferable value for check of an image by the user is saved and inherited, the user can check with the magnification ratio in next and subsequent magnifying operations.

The fixed magnification ratio mode is an operation style in which the magnifying display operation is performed with a magnification ratio value specified by the user regardless of the number of display pixels of the reproduction device (display device) or the number of pixels of an image as a reproduction target. In this operation style, the user can specify a preferable magnification ratio and can fixedly use the magnification ratio.

The dot-by-dot pixel magnification mode is an operation style in which the magnifying display operation is performed with a magnification ratio value corresponding to the number of display pixels of the reproduction device (display device) or the number of pixels of an image as a reproduction target. In this operation style, it is possible to prevent out-of-focus and user's error of judgment caused by an excessive magnification ratio set by the user.

This magnification ratio setting processing is processing of instructing to select an operation style under the magnifying display operation by performing selecting operation of a desired item from plural items prepared in advance on a predetermined menu (magnification ratio setting menu), and saving the setting of the operation style corresponding to the selected item into a predetermined area of the nonvolatile memory 130. The setting which has been instructed to be selected and saved in the nonvolatile memory 130 as described above is read out from the nonvolatile memory 130 when the magnifying operation is performed by the user, and the corresponding program is executed.

Here, a subroutine of the magnification ratio setting processing will be described with reference to FIG. 6. In step S41 of FIG. 6, the system control section 120 displays a magnification ratio setting selection menu on one of the two display sections (108, 109).

The user operates this menu display to select a desired operation style under the magnifying display operation (for example, one of the three kinds of modes described above (the previous magnification ratio mode, the fixed magnification ratio mode, the dot-by-dot pixel magnification mode)).

Here, for example, when the previous magnification ratio mode is selected and indicated, the magnification ratio setting flag is set to 0, and the processing proceeds to processing of step S42. When the fixed magnification ratio mode is selected and indicated, the magnification ratio setting flag is set to 1, and the processing proceeds to processing of step S43. Then, when the dot-by-dot pixel magnification mode is selected and indicated, the magnification ratio setting flag is set to 2, and the processing proceeds to processing of step S44.

In step S42, the system control section 120 reads out the previous magnification ratio value and sets the read-out previous magnification ratio value as a magnification ratio value under the present magnifying display. Thereafter, a series of processing is terminated, and proceeds to the process of step S17 in FIG. 4.

In step S43, the system control section 120 sets a magnification ratio value specified in advance by the user as the magnification ratio value under the present magnifying display. Thereafter, a series of processing is terminated, and proceeds to the processing of step S17 in FIG. 4.

Figure 12:
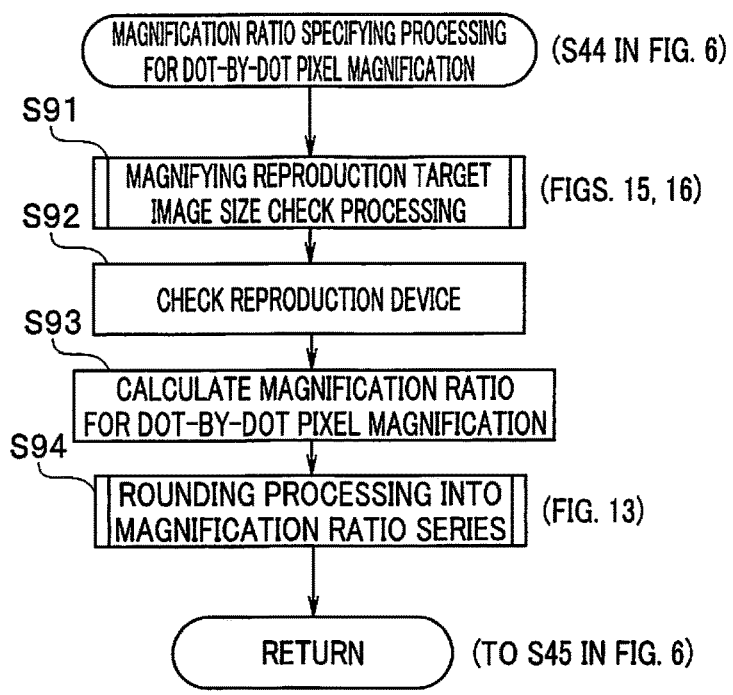
FIG. 12 is a subroutine of processing of step S44 (magnification ratio specifying processing for dot-by-dot pixel magnification) of FIG. 6.

In step S44, the system control section 120 executes magnification ratio specifying processing for dot-by-dot pixel magnification. A subroutine of the magnification ratio specifying processing for the dot-by-dot pixel magnification is shown in FIG. 12, and detailed description on this subroutine will be described later.

Subsequently, in step S45, the system control section 120 sets the specific value acquired in the processing of step S44 described above (the magnification ratio specifying processing for the dot-by-dot pixel magnification) as a magnification ratio value under the present magnifying display. Thereafter, a series of processing is terminated, and proceeds to the processing of step S17 of FIG. 4.

In the foregoing description, the magnification ratio setting processing (the processing of step S16 in FIG. 4) is executed after the magnifying operation performed in the processing of step S13 in FIG. 4, and a menu screen is called up in the magnification ratio setting processing, and a predetermined selecting and setting operation is performed.

However, it is natural that the selecting and setting operation based on such a menu screen should be set only once. Accordingly, in a case where the operation style under the magnifying display operation has been already set, the magnification ratio setting on the operation style under the magnifying display operation which has already been kept is read out upon execution of the magnification ratio setting processing (step S16 of FIG. 4), and the magnifying display operation based on the set operation style is executed.

That is, the user does not necessarily have to perform the selecting and indicating operation based on the operation style under the magnifying display operation by the magnification ratio setting processing of FIG. 6 whenever the user executes the magnifying operation (step S13 in FIG. 4). Furthermore, with respect to the selecting and indicating operation based on the operation style under the magnifying display operation by the magnification ratio setting processing, change of setting can be performed from the menu screen in the operation setting mode at any time.

Here, a subroutine of the magnification ratio specifying processing for the dot-by-dot pixel magnification in FIG. 12 will be described. The magnification ratio specifying processing for the dot-by-dot pixel magnification is processing for calculating a magnification ratio for the dot-by-dot pixel magnification from the number of pixels of the reproduction device and the number of pixels of an image as a reproduction target, and rounding the calculated magnification ratio for the dot-by-dot pixel magnification to any magnification ratio series value.

When the dot-by-dot pixel magnification mode is selected and indicated in the processing of step S41 in FIG. 6, the magnification ratio setting flag is set to 2, and then the processing proceeds to the processing of step S44, that is, the magnification ratio specifying processing for the dot-by-dot pixel magnification of FIG. 12.

Figure 15:
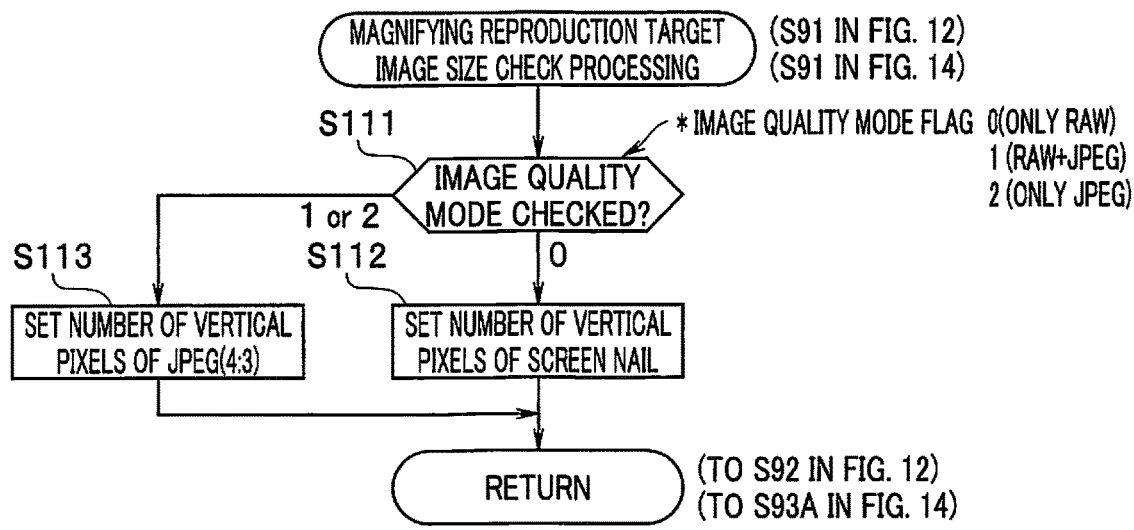
FIG. 15 is a subroutine of processing of step S91 (magnifying reproduction target image size check processing) of FIGS. 12 and 14.

In step S91 in FIG. 12, the system control section 120 executes magnifying reproduction target image size check processing. FIG. 15 shows a subroutine of the magnifying reproduction target image size check processing.

Normally, the image pickup apparatus 100 has a function of specifying plural aspect ratios (for example, "4:3", "3:2", "1:1", "16:9", "3:4", etc.) to perform image recording. When images of these aspect ratios are generated, an image of a desired aspect ratio is generally generated by cutting out a basic image that can be acquired by the image pickup device.

If recording images at the respective aspect ratios are individually considered when a magnification ratio is calculated from the size of an image as a magnifying reproduction target, it causes multiplicative increase of the number of magnification ratio series values when magnifying display is performed.

In consideration of the foregoing matter, in the present embodiment, the calculation of the magnification ratio value when magnifying display is performed is uniquely carried out based on the number of vertical pixels or the number of horizontal pixels in a basic image of the image pickup device (an image of the aspect ratio "4:3" in this example).

In step S111 of FIG. 15, the system control section 120 performs image quality mode check processing. Here, the image quality mode is a mode for setting the type of an image data file to be recorded. The image quality mode can be preset from the menu screen of the setting mode by the user. In the image quality mode check processing, an image quality mode flag is checked. In the case of the image quality mode flag=0, the image quality mode is an image quality mode for recording image data based on only RAW. In the case of the image quality mode flag=1, the image quality mode is an image quality mode for recording image data of two types of RAW and JPEG. In the case of the image quality mode flag=2, the image quality mode is an image quality mode for recording image data based on only JPEG.

In this case, three types of a mode for recording only image data of RAW, an image quality mode for recording image data of two types of RAW and JPEG, and a mode for recording image data based on only JPEG are exemplified as the types of the image quality mode, but actually, subclasses as shown in FIG. 32 are further provided.

For example, with respect to the image size in the case of recording based on only JPEG, three types of classes of Large, Middle, and Small are provided. In these classes, four types of subclasses are provided for Middle, and two types of subclasses are provided for Small.

High resolution JPEG is JPEG data acquired in an operation mode (so-called high-resolution mode) in which the image pickup device is moved on a pixel basis during the image pickup operation, and plural image data (JPEG data) acquired every time the image pickup device is moved are combined to acquire image data having high resolution.

When the image quality mode flag=0 is confirmed in the above-described step S111, the processing proceeds to processing of step S112. When the image quality mode flag=1 or 2 is confirmed, the processing proceeds to processing of step S113.

In step S112, the system control section 120 sets the number of vertical pixels of a screen nail image as the size of a magnifying reproduction target image. Thereafter, a series of processing is terminated, and proceeds to processing of step S92 in FIG. 12.

Note that RAW image data itself cannot be displayed directly. The screen nail image is display image data included in RAW image data or JPEG image data. This display image data is, for example, image data of a JPEG format, and various cases such as a case where the display image data have the same vertical and horizontal pixels as RAW image data, and a case where the display image data have a reduced image size are considered. As described above, the image data acquired by the image pickup apparatus 100 are configured as one set of plural images, and also configured and filed to include various kinds of attendant information on the images in addition to the set of images to be filed. Note that various styles which have been generally practically and widely used in the past are applied as the style of the image data file, and thus further detailed description is omitted.

In step S113, the system control section 120 sets the number of vertical pixels of a JPEG image (4:3) as the size of a magnifying reproduction target image. Thereafter, a series of processing is terminated, and proceeds to processing of step S92 in FIG. 12.

Even when the aspect ratio of a JPEG image to be recorded is set to an aspect ratio other than "4:3", the original number of pixels of the JPEG image is used as a basis for the calculation of a magnification ratio described later. Therefore, the number of vertical pixels of the JPEG image (4:3) is set in this case.

Figure 16:
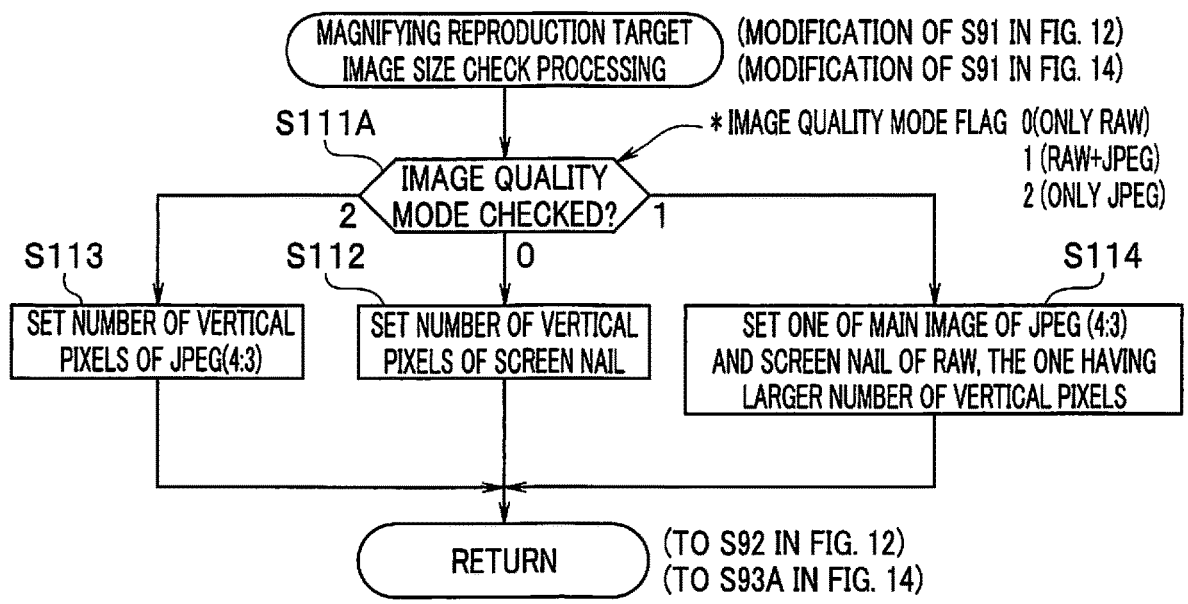
FIG. 16 is a subroutine of a modification of magnifying reproduction target image size check processing of FIG. 15.

Here, FIG. 16 shows a modification of the magnifying reproduction target image size check processing of FIG. 15 (the processing of step S91 in FIG. 12). The modification shown in FIG. 16 differs in that the processing in the case of the image quality mode flag=2 is performed in another step.

That is, in step S111A of FIG. 16, the system control section 120 performs the image quality mode check processing (the same as the processing of step S111 of FIG. 15). Here, when the image quality mode flag=0 is confirmed, the processing proceeds to the processing of step S112. When the image quality mode flag=2 is confirmed, the processing proceeds to the processing of step S113. When the image quality mode flag=1 is confirmed, the processing proceeds to processing of step S114. Note that the processing of each of steps S112 and S113 is the same as the processing of FIG. 15.

In step S114, the system control section 120 compares the number of vertical pixels of a main image of the JPEG image (4:3) with the number of vertical pixels of a screen nail image contained in the RAW image, and sets the larger number of vertical pixels as the size of the magnifying reproduction target image. Thereafter, a series of processing is terminated, and proceeds to the processing of step S92 in FIG. 12.

Returning to FIG. 12, in step S92, the system control section 120 checks the reproduction device (display device). The check of the reproduction device (display device) is a check on the specification of each display panel of the first display section (the back monitor 108) and the second display section (EVF 109) (for example, the aspect ratio of a display area, the numbers of vertical and horizontal pixels of the display area, etc.).

Here, for example, a table shown in FIG. 32 exemplifies calculated values of the magnification ratio value when magnifying display is performed at the dot-by-dot pixel magnification. In this case, the numbers of vertical and horizontal pixels of an image for each image quality mode in the image pickup apparatus 100 are shown in columns of the image pixel size. In this case, the number of horizontal pixels is shown as a long side A, and the number of vertical pixels is shown as a short side B. The first display section (back monitor 108) is assumed to have a display panel having a specification of the aspect ratio=3:2, the long side C=720 pixels and the short side D=480 pixels. The second display section (EVF 109) is assumed to have a display panel having a specification of the aspect ratio=4:3, the long side E=1024 pixels and the short side F=768 pixels.

Returning to FIG. 12, in step S92, the system control section 120 checks the specification of the reproduction device (display device), etc. (see FIG. 32).

Next, in step S93, the system control section 120 calculates the magnification ratio value for the dot-by-dot pixel magnification. For example, in an example shown in FIG. 32, a magnification ratio when an image of the long side A=5184 pixels and the short side B=3888 pixels in the case of the image quality mode=Large is subjected to magnifying display under the dot-by-dot pixel magnification by using the back monitor 108 (the long side C=720 pixels, the short side D=480 pixels) can be calculated as a magnification ratio (horizontal) for the dot-by-dot pixel magnification=the long side A/the long side C=5184/720=7.2, and a magnification ratio (vertical) for the dot-by-dot pixel magnification=the short side B/the short side D=3888/480=8.1.

Figure 13:
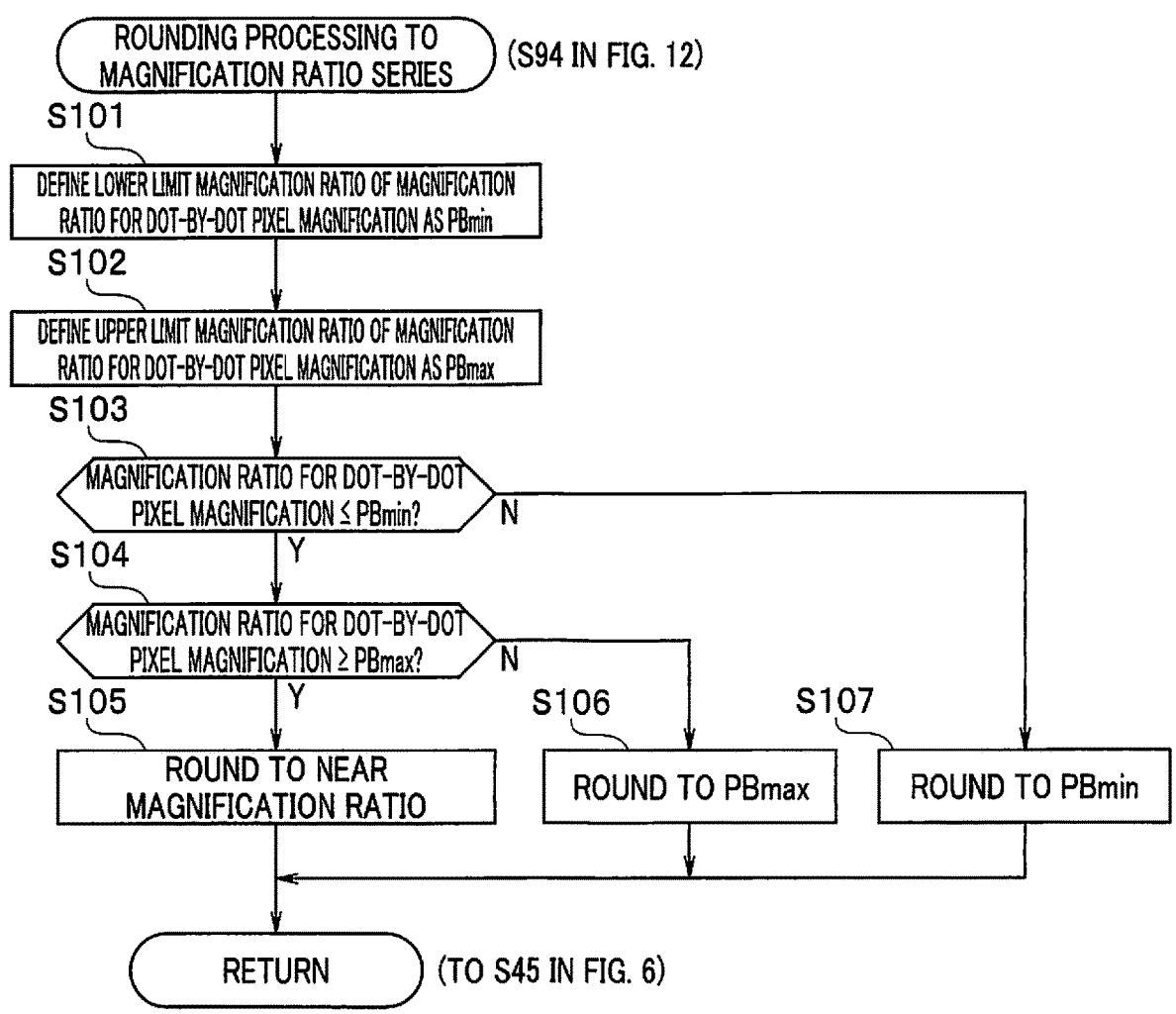
FIG. 13 is a subroutine of processing of step S94 (rounding processing on magnification ratio series) of FIG. 12.

Subsequently, in step S94, the system control section 120 executes processing of rounding the magnification ratio value for the dot-by-dot pixel magnification calculated in the foregoing processing of step S93 to a predetermined magnification ratio series. FIG. 13 shows a subroutine of the rounding processing to the magnification ratio series.

To briefly explain, it is considered that the rounding processing to the magnification ratio series includes, for example, processing of setting to a magnification ratio series value nearest to the calculated magnification ratio value for the dot-by-dot pixel magnification, processing of setting to a magnification ratio series value which is larger than and nearest to the calculated magnification ratio value for the dot-by-dot pixel magnification, processing of setting to a magnification ratio series value which is smaller than and nearest to the calculated magnification ratio value for the dot-by-dot pixel magnification or the like, and any processing may be applied.

Note that such "rounding processing" is performed for the following reason. That is, in a usual case, it is desirable that such a series which is as discrete as possible and can cover up to high magnification ratios with a few steps, for example, 2×, 3×, 5×, 7×, 14× or the like in consideration of usability is set as a magnification ratio series preset in an image pickup apparatus capable of performing magnifying display in the reproduction and display operation.

In other words, even when a magnification ratio changing bit by bit, for example, from 1 time (full display) to 1.15 times is prepared, not only the magnification ratio is meaningless, but the magnification ratio causes a user to misunderstand that the user has failed the magnifying operation. To the contrary, even when an excessively large magnification ratio such as 21.6× is prepared, the magnification ratio is likewise meaningless because an image is excessively dotted, so that it is impossible to figure out what is being displayed. That is, considering that a purpose of the magnifying display is mainly a focus check, it can be said that it is inappropriate that the magnification ratio is extremely low or high (or its vicinity).

Therefore, with respect to the magnification ratio value for the dot-by-dot pixel magnification, it is good to restrict a minimum magnification ratio and a maximum magnification ratio which are considered to be suitable for focus check. From the viewpoint of the magnifying operation, it is necessary to set a lower limit, at least.

Therefore, for example, in step S101 of FIG. 13, the system control section 120 defines the lower limit magnification ratio of the magnification ratio for the dot-by-dot pixel magnification as PBmin.

Subsequently, in step S102, the system control section 120 defines an upper limit magnification ratio of the magnification ratio for the dot-by-dot pixel magnification as PBmax.

By restricting the magnification ratio value for the dot-by-dot pixel magnification as described above, significant deviation of the magnification ratio caused when the back monitor 108 and the EVF 109 are switched to each other can be prevented. Therefore, an effect of reducing unnatural feeling given to the user can also be obtained.

In the example shown in FIG. 32, PBmin is set to 2× and PBmax is set to 14×. However, in consideration of simplification of practical use, the magnification ratio value may be set, for example, in a narrow range like PBmin=3× and PBmax=7× or the like.

Next, in step S103 of FIG. 13, the system control section 120 checks whether PBmin is larger than the magnification ratio for the dot-by-dot pixel magnification calculated in the processing of step S93 in FIG. 12.

Here, when it is confirmed that PBmin is larger than the magnification ratio, the processing proceeds to processing of next step S104. On the other hand, when it is confirmed that PBmin is not larger than the magnification ratio (magnification ratio PBmin), the processing proceeds to processing of step S107.

In step S107, the system control section 120 executes the processing of rounding the magnification ratio setting to PBmin. Thereafter, a series of processing is terminated, and proceeds to processing of step S45 in FIG. 6. In step S45, the specific value acquired as described above is set as a magnification ratio value under the present magnifying display. Thereafter, a series of processing is terminated, and proceeds to the processing of step S17 in FIG. 4.

When the processing proceeds to the processing of step S104 in the case of the magnification ratio <PBmin in the processing of step S103, the system control section 120 checks in step S104 whether the magnification ratio for the dot-by-dot pixel magnification calculated in the processing of step S93 of FIG. 12 is larger than PBmax.

Here, when it is confirmed that the magnification ratio is larger than PBmax, the processing proceeds to processing of next step S105. On the other hand, when it is confirmed that the magnification ratio is not larger than PBmax (the magnification ratio PBmax), the processing proceeds to processing of step S106.

In step S106, the system control section 120 executes the processing of rounding the magnification ratio setting to PBmax. Thereafter, a series of processing is terminated, and proceeds to the processing of step S45 in FIG. 6. In step S45, the specific value acquired as described above is set as a magnification ratio value under the present magnifying display. Thereafter, a series of processing is terminated, and proceeds to the processing of step S17 in FIG. 4.

When the processing proceeds to the processing of step S105 under the state where the magnification ratio is larger than PBmax in the processing of step S104, the system control section 120 executes in step S105 the processing of rounding to a magnification ratio close to the magnification ratio for the dot-by-dot pixel magnification calculated in the processing of step S93 of FIG. 12. Thereafter, a series of processing is terminated, and proceeds to the processing of step S45 in FIG. 6. In step S45, the specific value acquired as described above is set as a magnification ratio value for the present magnifying display. Thereafter, a series of processing is terminated, and proceeds to the processing of step S17 in FIG. 4.

Figure 14:
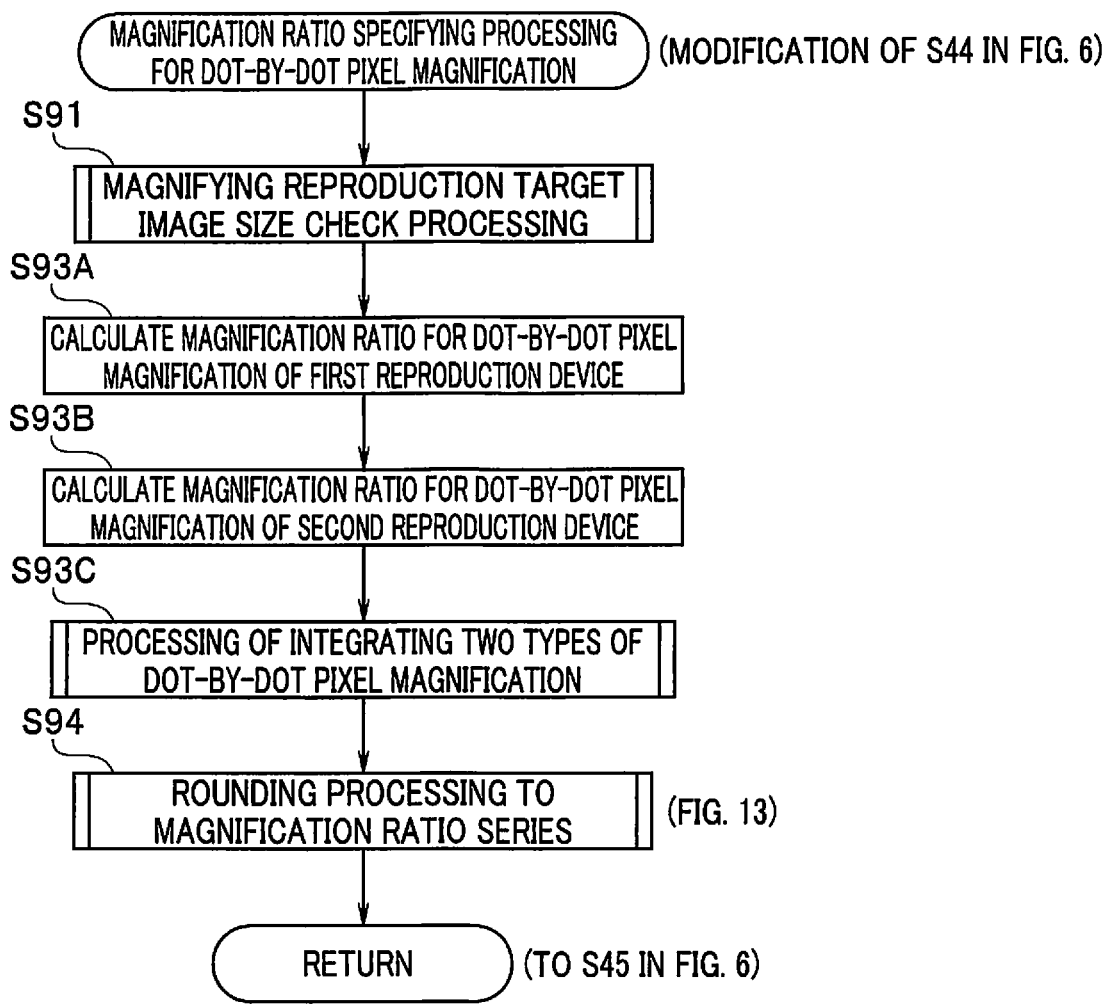
FIG. 14 is a subroutine of a modification of magnification ratio specifying processing for dot-by-dot pixel magnification of FIG. 12.

FIG. 14 shows a modification of the subroutine of the magnification ratio specifying processing for the dot-by-dot pixel magnification. The modification shown in FIG. 14 differs in that processing of determining magnification ratios during execution of display under the dot-by-dot pixel magnification in the two reproduction devices (108, 109) respectively and then rounding (integrating) both the magnification ratios to one magnification ratio series value is executed. That is, in step S91 of FIG. 14, the system control section 120 executes a magnifying reproduction target image size check processing (FIG. 15) (the same as the processing of step S91 in FIG. 12).

Next, in step S93A, the system control section 120 calculates the magnification ratio for the dot-by-dot pixel magnification of the first reproduction device.

Subsequently, in step S93B, the system control section 120 calculates the magnification ratio for the dot-by-dot pixel magnification of the second reproduction device.

Next, in step S93C, the system control section 120 executes the processing of integrating the magnification ratios for the dot-by-dot pixel magnification of the two types of reproduction devices.

Here, for example, processing of calculating an average value, processing of adopting a larger magnification ratio, processing of adopting a smaller magnification ratio, or the like may be considered as a specific example of the integration processing, and any of these processing may be adopted.

Subsequently, in step S94, the system control section 120 executes the rounding processing to the magnification ratio series (FIG. 13) (the same as the processing of step S94 in FIG. 12). Thereafter, a series of processing is terminated, and proceeds to the processing of step S45 in FIG. 6. In step S45, the specific value acquired as described above is set as the magnification ratio value during the present magnifying display. Thereafter, a series of processing is terminated, and proceeds to the processing of step S17 in FIG. 4.

When the processing proceeds to the processing of step S27 under a state where it is confirmed in the processing of step S14 in FIG. 4 that the reproduction flag is equal to 2 (the magnifying reproduction mode), the system control section 120 checks in step S27 the type of the magnifying operation executed in step S13 of FIG. 4. Here, in the image pickup apparatus 100 according to the present embodiment, means for performing the magnifying operation includes a button operation using the magnifying button 111x (setting magnifying operation flag to B), a dial operation using the operation dial 111c (setting the magnifying operation flag to D), a touch operation on the touch panel on the display panel (setting the magnifying operation flag to T), and the like. Therefore, the check as to the type of the magnifying operation executed in step S27 is the check as to the magnifying operation flag.

That is, when it is confirmed in step S27 that the magnifying operation flag is equal to D or T, the processing proceeds to processing of step S28. When it is confirmed that the magnifying operation flag is equal to B, the processing proceeds to processing of step S29.

Figure 17:
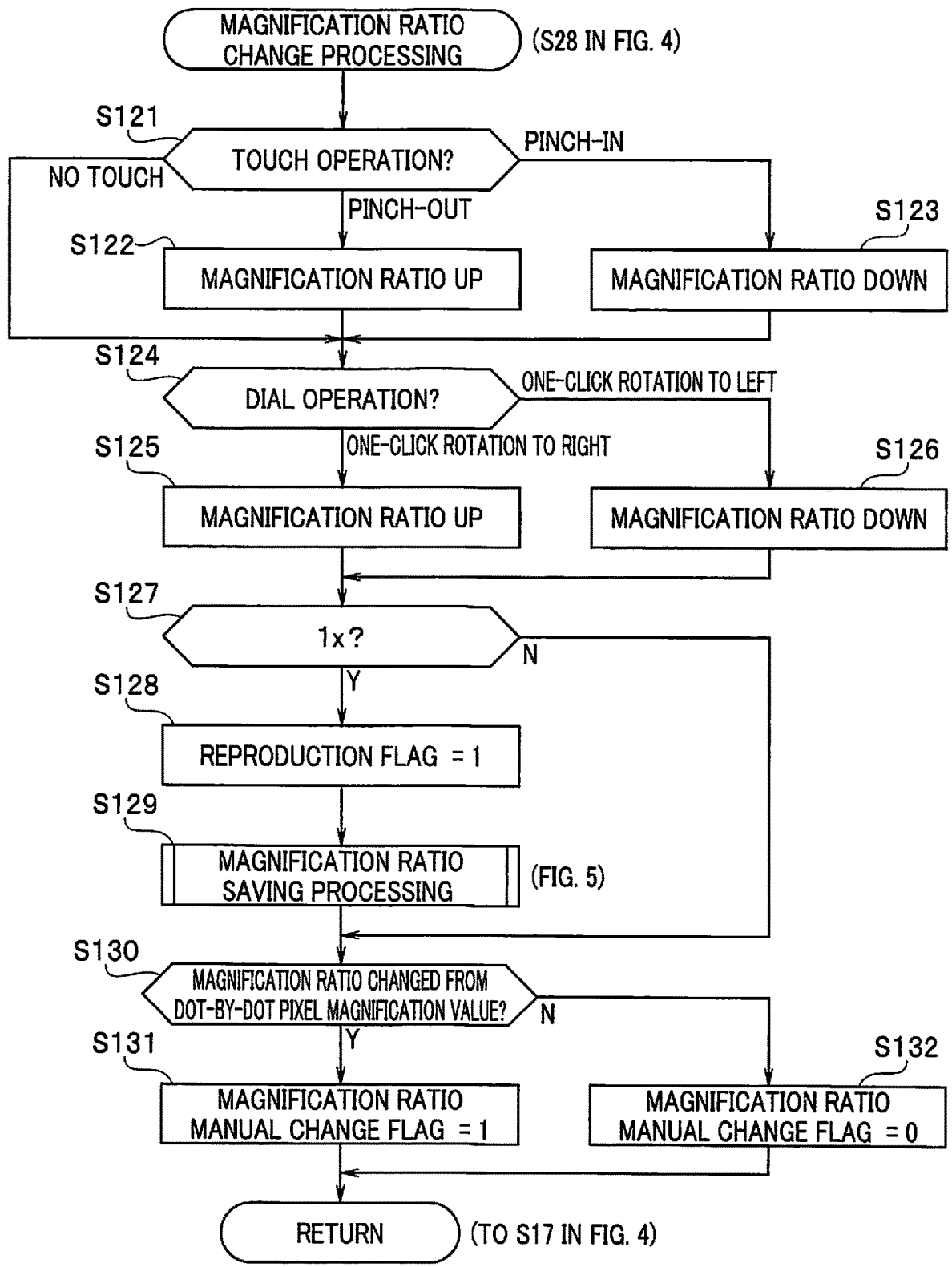
FIG. 17 is a subroutine of processing of step S28 (magnification ratio change processing) of FIG. 4.

In step S28, the system control section 120 executes magnification ratio change processing. A subroutine of the magnification ratio change processing is shown in FIG. 17 (described in detail later). Thereafter, the processing proceeds to the processing of step S17.

Figure 18:
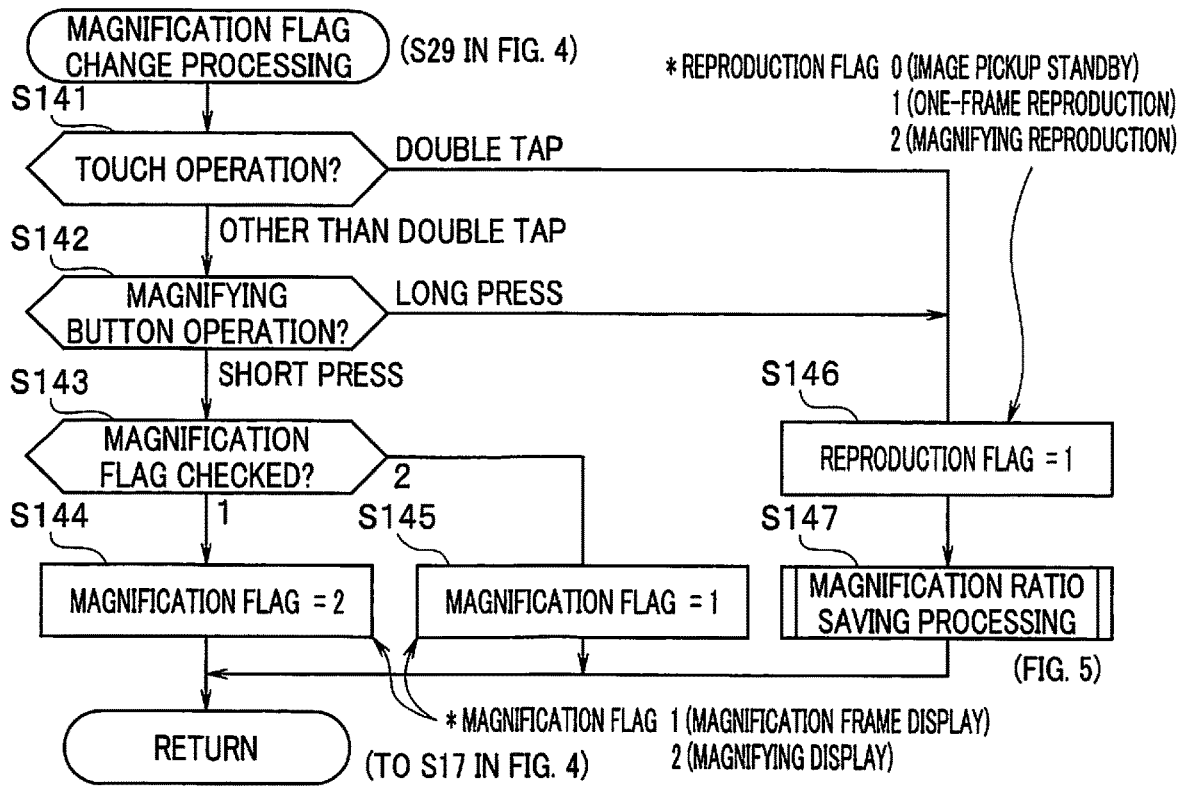
FIG. 18 is a subroutine of processing of step S29 (magnification flag change processing) of FIG. 4.

In step S29, the system control section 120 executes the magnification flag change processing. A subroutine of the magnification flag change processing is shown in FIG. 18 (described in detail later). Thereafter, the processing proceeds to the processing of step S17.

Here, the magnification ratio change processing (the processing of step S28 in FIG. 4) will be described below in detail with reference to FIG. 17.

In step S121 of FIG. 17, the system control section 120 checks the touch operation. Here, when the touch operation is not confirmed, the processing proceeds to processing of step S124. When a pinch-in operation of the touch operation is confirmed, the processing proceeds to processing of step S123. When a pinch-out operation of the touch operation is confirmed, the processing proceeds to processing of step S122.

In step S122, the system control section 120 increases the magnification ratio. That is, the setting of the magnification ratio is heightened, and corresponding magnifying display is performed. Thereafter, the processing proceeds to the processing of step S124.

On the other hand, in step S123, the system control section 120 decreases the magnification ratio. That is, the setting of the magnification ratio is lowered, and the display at the corresponding magnification ratio is performed. Thereafter, the processing proceeds to the processing of step S124.

In step S124, the system control section 120 checks the dial operation. When the dial operation is a one-click rightward rotating operation, the processing proceeds to processing of step S125. On the other hand, when the dial operation is a one-click leftward rotating operation, the processing proceeds to processing of step S126.

Here, the operation dial 111c has a click mechanism and is configured so as to obtain a click feeling in accordance with the rotating operation. In this case, the operation dial 111c is configured, for example, so as to successively step up a click magnification ratio series (2×, 3×, 5×, 7×, 10×, 14×) (increasing the magnification ratio) or step down the click magnification ratio series (decreasing the magnification ratio) on a click basis. In the example of the flowchart of FIG. 17, the magnification ratio is increased by rightward rotation and decreased by leftward rotation. However, regardless of this setting, the above setting may be reversed. When the magnification ratio has been set to 2×, a click in a direction of decreasing the magnification ratio releases the display from the magnifying display at 1× and shifts the display to one-frame reproduction. A click in a direction of increasing the magnification ratio when the magnification ratio has been set to 14× maintains the magnification ratio of 14× without changing the display, for example.

In step S125, the system control section 120 increases the magnification ratio. That is, the setting of the magnification ratio is heightened, and corresponding magnifying display is performed. Thereafter, the processing proceeds to processing of step S127.

On the other hand, in step S126, the system control section 120 decreases the magnification ratio. That is, the setting of the magnification ratio is lowered, and the display at the corresponding magnification ratio is performed. Thereafter, the processing proceeds to the processing of step S127.

In step S127, the system control section 120 checks whether the magnification ratio is equal to 1×. Here, when it is confirmed that the magnification ratio is equal to 1×, the processing proceeds to processing of step S128. On the other hand, when the magnification ratio is not equal to 1×, the processing proceeds to processing of step S130. Note that the magnification ratio of 1× means a one-frame reproduction state.

In step S128, the system control section 120 sets the reproduction flag to 1 (one-frame reproduction mode).

In step S129, the system control section 120 executes the magnification ratio saving processing (subroutine of FIG. 5).

Subsequently, in step S130, the system control section 120 checks whether the magnification ratio has been changed from the magnification ratio for the dot-by-dot pixel magnification. Here, when it is confirmed that the magnification ratio has been changed, the processing proceeds to processing of next step S131. On the other hand, when the magnification ratio has not been changed, the processing proceeds to processing of next step S132.

In step S131, the system control section 120 sets the magnification ratio manual change flag to 1. Thereafter, a series of processing is terminated, and proceeds to the processing of step S17 in FIG. 4.

In step S132, the system control section 120 sets the magnification ratio manual change flag to 0. Thereafter, a series of processing is terminated, and proceeds to the processing of step S17 in FIG. 4.

When the magnification ratio changing operation is performed by a manual operation in the processing of step S130 described above, the magnification ratio value set by the manual operation is given priority over the magnification ratio for the dot-by-dot pixel magnification. Therefore, a flag (magnification ratio manual change flag) indicating whether the magnification ratio has been changed from the magnification ratio for the dot-by-dot pixel magnification by the manual operation is provided in the processing of steps S131 and S132.

Next, the magnification flag change processing (the processing of step S29 in FIG. 4) will be described below in detail with reference to FIG. 18.

In step S141 of FIG. 18, the system control section 120 checks the touch operation. Here, when the double tap operation of the touch operation is confirmed, the processing proceeds to processing of step S146. When a touch operation other than the double tap operation of the touch operation is confirmed, the processing proceeds to processing of step S142.

In step S142, the system control section 120 checks a press operation of the magnifying button 111x. Here, when a long press operation of the magnifying button 111x is confirmed, the processing proceeds to the processing of step S146. When a short press operation of the magnifying button 111x is confirmed, the processing proceeds to processing of step S143.

In step S143, the system control section 120 executes magnification flag check processing. In the case of the magnification flag=1, the processing proceeds to processing of step S144. In the case of the magnification flag=2, the processing proceeds to processing of step S145.

Figure 33:
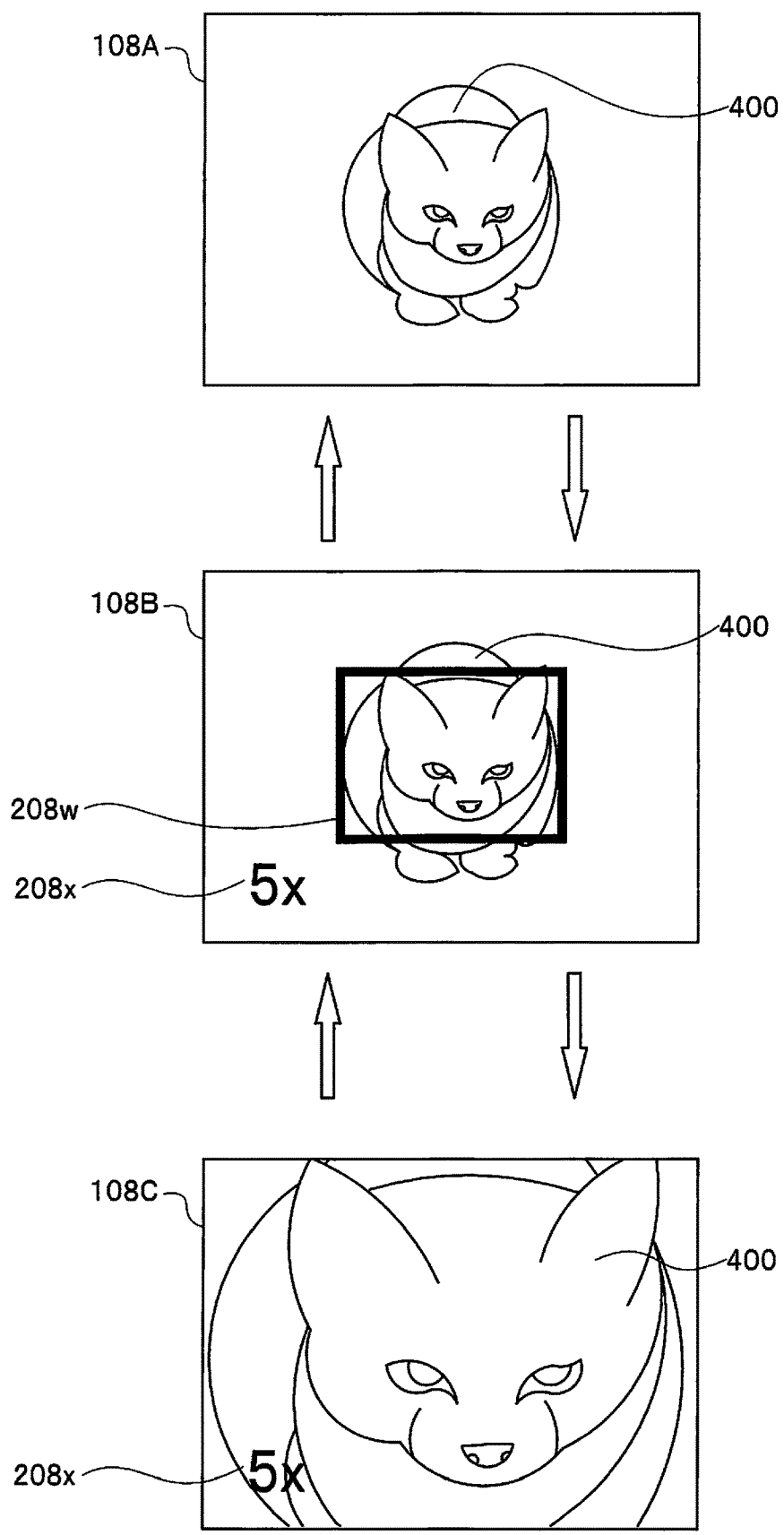
FIG. 33 shows examples of three modes of a reproduction display style in a reproduction mode.

In step S144, the system control section 120 sets the magnification flag to 2 (magnifying display; see reference sign 108C in FIG. 33). Thereafter, a series of processing is terminated, and proceeds to the processing of step S17 in FIG. 4.

In step S145, the system control section 120 sets the magnification flag to 1 (magnification frame display; see reference sign 108B in FIG. 33). Thereafter, a series of processing is terminated, and proceeds to the processing of step S17 in FIG. 4.

In step S146, the system control section 120 sets the reproduction flag to 1 (one-frame reproduction mode).

Subsequently, in step S147, the system control section 120 executes the magnification ratio saving processing (the subroutine in FIG. 5). Thereafter, a series of processing is terminated, and proceeds to the processing of step S17 in FIG. 4.

Returning to FIG. 4, in step S17, the system control section 120 checks an instruction of changing (switching) the reproduction device (display device) being used. Here, the instruction of changing (switching) the reproduction device (display device) is, for example, a change instruction generated upon receipt of a detection signal of the eye sensor 110 or a change instruction generated by operating the monitor switching button 111y.

The check of the change instruction performed here is the processing of checking the reproduction device change flag. That is, in the case of the reproduction device change flag=0, "no change instruction is made", and the processing proceeds to processing of step S20. In the case of the reproduction device change flag=1, "change instruction is made", and the processing proceeds to processing of step S18.

Figure 31:
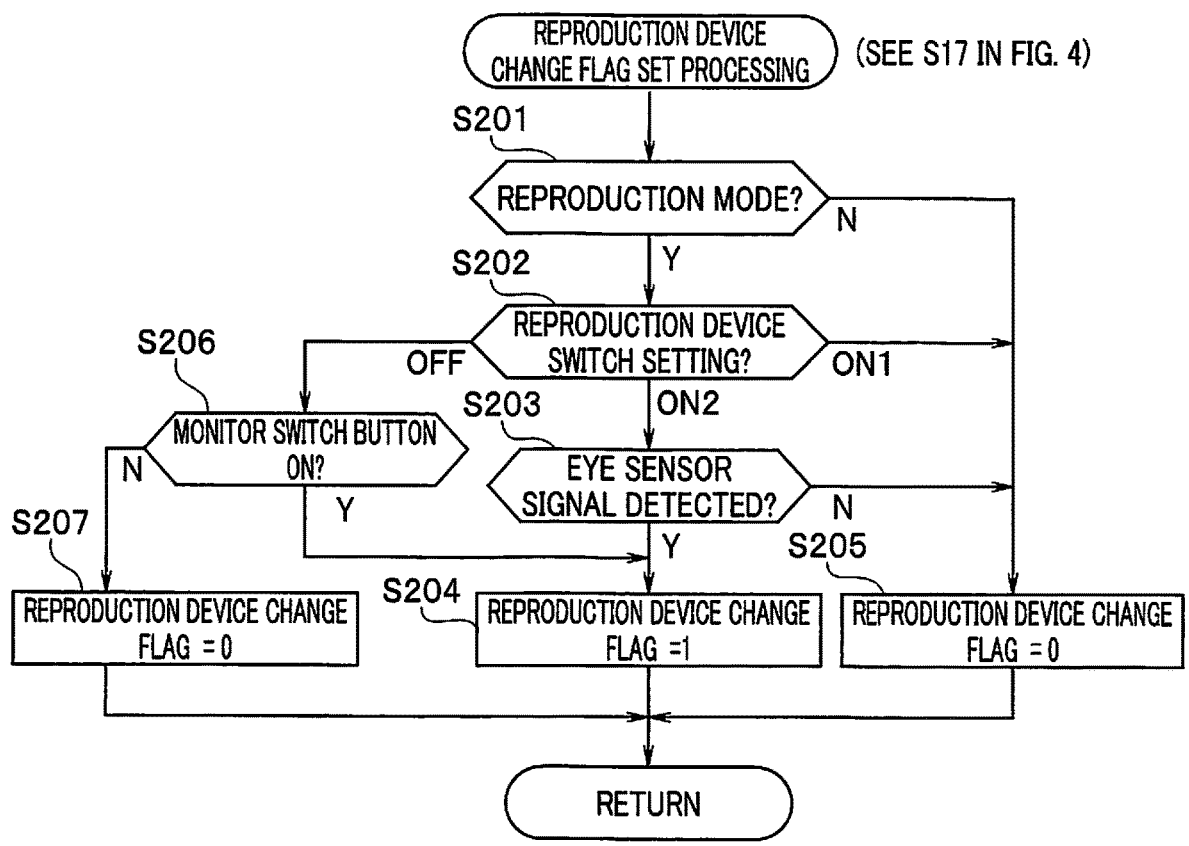
FIG. 31 is a subroutine of reproduction device change flag setting processing.

Note that the reproduction device change flag is set by a subroutine of reproduction device change flag setting processing in FIG. 31.

The change (switching) of the reproduction device (display devices 108, 109) in the image pickup apparatus 100 according to the present embodiment is performed by automatic switching based on a detection signal of the eye sensor 110 or manual switching based on an operation instruction signal generated by manually operating the monitor switching button 111y.

A mode of switching and setting the reproduction device is defined by selecting and setting any one mode of plural types (three types in this embodiment) of settings prepared in advance by a menu setting operation of the setting mode.

A first mode of switching and setting the reproduction device is a mode in which the detection function of the eye sensor 110 is disabled and the switching is always performed based on the manual operation using the monitor switching button 111y (eye sensor OFF mode).

A second mode of switching and setting the reproduction device is a mode in which the detection function of the eye sensor 110 is enabled and when the eye sensor 110 is caused to react upon user's looking into the EVF 109 or the like, the reproduction device is automatically switched to a state where the EVF 109 is usable. At this time, a live view is displayed on the EVF 109 irrespective of the operation mode immediately before (eye sensor ON1 mode).

That is, when the eye sensor 110 reacts while the back monitor 108 is in use (or the back monitor may be in an OFF state) irrespective of the reproduction mode or the image pickup mode, the EVF 109 is automatically switched to an ON state, and the live view is displayed on the EVF 109. Therefore, when the operation mode immediately before is the reproduction mode, switching to the image pickup mode is also performed at the same time.

As described above, the eye sensor ON1 mode (second mode) is set to a mode in which the EVF 109 operates so as to perform the live view display from the idea of giving top priority to quickness of the image pickup operation performed by using the EVF 109 and is restricted from being used as the reproduction device. Accordingly, a problem caused by switching of the reproduction device, for example, such a problem that the user easily views a reproduction image at a different magnification ratio due to the dot-by-dot pixel magnification processing does not occur, so that no unnatural feeling is given to the user. Furthermore, since no switching instruction itself of the reproduction device occurs, it is possible to avoid occurrence of such a problem that the magnification ratio returns to the setting before the reproduction device is switched, that is, the magnification ratio for the dot-by-dot pixel magnification due to an inadvertent switching instruction of the reproduction device when the user manually changes the magnification ratio from the magnification ratio for the dot-by-dot pixel magnification.

A third mode of switching and setting the reproduction device is a mode in which the detection function of the eye sensor 110 is enabled and the reproduction device is automatically switched from the back monitor 108 to the EVF 109 when the eye sensor 110 is caused to react upon user's looking into the EVF 109 or the like while the back monitor 108 is in use. At this time, a display image being displayed on the back monitor 108 is displayed on the EVF 109 (eye sensor ON2 mode).

The processing of setting the reproduction device change flag when a change (switching) instruction of the reproduction device is given in the case where the switching and setting described above are set will be described below with reference to FIG. 31.

First, in step S201 of FIG. 31, the system control section 120 checks whether the operation mode of the image pickup apparatus 100 is the reproduction mode. Here, when it is confirmed that the operation mode is the reproduction mode, the processing proceeds to processing of step S202. On the other hand, when the operation mode is not the reproduction mode, the processing proceeds to processing of step S205.

In step S205, the system control section 120 sets the reproduction device change flag to 0. Thereafter, a series of processing is terminated (return). Note that this return processing is processing which leaves from the present set mode and returns to the operation mode immediately before (the image pickup mode or the reproduction mode) (the same is applied to the return processing after steps S204 and S207).

In step S202, the system control section 120 checks which one of the above three modes the reproduction device switching and setting is set to. Here, when the eye sensor is set to ON1 mode (the second mode), the processing proceeds to the processing of step S205. When the eye sensor is set to ON2 mode (the third mode), the processing proceeds to processing of step S203. When the eye sensor is set to OFF mode (the first mode), the processing proceeds to processing of step S206.

In step S203, the system control section 120 checks whether an output signal of the eye sensor 110 is detected. Here, when the output signal of the eye sensor 110 is detected, the processing proceeds to processing of step S204. When no output signal of the eye sensor 110 is detected, the processing proceeds to the processing of step S205.

In step S204, the system control section 120 sets the reproduction device change flag to 1. Thereafter, a series of processing is terminated (return).

In step S206, the system control section 120 checks whether an operation instruction signal (ON signal) from the monitor switching button 111y is generated. Here, when the ON signal of the monitor switching button 111y is confirmed, the processing proceeds to the processing of step S204. When the ON signal of the monitor switching button 111y is not confirmed, the processing proceeds to processing of step S207.

In step S207, the system control section 120 sets the reproduction device change flag to 0. Thereafter, a series of processing is terminated (return).

In the manner described above, the reproduction device change flag in the image pickup apparatus 100 of the present embodiment is set.

Figure 19:
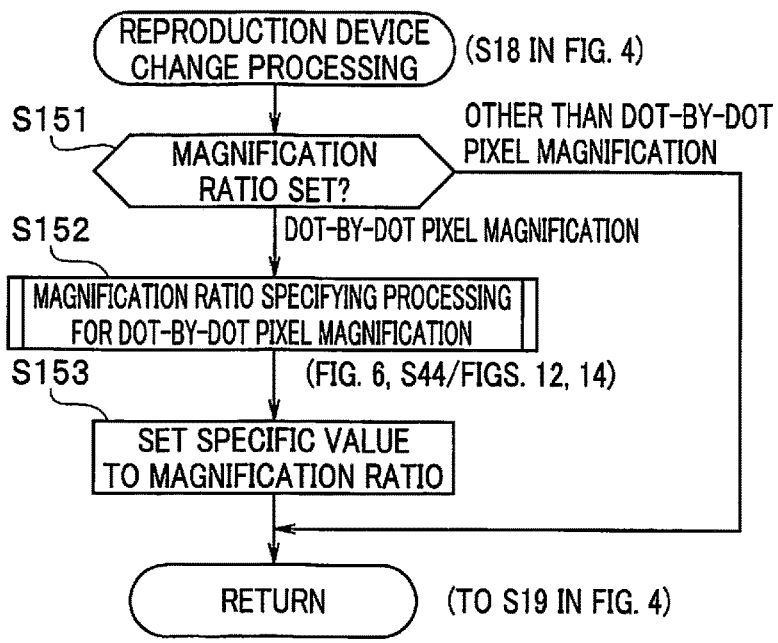
FIG. 19 is a subroutine of processing of step S18 (reproduction device change processing) of FIG. 4.

Returning to FIG. 4, in step S18, the system control section 120 executes the reproduction device change processing. FIG. 19 shows a subroutine of this reproduction device change processing.

The reproduction device change processing is the processing of executing the magnification ratio specifying processing for the dot-by-dot pixel magnification corresponding to a changed reproduction device (the processing of step S44 of FIG. 6; the subroutine of FIG. 12, FIG. 14) to specify a magnification ratio series value corresponding to the magnification ratio for the dot-by-dot pixel magnification even when an instruction for changing the reproduction device is made (step S17 in FIG. 4) during the magnifying display (step S13 in FIG. 4).

Generally, when the reproduction device is changed during magnifying display, the magnification ratio also changes at the same time. Therefore, the user often has an unnatural feeling due to the difference between a display on the reproduction device which the user has viewed just before and a display on the changed reproduction device, and eventually gets worried about occurrence of some trouble in the operation of the camera. Therefore, during magnifying display, it is preferable not to change the magnification ratio for the dot-by-dot pixel magnification in accordance with the change of the reproduction device because the unnatural feeling is suppressed and usability improves.

Particularly, when the user manually performs the operation of changing the magnification ratio, it is desirable that a user's instruction for the magnification ratio is prioritized even when an instruction for the dot-by-dot pixel magnification is given. That is, it is desirable to give priority to the magnification ratio value set manually by the user rather than the calculated and specified magnification ratio for the dot-by-dot pixel magnification. However, regardless of such processing, for example, when the reproduction device is changed, in addition to the processing of changing to the magnification ratio for the dot-by-dot pixel magnification according to the changed reproduction device, such a warning message as to clearly indicate that the magnification ratio of an image to be displayed has been changed in accordance with the change of the reproduction device or the magnification ratio of the image being displayed has also been changed on the changed reproduction device side may be explicitly displayed for the user through, for example, display of a predetermined icon. For example, by adopting a characteristic display style in which a display represented by reference sign 190c is switched to a display represented by reference sign 108d in FIG. 34 according to the change of the reproduction device from the back monitor to the EVF, the magnification ratio value at that time is clearly indicated, and a DID (dot by dot) icon indicating that the numerical value of the magnification ratio value represents the magnification ratio for the dot-by-dot pixel magnification is added or the like, the user can avoid getting confused unnecessarily and understand better, and proper use by the user is assisted.

Here, the reproduction device change processing in FIG. 19 will be described in detail. In step S151 of FIG. 19, the system control section 120 checks whether the magnification ratio has been set (step S16 in FIG. 4; FIG. 6). Here, when the setting of the magnification ratio is the dot-by-dot pixel magnification setting, the processing proceeds to processing of next step S152. When the setting of the magnification ratio is a setting other than the dot-by-dot pixel magnification setting, a series of processing is terminated, and proceeds to processing of step S19 in FIG. 4.

In step S152, the system control section 120 executes the magnification ratio specifying processing for the dot-by-dot pixel magnification for specifying the magnification ratio for the dot-by-dot pixel magnification. A subroutine of the magnification ratio specifying processing for the dot-by-dot pixel magnification will be described in detail in FIG. 12 (the processing of step S44 in FIG. 6).

Subsequently, in step S153, the system control section 120 sets an acquired specific value as a magnification ratio value under present magnifying display. Thereafter, a series of processing is terminated, and proceeds to the processing of step S19 of FIG. 4.

Note that FIGS. 20 to 23 show modifications of the subroutine of the reproduction device change processing of FIG. 19 (the processing of step S18 in FIG. 4).

Figure 20:
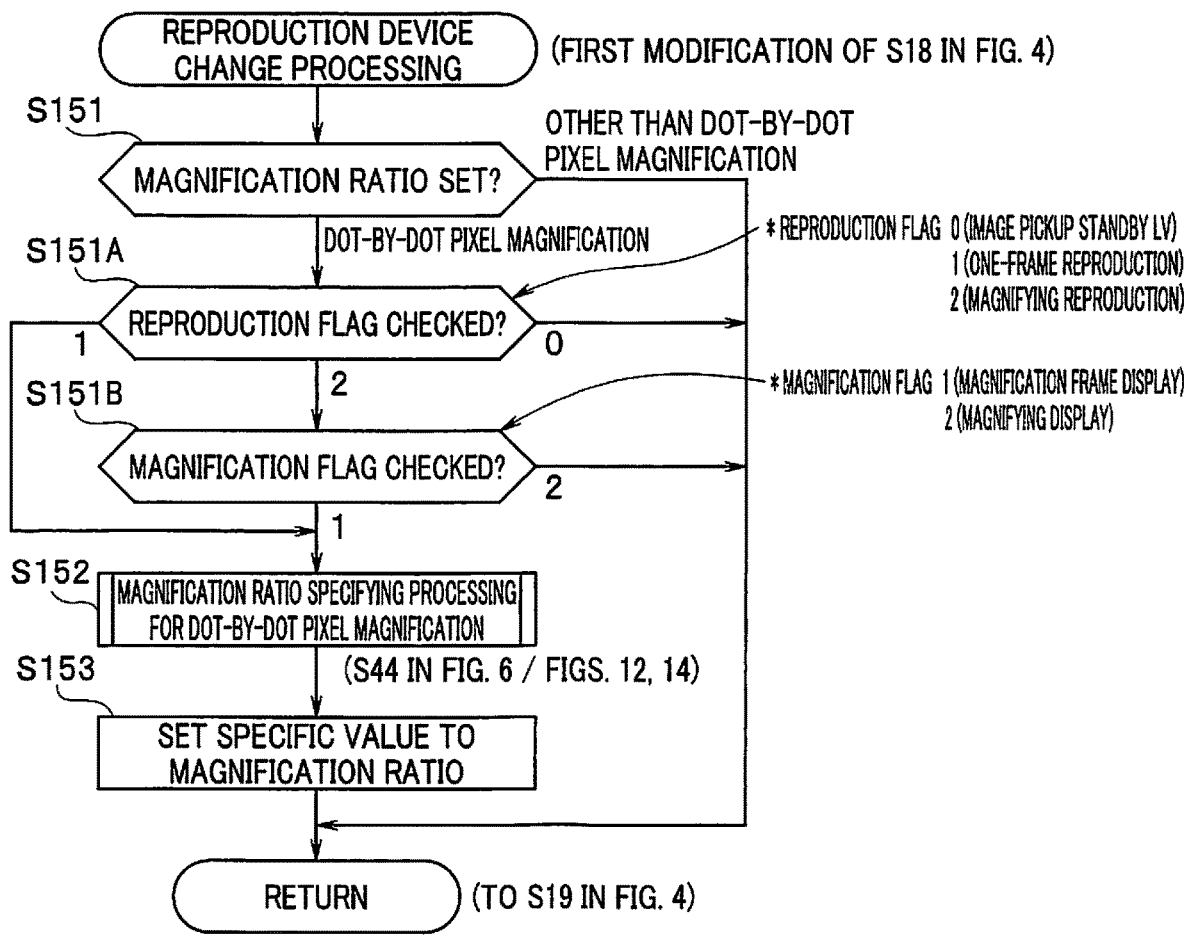
FIG. 20 is a subroutine of a first modification of the reproduction device change processing of FIG. 19.

FIG. 20 is a first modification of the subroutine of the reproduction device change processing of FIG. 19 (the processing of step S18 in FIG. 4). In the first modification, when an instruction for changing the reproduction device is given (step S17 in FIG. 4) during the magnifying display (step S13 in FIG. 4), a magnification ratio value which has been used before the change is kept as it is. As a result, even when the operation of changing the reproduction device is performed, the unnatural feeling to be given to the user can be reduced. Furthermore, the magnification ratio is kept even when the switching operation of the reproduction device is performed without user's intention because the eye sensor 110 reacts against user's intention while the back monitor 108 is in use. Accordingly, even when the user switches to the back monitor 108 again, the magnifying display at the magnification ratio which has been performed immediately before the switching can be restored. Therefore, no unnatural feeling is given to the user, and further the user is not compelled to perform a cumbersome operation of restoring to the state before the reproduction device is switched when the state before the reproduction device is switched is restored from the unintended switching operation of the reproduction device. For example, in accordance with the change of the reproduction device from the back monitor to the EVF, a display represented by reference sign 108d is switched to a display represented by reference sign 109d in FIG. 34, and the magnification ratio is still kept at 7×. Since the magnification ratio for the dot-by-dot pixel magnification of the EVF is equal to 5×, it is preferable to clearly indicate to the user that the magnification ratio is excessive due to the change of the magnification ratio display style of 7×.

The first modification of the reproduction device change processing in FIG. 20 will be described in detail. The processing of step S151 in FIG. 20 (magnification ratio setting check processing) is the same as the processing of FIG. 19. Here, when the setting of the magnification ratio is the dot-by-dot pixel magnification setting, the processing proceeds to processing of next step S151A. When the setting of the magnification ratio is a setting other than the dot-by-dot pixel magnification setting, a series of processing is terminated, and proceeds to the processing of step S19 in FIG. 4.

In step S151A, the system control section 120 executes reproduction flag check processing. Here, in the case of the reproduction flag=1 (one-frame reproduction mode), the processing proceeds to processing of step S152. In the case of the reproduction flag=2 (magnifying reproduction mode), the processing proceeds to processing of step S151B. In the case of the reproduction flag=0 (image pickup standby mode; live view (LV) display state), a series of processing is terminated, and proceeds to the processing of step S19 of FIG. 4.

In step S151B, the system control section 120 executes the magnification flag check processing. Here, in the case of the magnification flag=1, the processing proceeds to the processing of step S152. In the case of the magnification flag=2, a series of processing is terminated, and proceeds to the processing of step S19 in FIG. 4.

Note that the magnification flag is a flag indicating a display mode when magnifying display is instructed. Here, the display style in the reproduction mode of the image pickup apparatus 100 of the present embodiment is exemplified in FIG. 33.

In FIG. 33, rectangular frame lines indicated by reference signs 108A, 108B and 108C represent a display area of the display panel of the reproduction device (which is hereinafter assumed as the back monitor 108. The same is applied in the EVF 109). A state where an object 400 is displayed within the display area is exemplified.

Reference sign 108A in FIG. 33 shows an example of a normal reproduction display style. This display style is referred to as "one-frame reproduction mode". At this time, the entire image based on image data is displayed on the display panel of the reproduction device by using the entire display area. In a usual case, "one-frame reproduction mode" is displayed when the image pickup apparatus 100 is operated in the reproduction mode.

Reference sign 108B in FIG. 33 represents an example of one display style when the magnifying display is instructed. This display style is referred to as "magnification frame display style", and the magnification flag is set to 1. At this time, the entire image based on the image data is displayed on the display panel of the reproduction device by using the entire display area, and also a magnifying display frame 208w is displayed while superimposed on the image. At the same time, a magnification icon 208x representing the magnification ratio being set is displayed. For example, when the magnifying button 111x is depressed once during a display in the "one-frame reproduction mode" indicated by reference sign 108A, the display is switched to the "magnifying display frame display style". The magnifying display frame 208w is a frame display representing a magnified area when the magnifying display is performed. It is possible to move the magnifying display frame 208w upward, downward, leftward, and rightward in the display area, for example, by operating the cross button 111h during the display in the "magnifying display frame display style" indicated by reference sign 108B. Furthermore, it is possible to move the magnifying display frame 208w to a desired position within the display area by touching the display panel of the back monitor 108.

Reference sign 108C in FIG. 33 shows an example of another display style when the magnifying display is instructed. This display style is referred to as "magnifying display style", and the magnification flag is set to 2. At this time, on the display panel of the reproduction device, a partial image of an area within the magnifying display frame 208w indicated by reference sign 108B is magnified and displayed in the entire display area of the display panel. At the same time, a magnification icon 208x is also displayed with being superimposed. For example, when the magnifying button 111x is depressed once during display of "magnifying display frame display style" indicated by reference sign 108B, the display is switched to "magnifying display style". The display is also switched to "magnifying display style" by touching a part of the magnifying display frame 208w of the display panel of the back monitor 108.

Returning to FIG. 20, the processing of each of steps S152 and S153 is the same as the processing of FIG. 19 described above. Then, a series of processing is terminated, and proceeds to the processing of step S19 in FIG. 4.

Figure 21:
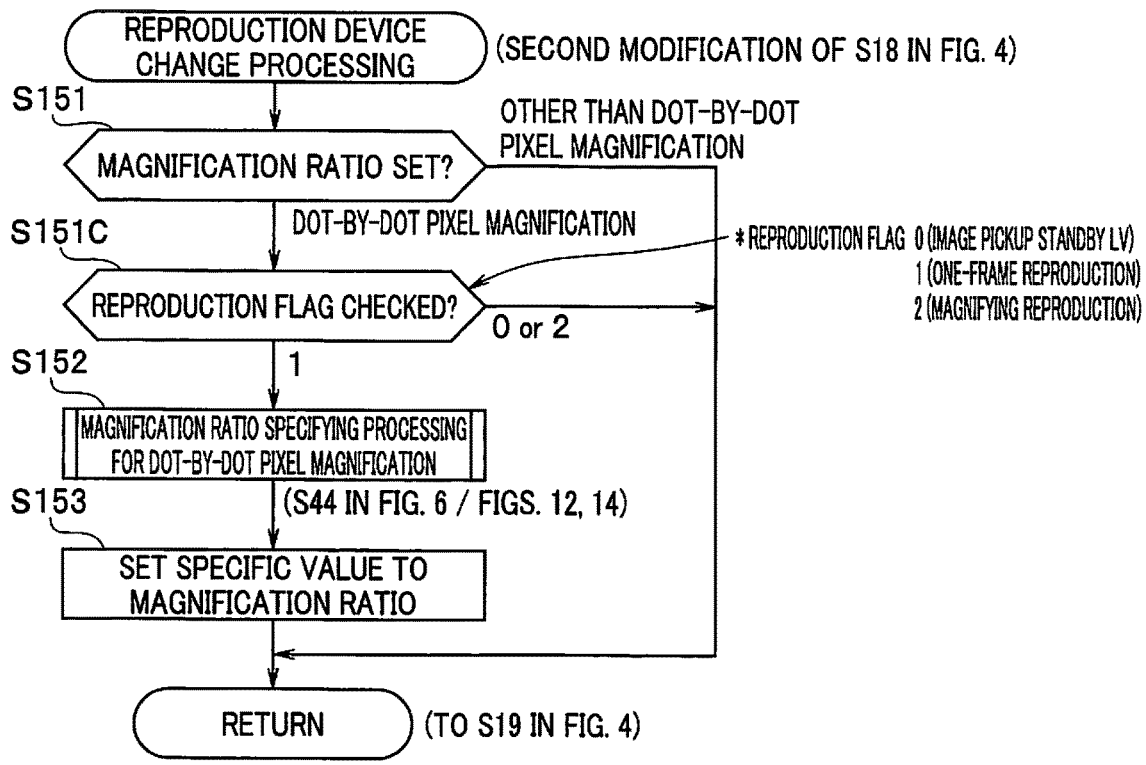
FIG. 21 is a subroutine of a second modification of the reproduction device change processing of FIG. 19.

FIG. 21 is a second modification of the subroutine of the reproduction device changing processing of FIG. 19 (the processing of step S18 in FIG. 4).

In the first modification described above, when the operation of changing the reproduction device is performed during the magnifying display, the magnification ratio is kept, and the magnification flag check is performed in step S151B of FIG. 20 to perform the return processing for the magnification flag=2 (magnifying display) or perform the magnification ratio specifying processing for the dot-by-dot pixel magnification in the case of the magnification flag=1 (magnification frame display). In this case, when an image is being displayed in the magnification frame display style, the image itself being displayed is equivalent to an image in the one-frame reproduction mode, so the magnification ratio is changed to the magnification ratio for the dot-by-dot pixel magnification, but no change is made on the actually displayed image itself.

Therefore, in the second modification, the magnification flag check processing of the first modification described above is omitted, and the return processing is also performed in the case of the reproduction flag=2 (magnifying reproduction mode).

A second modification of the reproduction device change processing of FIG. 21 will be described in detail. The processing of step S151 of FIG. 21 (magnification ratio setting check processing) is the same as the processing in FIG. 19 and FIG. 20. When the setting of the magnification ratio is the dot-by-dot pixel magnification setting, the processing proceeds to processing of next step S151C. When the setting of the magnification ratio is a setting other than the dot-by-dot pixel magnification, a series of processing is terminated, and proceeds to the processing of step S19 in FIG. 4.

In step S151C, the system control section 120 executes the reproduction flag check processing. Here, in the case of the reproduction flag=1 (one-frame reproduction mode), the processing proceeds to the processing of step S152. In the case of the reproduction flag=0 or 2 (the image pickup standby mode or the magnifying reproduction mode), a series of processing is terminated, and proceeds to the processing of step S19 of FIG. 4.

The processing of each of steps S152 and S153 is the same as the processing in FIG. 19 and FIG. 20 described above. Then, a series of processing is terminated, and proceeds to the processing of step S19 in FIG. 4.

Figure 22:
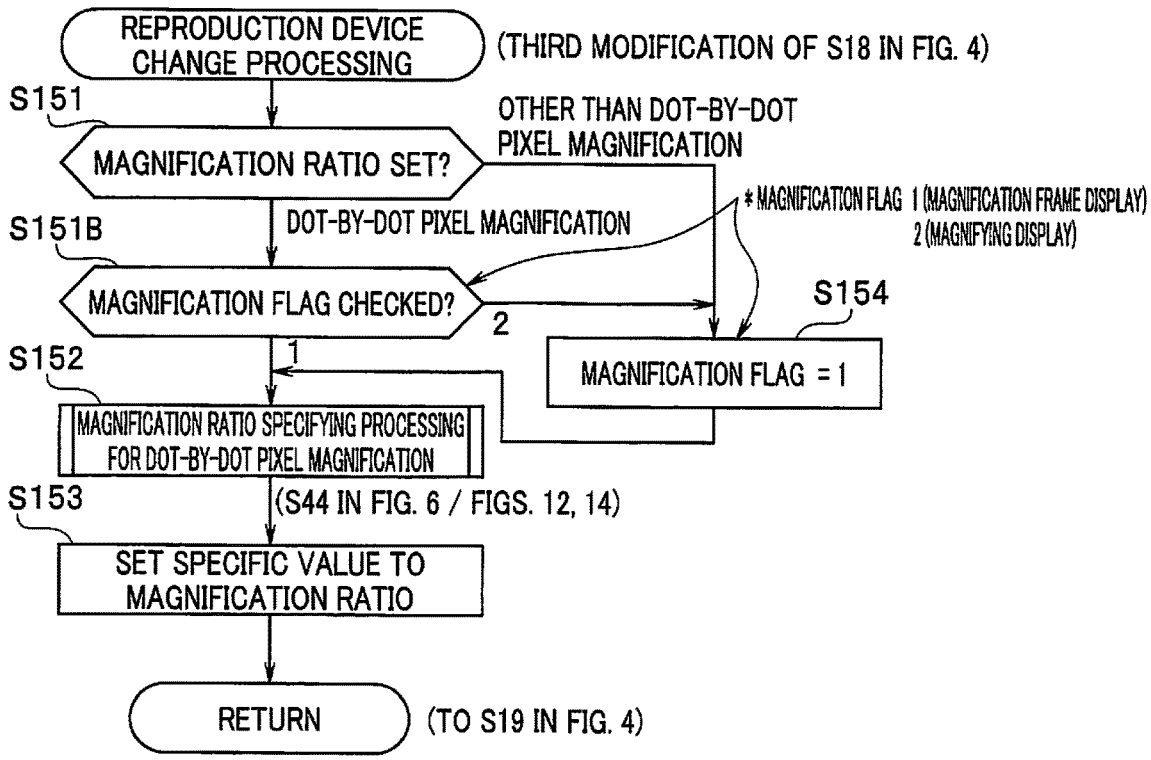
FIG. 22 is a subroutine of a third modification of the reproduction device change processing of FIG. 19.

FIG. 22 shows a third modification of the subroutine of the reproduction device change processing of FIG. 19 (the processing of step S18 in FIG. 4). The third modification executes processing of temporarily cancelling the magnifying display and returning the display style to the magnification frame display style (the image itself is displayed in a display style equivalent to the one-frame reproduction mode) when an instruction of changing the reproduction device is given (step S17 in FIG. 4) during the magnifying display (step S13 of FIG. 4). Thereafter, a magnification ratio value for the dot-by-dot pixel magnification which corresponds to the reproduction device is set.

As a result, when the changing operation of the reproduction device is performed, the magnifying display is temporarily canceled, and display is performed in the magnification frame display style in which an entire image is displayed while avoiding such display that a magnified image being displayed is switched to a magnified image to be displayed at a different magnification ratio.

The user can perform the magnifying display corresponding to the reproduction device by performing the magnifying operation using the magnifying button 111x or the like from the above state. Accordingly, it is possible to alleviate an unnatural feeling which the user suffers. Note that the reproduction flag check processing is omitted in this modification.

The third modification of the reproduction device change processing in FIG. 22 will be described in detail. The processing of step S151 in FIG. 22 (magnification ratio setting check processing) is the same as the processing in FIG. 19, FIG. 20, and FIG. 21. Here, when the setting of the magnification ratio is the dot-by-dot pixel magnification setting, the processing proceeds to processing of next step S151B. When the setting of the magnification ratio is a setting other than the dot-by-dot pixel magnification setting, the processing proceeds to processing of step S154.

In step S151B, the system control section 120 executes the magnification flag check processing. Here, in the case of the magnification flag=1 (magnification frame display), the processing proceeds to the processing of step S152. In the case of the magnification flag=2 (magnifying display), the processing proceeds to the processing of step S154.

In step S154, the system control section 120 sets the magnification flag to 1 (magnification frame display). Thereafter, the processing proceeds to the processing of step S152.

The processing of each of steps S152 and S153 is the same as the processing of FIGS. 19, 20, and 21 described above. Then, a series of processing is terminated, and proceeds to the processing of step S19 in FIG. 4.

Figure 23:
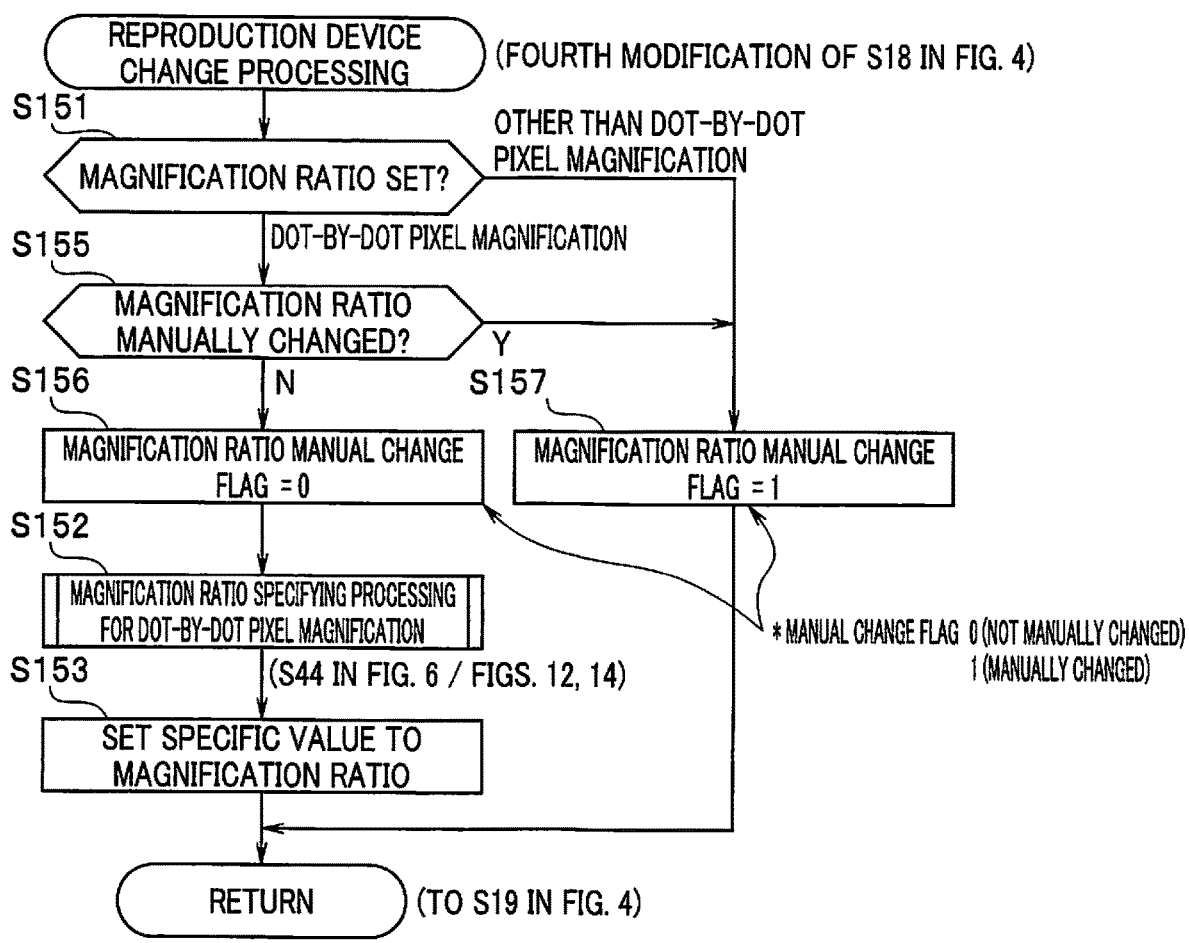
FIG. 23 is a subroutine of a fourth modification of the reproduction device change processing of FIG. 19.

FIG. 23 shows a fourth modification of the subroutine of the reproduction device change processing of FIG. 19 (the processing of step S18 in FIG. 4). In the fourth modification, when the manually changing operation of the magnification ratio is performed in the reproducing operation, processing for keeping the set magnification ratio value is performed without performing the magnification ratio specifying processing for the dot-by-dot pixel magnification. Therefore, even when an instruction to change the reproduction device is given (step S17 in FIG. 4) during the magnifying display (step S13 in FIG. 4), the set magnification ratio value is maintained.

The fourth modification of the reproduction device change processing of FIG. 23 will be described in detail. The processing of step S151 in FIG. 23 (magnification ratio setting check processing) is the same as the processing in FIGS. 19, 20, 21, and 22. Here, when the setting of the magnification ratio is the dot-by-dot pixel magnification setting, the processing proceeds to processing of next step S155. When the setting of the magnification ratio is a setting other than the dot-by-dot pixel magnification setting, the processing proceeds to processing of step S157.

In step S155, the system control section 120 checks whether the magnification ratio changing operation has been manually performed. Here, when the magnification ratio manually changing operation is confirmed, the processing proceeds to the processing of step S157. When the magnification ratio manually changing operation is not confirmed, the processing proceeds to the processing of step S156.

In step S156, the system control section 120 sets the magnification ratio manual change flag to 0 (no change). Thereafter, the processing proceeds to the processing of step S152.

In step S157, the system control section 120 sets the magnification ratio manual change flag to 1 (change). Thereafter, a series of processing is terminated, and proceeds to the processing of step S19 in FIG. 4.

The processing of each of steps S152 and S153 is the same as the processing in FIGS. 19, 20, 21, and 22 described above. Then, a series of processing is terminated, and proceeds to the processing of step S19 in FIG. 4.

Returning to FIG. 4, in step S19, the system control section 120 sets the reproduction device change flag to 0.

Subsequently, in step S20, the system control section 120 checks whether a frame advance operation or a frame return operation has been performed. Here, the frame advance operation or the frame return operation corresponds to, for example, an operation of the right or left button of the cross button 111h, a rotating operation of the operation dial 111i, an operation of touching or sliding to a right or left area of the touch panel on the display panel of the back monitor 108, etc. during image display on the reproduction devices (108, 109).

In this case, a predetermined instruction signal generated by operating these operation members (the right and left buttons of the cross button 111h, the operation dial 111i, the touch panel) is transmitted to the system control section 120, and upon reception of the predetermined instruction signal, the system control section 120 performs change control of an image to be transmitted to (displayed on) one of the two display devices. That is, the right and left buttons of the cross button 111h, the operation dial 111i, the touch panel, and the system control section 120 are operation members for instructing change of an image as a transmission target to be transmitted to the reproduction device, and function as a transmission image changing section.

When the frame advance operation or the frame return operation is confirmed in the processing of step S20, the processing proceeds to processing of next step S21. When neither the frame advance operation nor the frame return operation is confirmed, a series of processing is terminated, and proceeds to the processing of step S4 in FIG. 3.

Subsequently, in step S21, the system control section 120 executes reproduction frame change processing. A subroutine of the reproduction frame change processing will be described in detail with reference to FIG. 24.

In the reproduction frame change processing, even when an instruction for changing a reproduction frame is given (step S20 in FIG. 4) during the magnifying display (step S13 in FIG. 4), the magnification ratio specifying processing for the dot-by-dot pixel magnification corresponding to a changed reproduction frame (the processing of step S44 in FIG. 6; the subroutines of FIG. 12, FIG. 14) is performed, thereby performing processing of specifying a magnification ratio series value corresponding to the magnification ratio for the dot-by-dot pixel magnification.

That is, in this case, the system control section 120 functions as a magnification ratio instructing section for changing the magnification ratio for the dot-by-dot pixel magnification (first magnification ratio) to the magnification ratio series value (second magnification ratio) according to the change of the transmission target image and indicating the magnification ratio of the display target image.

Here, the system control section 120 as the magnification ratio indicating section executes processing of selecting one magnification ratio corresponding to the magnification ratio for the dot-by-dot pixel magnification (the first magnification ratio) from plural magnification ratios contained in the magnification ratio series (the second magnification ratios).

In general, when the reproduction frame is changed during the magnifying display, the magnification ratio may change frame by frame according to the setting of the image size, the image quality mode or the like in the image pickup operation. Therefore, the user may get worried due to the difference between a display image which the user has viewed just before and a display image of a reproduction frame which has been changed by the display image changing operation (frame advance operation or frame return operation). Therefore, in order to eliminate such an unnatural feeling or anxiety, for example, a warning message or the like indicating the above matter may be displayed when the magnification ratio is changed due to a frame change.

Here, the reproduction frame change processing of FIG. 24 will be described in detail. In step S161 of FIG. 24, the system control section 120 checks whether setting of the magnification ratio has been performed (step S16 in FIG. 4; FIG. 6). When the setting of the magnification ratio is the dot-by-dot pixel magnification setting, the processing proceeds to processing of next step S162. When the setting of the magnification ratio is a setting other than the dot-by-dot pixel magnification setting, the series of processing is terminated, and proceeds to the processing of step S4 in FIG. 3

In step S162, the system control section 120 executes the magnification ratio specifying processing for the dot-by-dot pixel magnification for specifying the magnification ratio for the dot-by-dot pixel magnification. A subroutine of this magnification ratio specifying processing for the dot-by-dot pixel magnification is the same as the subroutine described with reference to FIG. 12 (the processing of step S44 in FIG. 6).

Subsequently, in step S163, the system control section 120 sets the acquired specific value as a magnification ratio value for present magnifying display. Thereafter, a series of processing is terminated, and proceeds to the processing of step S4 in FIG. 3.

Figure 24:
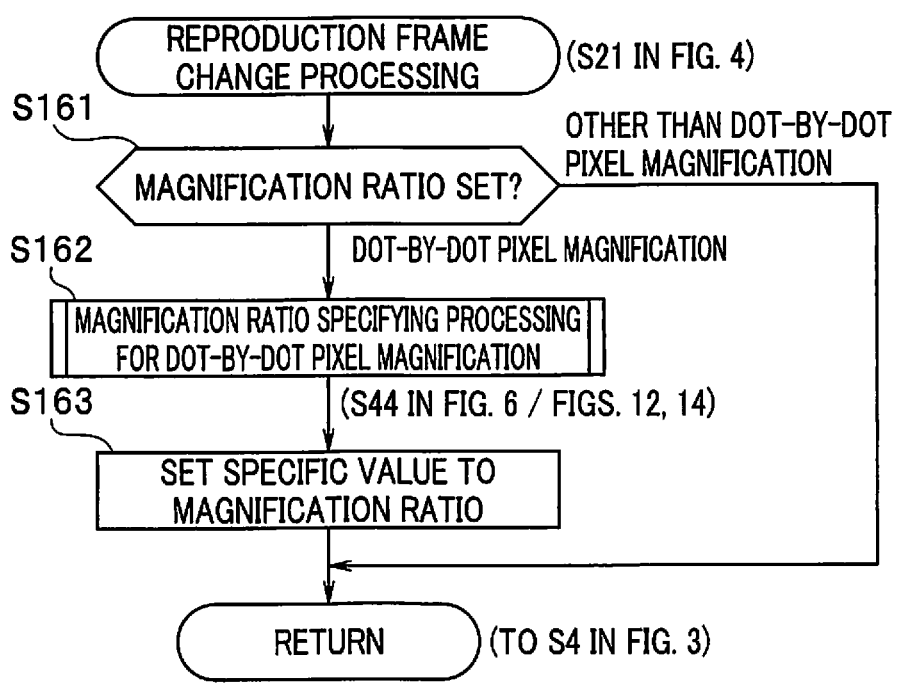
FIG. 24 is a subroutine of processing of step S21 (reproduction frame change processing) of FIG. 4.
Figure 25:
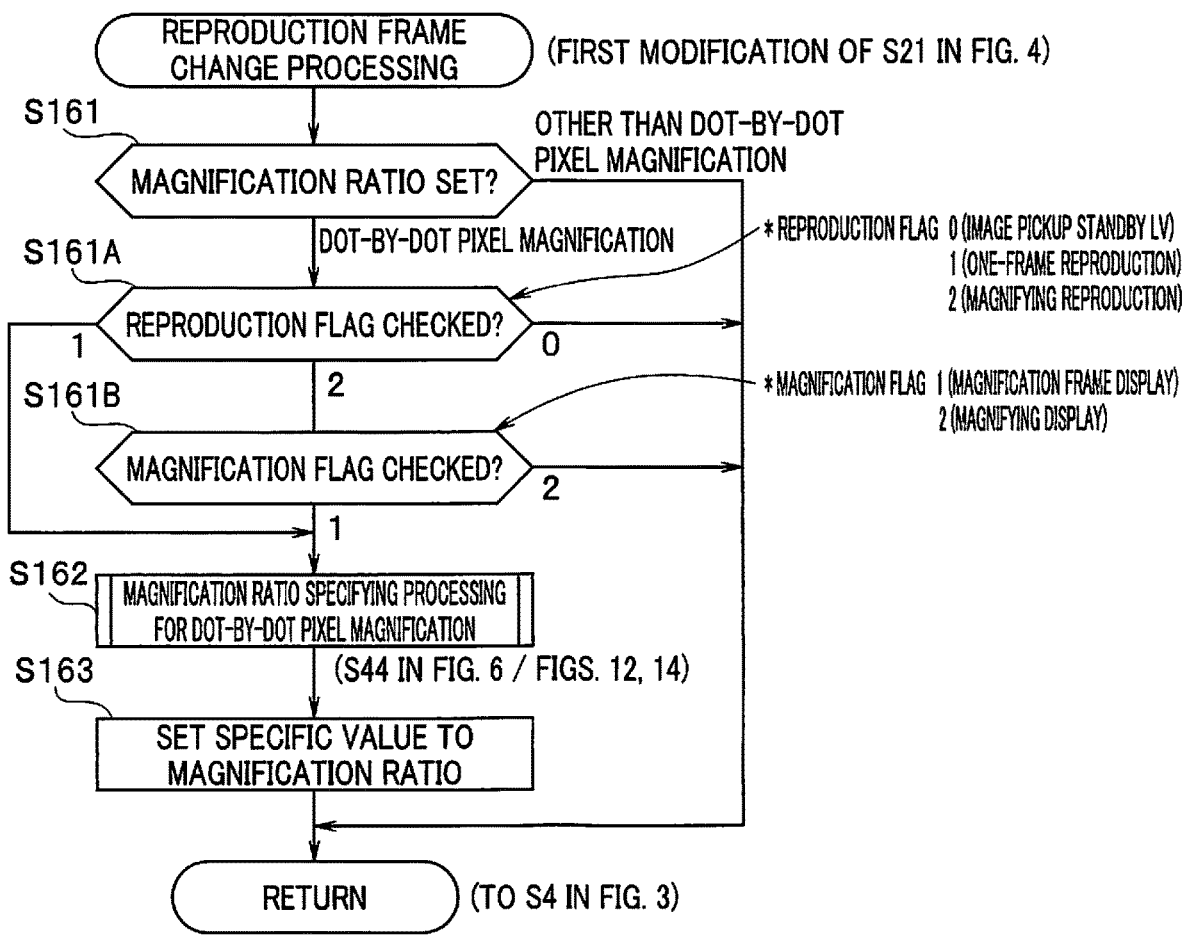
FIG. 25 is a subroutine of a first modification of the reproduction frame change processing of FIG. 24.
Figure 26:
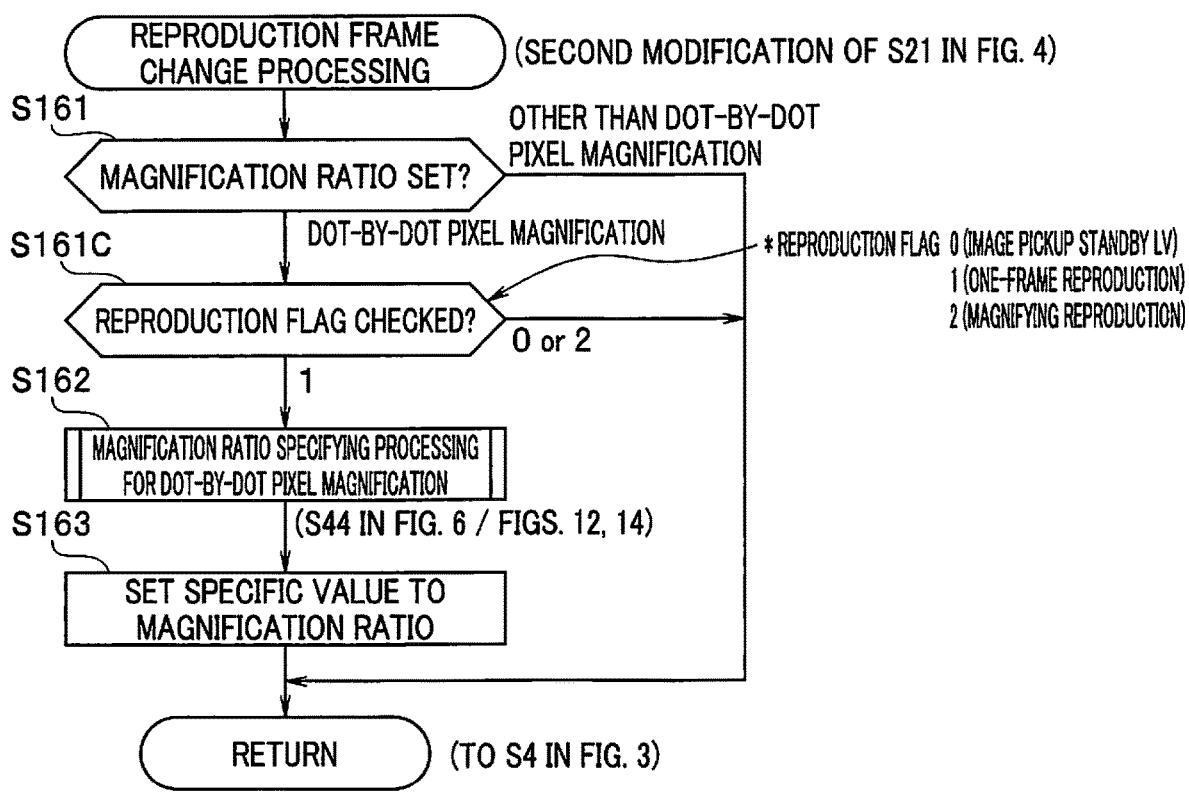
FIG. 26 is a subroutine of a second modification of the reproduction frame change processing of FIG. 24.
Figure 27:
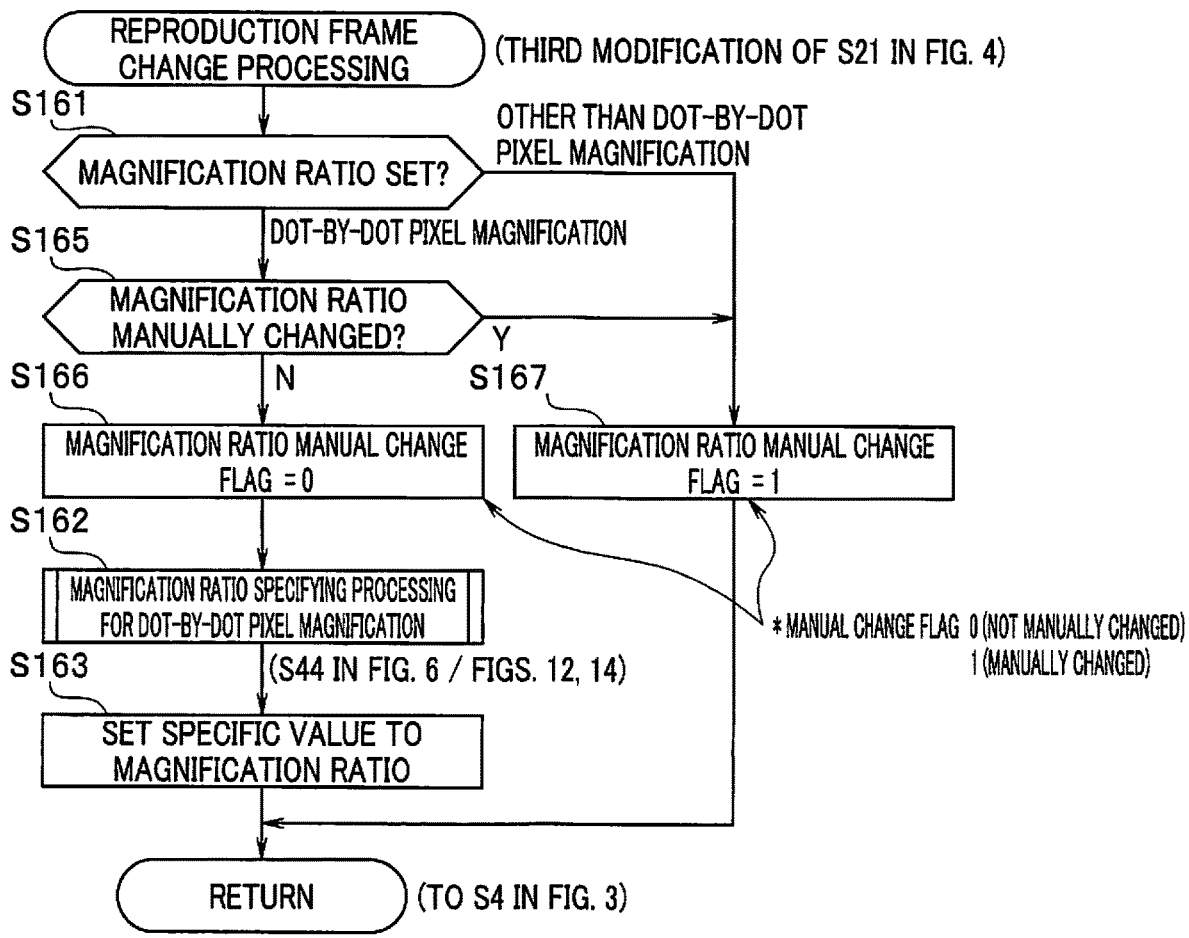
FIG. 27 is a subroutine of a third modification of the reproduction frame change processing of FIG. 24.

FIGS. 25 to 27 show modifications of the subroutine of the reproduction frame change processing in FIG. 24 (the processing of step S21 in FIG. 4).

FIG. 25 shows a first modification of the subroutine of the reproduction frame change processing of FIG. 24 (the processing of step S21 in FIG. 4). In the first modification, when an instruction for changing the reproduction frame is given (step S20 in FIG. 4) during the magnifying display (step S13 in FIG. 4), the magnification ratio value before the change is kept as it is. This makes it possible to mitigate the unnatural feeling given to the user even when the reproduction frame changing operation is performed.

The first modification of the reproduction frame change processing in FIG. 25 will be described in detail. The processing of step S161 in FIG. 25 (magnification ratio setting check processing) is the same as the processing in FIG. 24. When the setting of the magnification ratio is the dot-by-dot pixel magnification setting, the processing proceeds to processing of next step S161A. When the setting of the magnification ratio is a setting other than the dot-by-dot pixel magnification setting, a series of processing is terminated, and proceeds to the processing of step S4 in FIG. 3.

In step S161A, the system control section 120 executes the reproduction flag check processing. Here, in the case of the reproduction flag=1 (one-frame reproduction mode), the processing proceeds to the processing of step S162. In the case of the reproduction flag=2 (magnifying reproduction mode), the processing proceeds to processing of step S161B. In the case of the reproduction flag=0 (image pickup standby mode; live view (LV) display state), a series of processing is terminated, and proceeds to the processing of step S4 of FIG. 3.

In step S161B, the system control section 120 executes the magnification flag check processing. In the case of the magnification flag=1, the processing proceeds to the processing of step S162. In the case of the magnification flag=2, a series of processing is terminated, and proceeds to the processing of step S4 in FIG. 3.

The processing in each of steps S162 and S163 is the same as the processing in FIG. 24 described above. A series of processing is terminated, and proceeds to the processing of step S4 in FIG. 3.

FIG. 26 shows a second modification of the subroutine of the reproduction frame change processing of FIG. 24 (the processing of step S21 in FIG. 4). In the second modification, the magnification flag check processing of the first modification described above is omitted, and the return processing is also performed in the case of the reproduction flag=2 (magnifying reproduction mode).

The second modification of the reproduction frame change processing in FIG. 26 will be described in detail. The processing of step S161 in FIG. 26 (magnification ratio setting check processing) is the same as the processing in FIGS. 24 and 25. When the setting of the magnification ratio is the dot-by-dot pixel magnification setting, the processing proceeds to processing of next step S161C. If the setting of the magnification ratio is a setting other than the dot-by-dot pixel magnification setting, a series of processing is terminated, and proceeds to the processing of step S4 in FIG. 3.

In step S161C, the system control section 120 executes the reproduction flag check processing. In the case of the reproduction flag=1 (one-frame reproduction mode), the processing proceeds to the processing of step S162. In the case of the reproduction flag=0 or 2 (image pickup standby mode or magnifying reproduction mode), a series of processing is terminated, and proceeds to the processing of step S4 in FIG. 3.

The processing of each of steps S162 and S163 is the same as the processing in FIGS. 24 and 25 described above. A series of processing is terminated, and proceeds to the processing of step S4 in FIG. 3.

FIG. 27 shows a third modification of the subroutine of the reproduction frame change processing of FIG. 24 (the processing of step S21 in FIG. 4). In the third modification, when the manually changing operation of the magnification ratio is performed in the reproducing operation, processing for keeping the set magnification ratio value is performed without performing the magnification ratio specifying processing for the dot-by-dot pixel magnification. Accordingly, even when an instruction to change the reproduction frame is given (step S20 in FIG. 4) during the magnifying display (step S13 in FIG. 4), the set magnification ratio value is maintained.

The third modification of the reproduction frame change processing of FIG. 27 will be described in detail. The processing of step S161 in FIG. 27 (magnification ratio setting check processing) is the same as the processing in FIGS. 24, 25, and 26. When the setting of the magnification ratio is the dot-by-dot pixel magnification setting, the processing proceeds to processing of next step S165. When the setting of the magnification ratio is a setting other than the dot-by-dot pixel magnification setting, the processing proceeds to processing of step S167.

In step S165, the system control section 120 checks whether the magnification ratio changing operation has been performed manually. Here, when the magnification ratio manually changing operation is confirmed, the processing proceeds to processing of step S167. When the magnification ratio manually changing operation is not confirmed, the processing proceeds to processing of step S166.

In step S166, the system control section 120 sets magnification ratio manual change flag to 0 (no change). Thereafter, the processing proceeds to the processing of step S162.

In step S167, the system control section 120 sets magnification ratio manual change flag to 1 (change). Thereafter, a series of processing is terminated, and proceeds to the processing of step S4 in FIG. 3.

The processing of each of steps S162 and S163 is the same as the processing in FIGS. 24, 25, and 26 described above. A series of processing is terminated, and proceeds to the processing of step S4 in FIG. 3.

Figure 7:
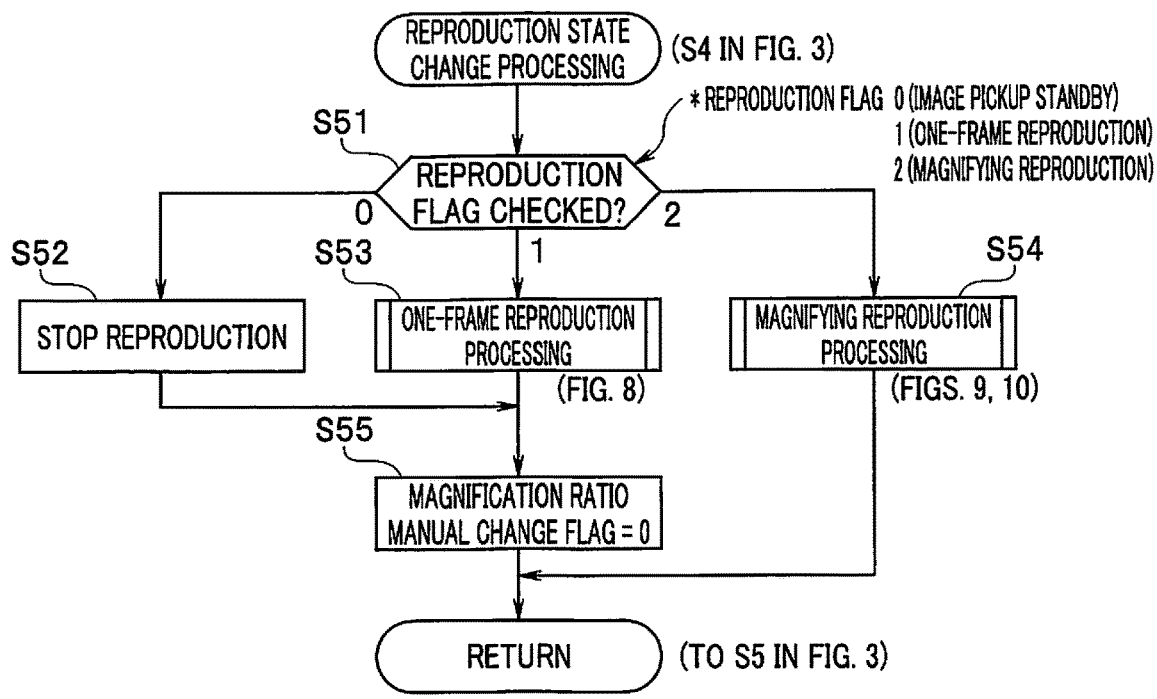
FIG. 7 is a subroutine of processing of step S4 (reproduction state change processing) of FIG. 3.

Returning to FIG. 3, when the processing proceeds to the processing of step S4 as described above, the system control section 120 executes reproduction state change processing in step S4. FIG. 7 shows a subroutine of the reproduction state change processing. This reproduction state change processing changes the reproduction state based on the flag generated in the reproduction operation flag processing (FIG. 4). That is, the reproduction state change processing is processing for realizing a reproduction state according to a set reproduction flag and a magnification flag.

Briefly describing, the reproduction is stopped in the case of the reproduction flag=0, and the processing returns to the image pickup standby state where live view display is performed. In the case of the reproduction flag=1, a specified image frame is reproduced on a specified display device at a magnification ratio of 1×. In the case of the reproduction flag=2 and the magnification flag=1, the specified image frame is reproduced on the specified display device at a magnification ratio of 1×, and a magnifying display frame corresponding to a specified magnification ratio is displayed while superimposed on the specified image frame. In the case of the reproduction flag=2 and the magnification flag=2, the specified image frame is cut out, magnified and displayed at the specified magnification ratio.

Here, the subroutine of the reproduction state change processing will be described below in detail with reference to FIG. 7.

In step S51 of FIG. 7, the system control section 120 executes the reproduction flag check processing. Here, in the case of the reproduction flag=0 (image pickup standby), the processing proceeds to processing of step S52. In the case of the reproduction flag=1 (one-frame reproduction), the processing proceeds to processing of step S53. In the case of the reproduction flag=2 (magnifying reproduction), the processing proceeds to processing of step S54.

In step S52, the system control section 120 confirms that the reproduction device is in a reproduction stop state, and proceeds to processing of step S55. In step S55, the system control section 120 resets the magnification ratio manual change flag (sets the magnification ratio manual change flag=0). Thereafter, a series of processing is terminated, and proceeds to the processing of step S5 in FIG. 3.

Figure 8:
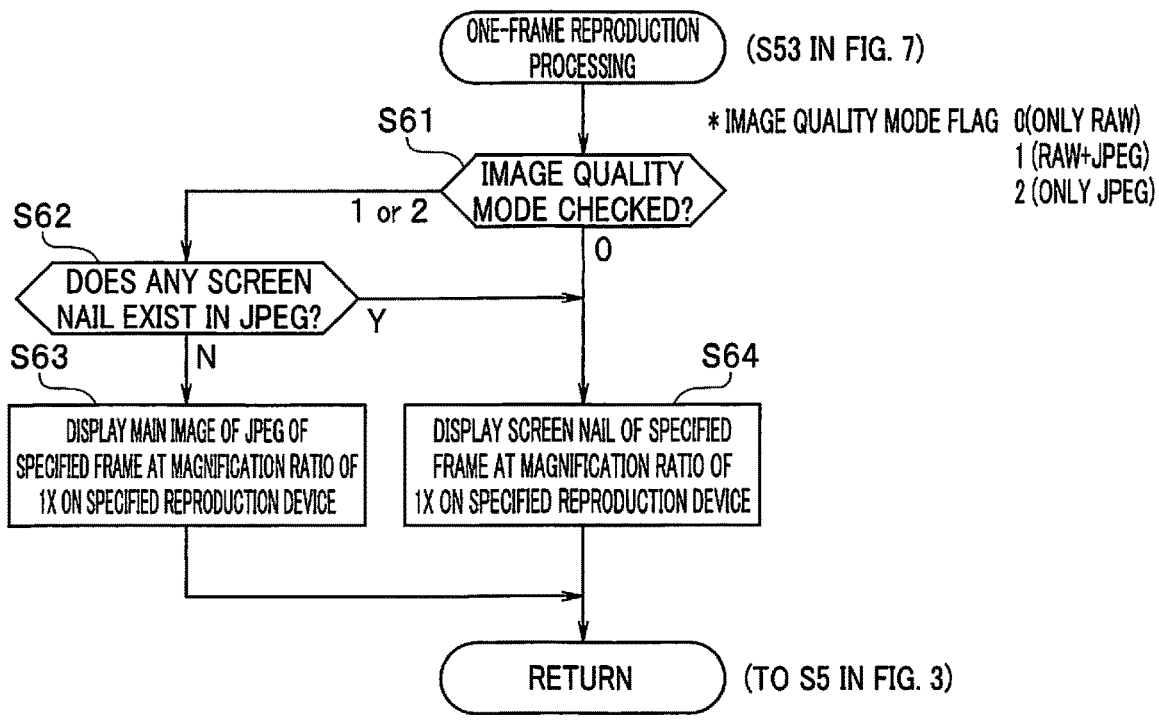
FIG. 8 is a subroutine of processing of step S53 (one frame reproducing processing) of FIG. 7.

In step S53, the system control section 120 executes one frame reproduction processing. A subroutine of the one-frame reproduction processing is shown in FIG. 8, and will be described in detail later. Thereafter, the processing proceeds to processing of step S55. In step S55, the system control section 120 resets the magnification ratio manual change flag (sets the magnification ratio manual change flag to 0). Thereafter, a series of processing is terminated, and proceeds to the processing of step S5 in FIG. 3.

Figure 9:
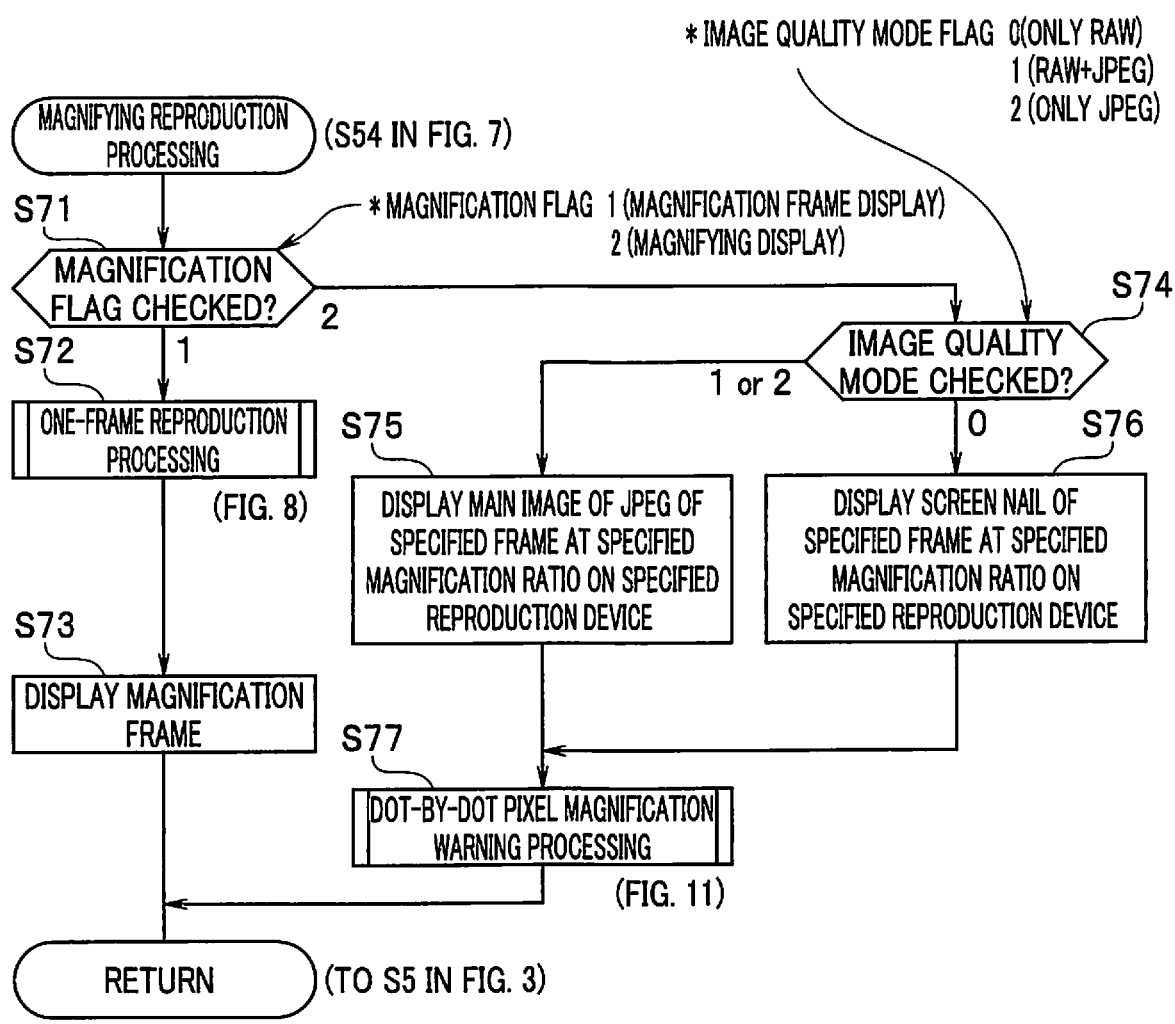
FIG. 9 is a subroutine of processing of step S54 (magnifying reproduction processing) of FIG. 7.

In step S54, the system control section 120 executes magnification reproduction processing. A subroutine of this magnifying reproduction processing is shown in FIG. 9, and will be described in detail later. Thereafter, a series of processing is terminated, and proceeds to the processing of step S5 in FIG. 3.

Here, the one-frame reproduction processing (the processing of step S53 in FIG. 7) will be described in detail with reference to FIG. 8.

High-speed display and a high-speed frame advance/frame return operation are desired for the one-frame reproduction. For this purpose, it is desirable that image data to be subjected to the reproduction display processing is small. Generally, with respect to image data that are recorded in the image quality mode based on only JPEG images, a screen nail image (JPEG image for display check) smaller than the main image may be contained in the image data when a main image of the image data is large (in the case of large setting or the like). With respect to image data that are recorded in the image quality mode based on RAW images, a similar screen nail image is also generally contained in the image data. Accordingly, when the image quality mode is based on JPEG images and the main image is large, processing for displaying a screen nail image is performed for RAW images or the like. When the image quality mode is based on RAW image+JPEG image, the JPEG image is preferentially displayed as a display image.

In step S61 of FIG. 8, the system control section 120 executes image quality mode check processing. Here, in the case of the image quality mode flag=0 (only RAW image), the processing proceeds to processing of step S64. In the case of the image quality mode flag=1 (RAW+JPEG images), or in the case of the image quality mode flag=2, the processing proceeds to processing of step S62.

In step S62, the system control section 120 checks whether a screen nail image appended to a JPEG image exists. Here, when a screen nail image exists, the processing proceeds to processing of step S64. When no screen nail image exists, the processing proceeds to the processing of step S63.

In step S63, the system control section 120 displays a main image of a JPEG image of an image frame specified to be reproduced at a magnification ratio setting of 1× (one-frame reproduction), by using a specified reproduction device. Thereafter, a series of processing is terminated, and proceeds to the processing of step S5 in FIG. 3.

In step S64, the system control section 120 displays a screen nail image of an image frame specified to be reproduced at a magnification ratio setting of 1× (one-frame reproduction) by using a specified reproduction device. Thereafter, a series of processing is terminated, and proceeds to the processing of step S5 in FIG. 3.

Next, the magnifying reproduction processing (the processing of step S54 in FIG. 7) will be described in detail with reference to FIG. 9.

In step S71 of FIG. 9, the system control section 120 executes the magnification flag check processing. Here, in the case of the magnification flag=1, the processing proceeds to processing of step S72. In the case of the magnification flag=2, the processing proceeds to processing of step S74.

In step S72, the system control section 120 executes the one-frame reproduction processing (FIG. 8; the processing of step S53 of FIG. 7).

Subsequently, in step S73, the system control section 120 displays a magnification frame. Thereafter, a series of processing is terminated, and proceeds to the processing of step S5 in FIG. 3.

In step S74, the system control section 120 executes the image quality mode check processing. Here, in the case of the image quality mode flag=0 (only RAW image), the processing proceeds to processing of step S76. In the case of the image quality mode flag=1 (RAW+JPEG image) or in the case of the image quality mode flag=2, the processing proceeds to processing of step S75.

In step S75, the system control section 120 displays a main image of a JPEG image of an image frame specified to be reproduced at a specified magnification ratio setting by using a specified reproduction device. Thereafter, the processing proceeds to processing of step S77.

In step S76, the system control section 120 displays a screen nail image of an image frame specified to be reproduced at a specified magnification ratio setting by using a specified reproduction device. Thereafter, the processing proceeds to processing of step S77.

Figure 11:
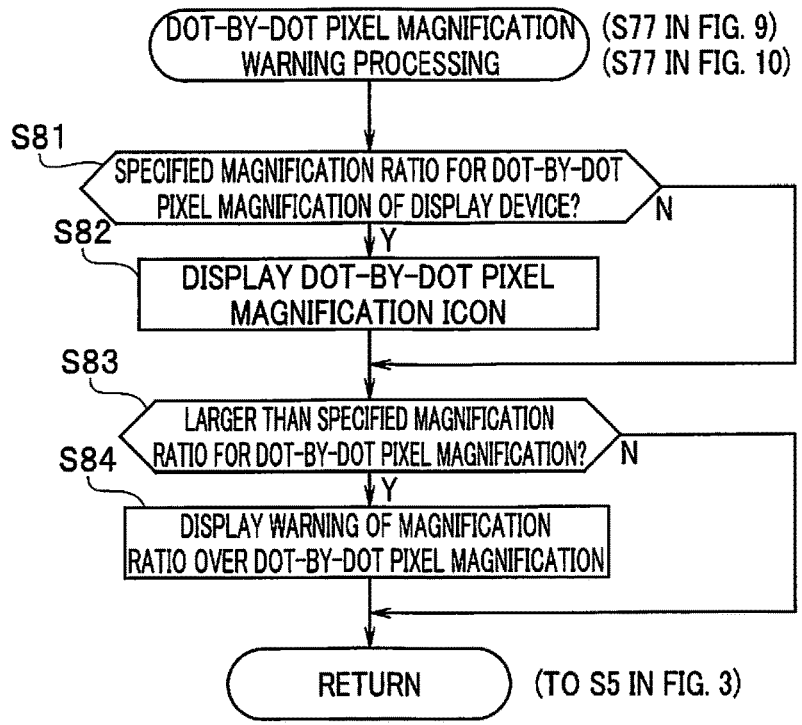
FIG. 11 is a subroutine of processing of step S77 (dot-by-dot pixel magnification warning processing) of FIG. 10.

In step S77, the system control section 120 executes dot-by-dot pixel magnification warning processing. A subroutine of the dot-by-dot pixel magnification warning processing is shown in FIG. 11, and will be described in detail later. Thereafter, a series of processing is terminated, and proceeds to the processing of step S5 in FIG. 3.

Note that the dot-by-dot pixel magnification warning processing is processing of displaying a warning indicating that an image to be magnified and reproduced is displayed at a magnification ratio for the dot-by-dot pixel magnification (first magnification ratio) or a magnification ratio near to the former magnification ratio, or magnified and displayed beyond the magnification ratio for the dot-by-dot pixel magnification (first magnification ratio) for a specified preproduction device. In this case, the dot-by-dot pixel magnification warning processing is mainly executed by the system control section 120. As a result, the system control section 120 functions as a warning section for warning that the magnification ratio is the first magnification ratio or warning that the magnification ratio is a magnification ratio larger than the first magnification ratio.

Figure 10:
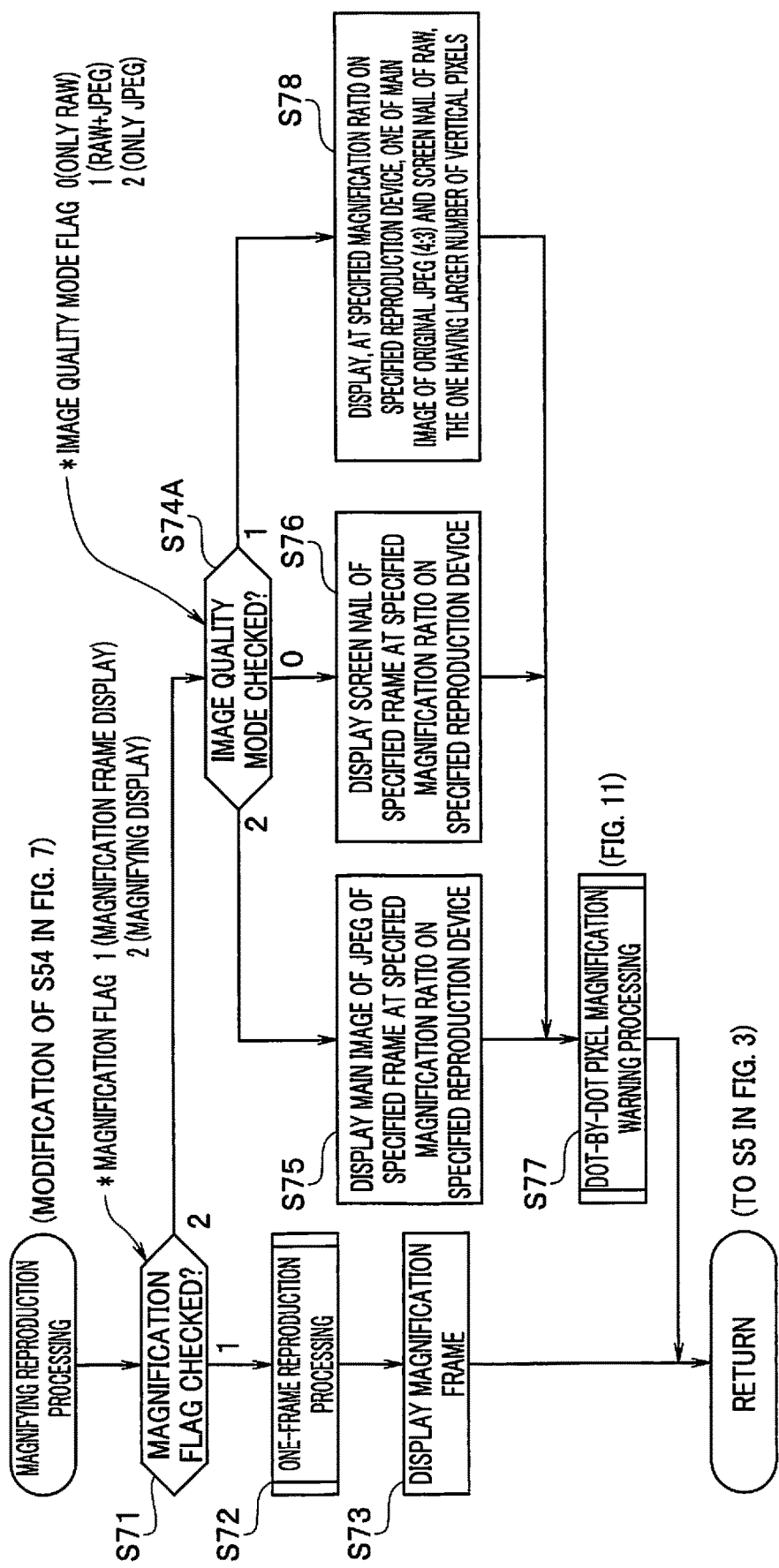
FIG. 10 is a subroutine of a modification of the magnifying reproduction processing of FIG. 9.

FIG. 10 shows a modification of the magnifying reproduction processing of FIG. 9 (the processing of step S54 in FIG. 7). This modification slightly differs in the processing of the image quality mode check.

The modification of the magnifying reproduction processing in FIG. 10 will be described in detail. Processing in steps S71 to S73 in FIG. 10 is the same as the processing in FIG. 9.

When the processing proceeds to processing of step S74A in the case of the magnification flag=2 in the magnification flag check processing of step S71, the system control section 120 executes the image quality mode check processing in step S74A. The image quality mode check processing of this modification is the same as the processing in FIG. 9 in that the processing proceeds to the processing of step S76 in the case of the image quality mode flag=0 (only RAW image), and is also the same as the processing in FIG. 9 in that the processing proceeds to the processing of step S75 in the case of the image quality mode flag=2. Here, the processing in steps S75 and S76 is the same as the processing in FIG. 9. Thereafter, the processing proceeds to processing of step S77. The processing of step S77 is also the same as the processing in FIG. 9.

In this modification, the processing proceeds in step S74A to processing of step S78 in the case of the image quality mode flag=1 (RAW+JPEG image).

In step S78, the system control section 120 displays one of a main image of a JPEG image (4:3) and a screen nail of an RAW image at a specified magnification ratio setting by using a specified reproduction device, the one having a larger number of vertical pixels between the number of vertical pixels of the main image of the JPEG image and the number of vertical pixels of the screen nail of the RAW image. Thereafter, the processing proceeds to the processing of step S77 (FIG. 11).

When the processing of step S77 is completed, a series of processing is terminated, and proceeds to the processing of step S5 of FIG. 3.

Here, the subroutine of the dot-by-dot pixel magnification warning processing in FIG. 11 (the processing of step S77 in FIGS. 9 and 10) will be described below in detail with reference to FIG. 11.

In step S81 of FIG. 11, the system control section 120 checks whether a specified magnification ratio is a magnification ratio for the dot-by-dot pixel magnification corresponding to a display device (or a magnification ratio near to the magnification ratio for the dot-by-dot pixel magnification). Here, when it is confirmed that the magnification ratio for the dot-by-dot pixel magnification of the display device is equal to a specific magnification ratio, the processing proceeds to processing of step S82. When it is confirmed that the magnification ratio for the dot-by-dot pixel magnification of the display device is not the specific magnification ratio, the processing proceeds to processing of step S83.

In step S82, the system control section 120 displays a predetermined icon or the like indicating that an image is displayed at the dot-by-dot pixel magnification (referred to as a dot-by-dot pixel magnification icon) while the predetermined icon or the like is superimposed on the image being displayed. Thereafter, the processing proceeds to the processing of step S83.

In step S83, the system control section 120 checks whether the magnification ratio for the dot-by-dot pixel magnification is larger than the specified magnification ratio. Here, when the magnification ratio for the dot-by-dot pixel magnification is larger than the specific magnification ratio, the processing proceeds to processing of step S84. When the magnification ratio for the dot-by-dot pixel magnification is not larger than (equal to or smaller than) the specific magnification ratio, a series of processing is terminated and proceeds to the processing of step S5 in FIG. 3.

In step S84, the system control section 120 displays a warning indicating that the specified magnification ratio exceeds the magnification ratio for the dot-by-dot pixel magnification. Thereafter, a series of processing is terminated, and proceeds to the processing of step S5 in FIG. 3.

Figure 34:
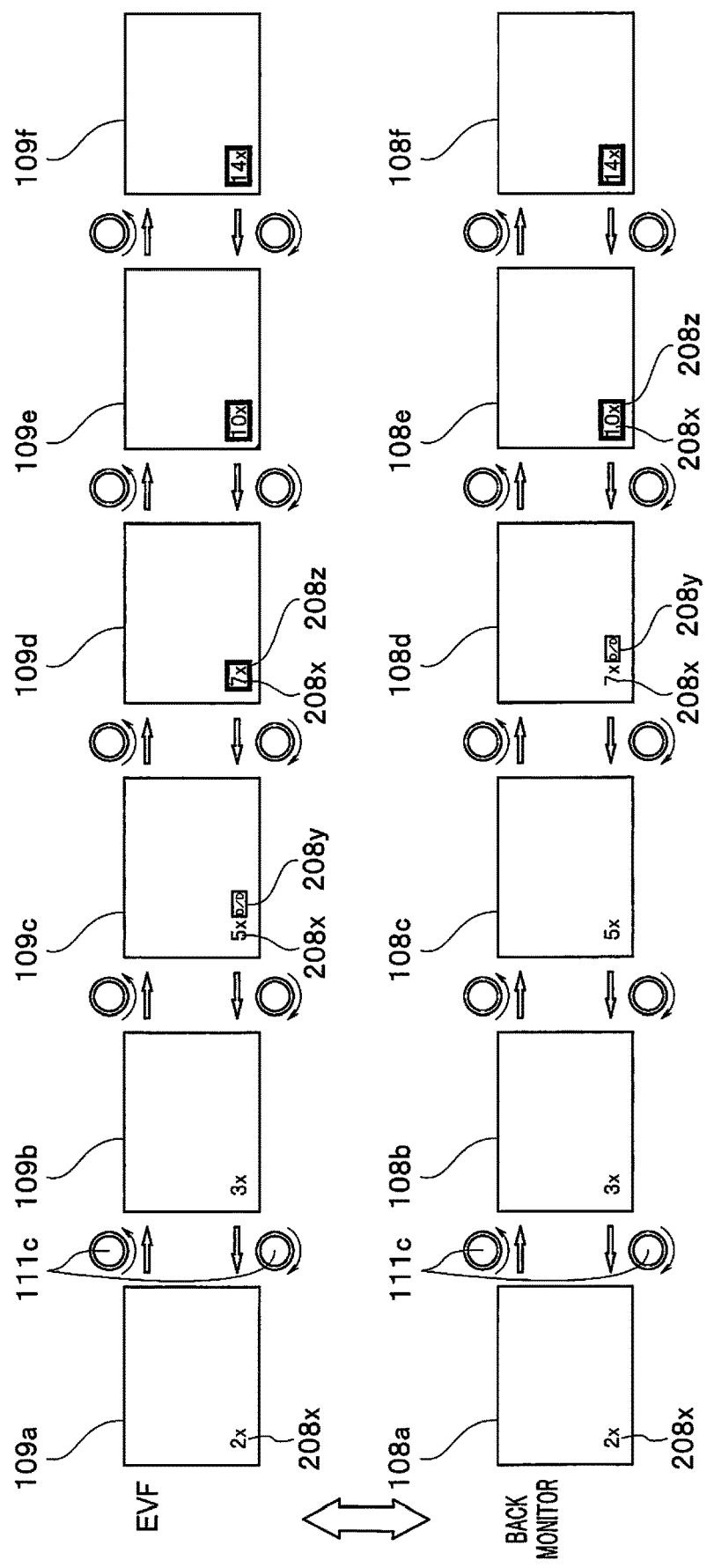
FIG. 34 shows display examples of a dot-by-dot pixel magnification icon and a warning display icon.
Figure 35:
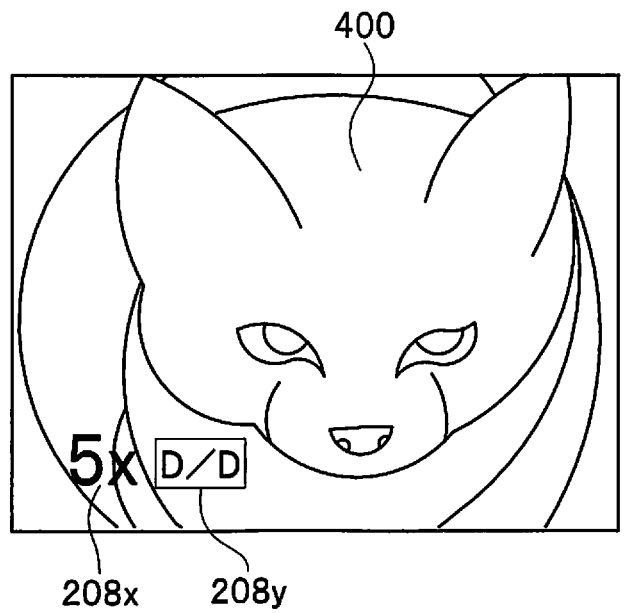
FIG. 35 shows a magnifying display example of the dot-by-dot pixel magnification icon of FIG. 34 (magnifying display of reference sign 109c in FIG. 34)

Here, display examples of the dot-by-dot pixel magnification icon and the warning display icon are represented by reference sign 208y in FIG. 34 and FIG. 35. In FIG. 34, reference signs 109a to 109f represent an aspect in which the magnifying display of the EVF 109 is switched. Likewise, reference signs 108a to 108f in FIG. 34 represent an aspect in which the display on the back monitor 108 is switched.

In this case, the operation dial 111c is used for switching of the magnifying display. The operation dial 111c is configured so as to sequentially step up the magnification ratio series (2×, 3×, 5×, 7×, 10×, 14×) (increase the magnification ratio) or step down the magnification ratio series (2×, 3×, 5×, 7×, 10×, 14×) (decrease the magnification ratio) on a click basis. In the example shown in FIG. 34, the magnification ratio is increased by a leftward rotating (counterclockwise rotating) operation, and the magnification ratio is decreased by a rightward rotating (clockwise rotating) operation.

In FIGS. 34 and 35, the magnification icon indicated by reference sign 208x and the dot-by-dot pixel magnification icon 208y indicating that the present display is a display at the dot-by-dot pixel magnification are displayed side by side within the display area.

The dot-by-dot pixel magnification icon 208y is an example configured by not only a character string such as "D/D" indicating dot by dot, but also a thin frame line surrounding this character string. As shown in FIG. 35, these icons are displayed while superimposed on the display image. In FIG. 34, an illustration of the image to be displayed within the display area is omitted in order to avoid complication of the drawing.

Figure 36:
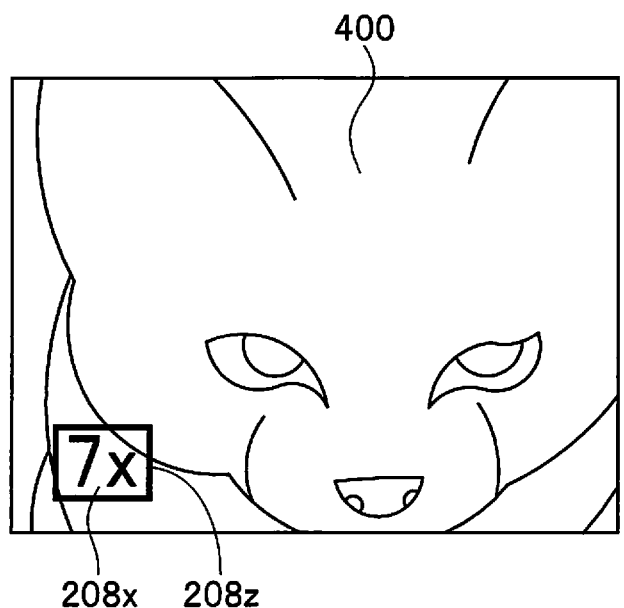
FIG. 36 shows a magnifying display example of the warning display icon of FIG. 34 (magnifying display of reference sign 109d in FIG. 34)

In the state shown in FIG. 35 (corresponding to reference signs 109c and 108d in FIG. 34), when the operation dial 111c is further rotated leftward (the magnification ratio is increased), the magnification ratio exceeds the magnification ratio for the dot-by-dot pixel magnification. In this case, the respective icons are changed as shown in FIG. 36 (reference signs 109d to 109f and reference signs 108e and 108f in FIG. 34). In this example, a thick frame line 208z surrounding the magnification icon 208x appears newly. The thick frame line 208z is a warning display indicating that the magnifying display is performed beyond the magnification ratio for the dot-by-dot pixel magnification.

Figure 37:
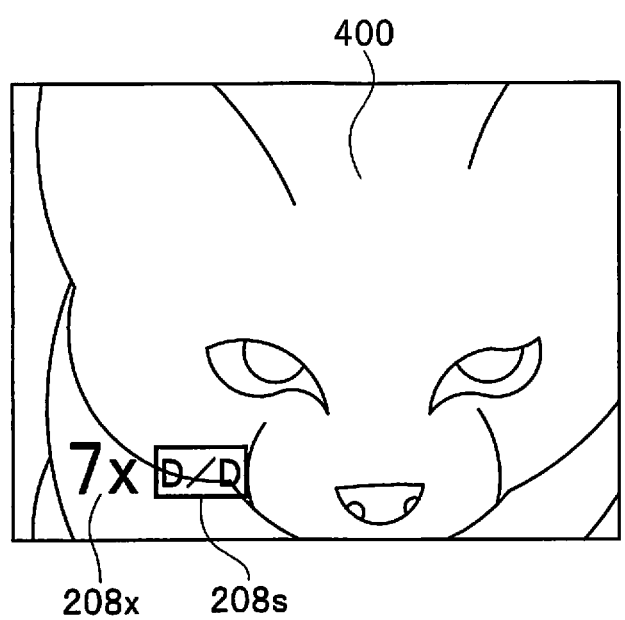
FIG. 37 shows a modification of the magnifying display example of the warning display icon.

FIG. 37 shows a modification of the warning display icon indicating that the magnifying display is performed beyond the magnification ratio for the dot-by-dot pixel magnification. In the example shown in FIG. 37, the style of the dot-by-dot pixel magnification icon displayed side by side with the normal magnification icon 208x differs. The dotby-dot pixel magnification icon of this modification has a style in which the character string "DID" is surrounded by the thick frame line 208s.

Note that in this case, the style in which the thick frame lines 208z and 208s are displayed is presented as an example of the above warning display, but instead of these thick frame lines 208z and 208s, display may be performed so that the color of the character string is changed as another display example.

Returning to FIG. 3, in step S5, the system control section 120 checks output of a first (1st.) release-on signal. Here, when the first release-on signal is confirmed, the processing proceeds to processing of next step S6. When the first release-on signal is not confirmed, the processing returns to the processing of step S1 described above.

In step S6, the system control section 120 executes first release-on processing. This first release-on processing itself is processing which is the same as processing applied in an image pickup apparatus that has been conventionally generally put into practical use. This processing is, for example, processing of performing AF processing, AE processing, etc. and setting various parameters related to the image pickup operation while fitting the parameters to an image pickup environment.

Subsequently, in step S7, the system control section 120 checks output of a second (2nd.) release-on signal. Here, when the second release-on signal is confirmed, the processing proceeds to processing of next step S7. When the second release-on signal is not confirmed, the processing returns to the processing of step S1 described above.

Figure 28:
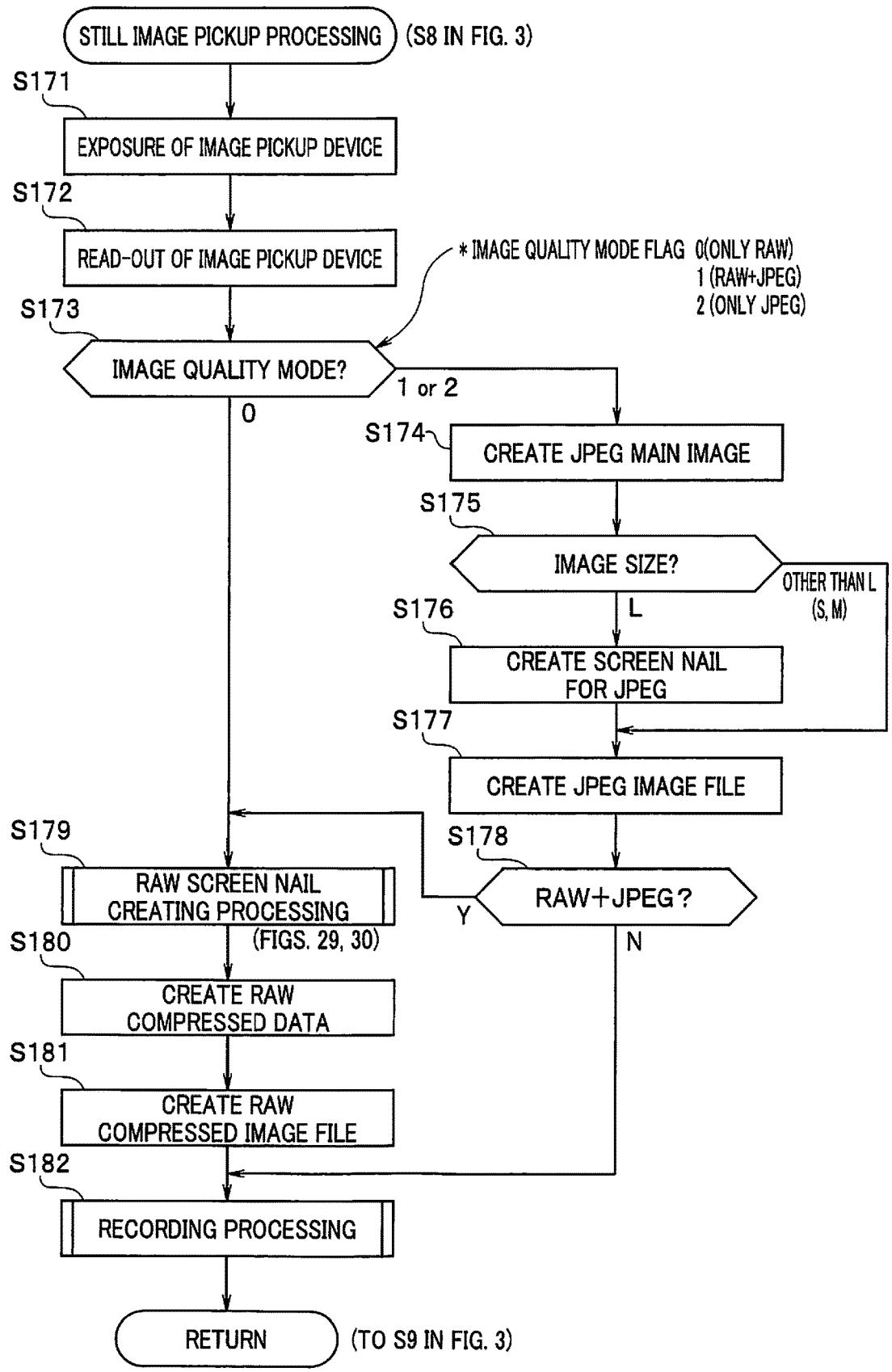
FIG. 28 is a subroutine of processing of step S8 (still image pickup processing) of FIG. 3.

In step S8, the system control section 120 executes still image pickup processing. FIG. 28 shows a subroutine of this still image pickup processing.

In step S171 of FIG. 28, the system control section 120 executes processing of exposing the light receiving surface of the image pickup device 104 on the optical path of the image pickup optical system (for example, shutter opening operation processing).

Subsequently, in step S172, the system control section 120 executes image pickup device reading processing.

Subsequently, in step S173, the system control section 120 executes the image quality mode flag check processing. In the case of the image quality mode flag=0 (only RAW image), the processing proceeds to processing of step S179. In the case of the image quality mode flag=1 (RAW+JPEG) or in the case of the image quality mode flag=2 (only JPEG), the processing proceeds to processing of step S174.

In step S174, the system control section 120 executes processing of creating a main image in a JPEG image. Here, the main image of the JPEG image is image data for obtaining a final output corresponding to an image size (L, M, S) of a specified JPEG image in the setting of recording only JPEG images under the image quality mode setting.

Subsequently, in step S175, the system control section 120 checks the setting of the image size for recording. Here, in the case of the image size=L(arge), the processing proceeds to processing of next step S176. When the image size is a size other than L (S or M), the processing proceeds to processing of step S177.

In step S176, the system control section 120 executes processing of creating a screen nail image for a JPEG image.

Subsequently, in step S177, the system control section 120 executes processing of creating a data file of the JPEG image. The JPEG image data file to be created here conforms to a normal JPEG image data format. That is, the JPEG image data file is an image data file containing JPEG main image data (image data of L, M, S size based on the setting) and various kinds of header information. Note that in this case, the image data file also contains a screen nail image which is a display image having a smaller size than the main image when the image size of the JPEG main image data is set to L size.

Subsequently, in step S178, the system control section 120 checks whether the image quality mode is "RAW+JPEG". Here, in the case of "RAW+JPEG", the processing proceeds to processing of step S179. In the case other than "RAW+JPEG" (that is, in the case of only JPEG), the processing proceeds to the processing of step S182.

Figure 29:
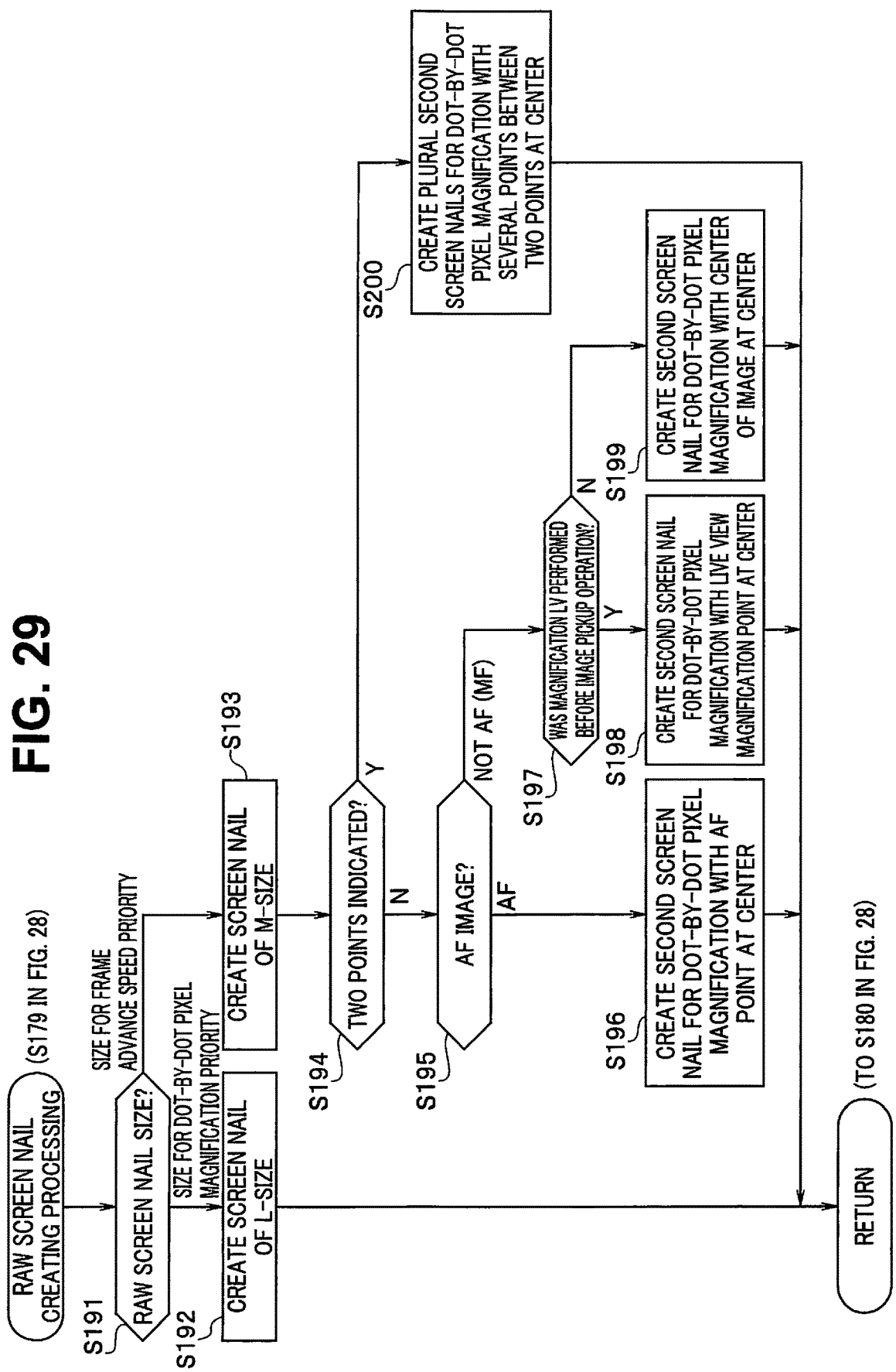
FIG. 29 is a subroutine of processing of step S179 (RAW screen nail creation processing) of FIG. 28.

In step S179, the system control section 120 executes screen nail creation processing for RAW image. A subroutine of the screen nail creation processing for RAW image is shown in FIG. 29, and will be described in detail later. Thereafter, the processing proceeds to processing of step S180.

In step S180, the system control section 120 executes processing of creating compressed data of RAW image data.

Subsequently, in step S181, the system control section 120 executes processing of creating a compressed image file of RAW image data.

Subsequently, in step S182, the system control section 120 executes a predetermined recording processing of recording acquired image data into the storage medium. Note that this recording processing is processing the same as processing to be applied to an image pickup apparatus which has been conventionally generally put into practical use. Therefore, description on the recording processing will be omitted. Thereafter, a series of processing is terminated, and proceeds to the processing of step S9 in FIG. 3.

Here, the subroutine of the screen nail creation processing for RAW image will be described below with reference to FIG. 29.

In a normal case, the image size of a screen nail image appended to RAW image data is generally made to correspond to a JPEG image of L(arge) size by giving priority to the image quality of the image to be displayed at the dot-by-dot pixel magnification. However, as the image size increases, the size of the image file increases, resulting in a problem that a recording area is pressed down. In addition, for example, a screen nail image appended to RAW image data is used to perform reproduction and display when the image pickup operation is performed based only on RAW image. However, when the image size of this screen nail image is large, a load of reproduction and display also increases. Accordingly, when priority is given to an image display speed, it is desirable that the image size of the screen nail image is small.

Therefore, in the image pickup apparatus 100 of the present embodiment, the image size of the screen nail image appended to the RAW image data is preset on a menu (not shown) according to an application desired by the user.

Specifically, for example, in a case where the user reproduces and displays an image to check the image after the user picks up the image, a JPEG image having an image size of L-size is created as screen nail image of a RAW image when priority is given to the image quality of the image to be displayed at the dot-by-dot pixel magnification.

On the other hand, when priority is given to a frame advance speed during reproduction and display, a first screen nail image having an image size of M is created as the screen nail image of the RAW image, and also a second screen nail image having a smaller size than the first screen nail image is created.

In this case, second screen nail images are set to include a plurality of image data of predetermined areas having centers at positions focused by an AF operation or predetermined areas having centers at plural points between two points indicated by a touch operation. It is assumed that each image data has an image size which covers substantially the entire area of the display area of the display device when an image is displayed at the magnification ratio for the dot-by-dot pixel magnification.

That is, the second screen nail image is an image having a small size created by cutting out a predetermined area from original image data so as to be suitable for a focus check to be made by performing magnifying display at the dot-by-dot pixel magnification.

As described above, since the second screen nail image having a small data amount is prepared and the first screen nail image is set to have an image size of M-size, the total capacity of a RAW image data file including these screen nail images does not greatly increase.

Accordingly, the total capacity of the image data file does not increase, the frame advance speed does not decrease, and a precise focus check can be performed.

In step S191 of FIG. 29, the system control section 120 checks a preset image size with respect to the image size of the screen nail image for the RAW image. Here, when it is set to give priority to the display image quality at the dot-by-dot pixel magnification, the processing proceeds to processing of step S192. On the other hand, when it is set to give priority to the frame advance speed, the processing proceeds to processing of step S193.

In step S192, the system control section 120 creates a screen nail image of L-size. Thereafter, a series of processing is terminated, and proceeds to processing of step S180 of FIG. 28.

In step S193, the system control section 120 creates a screen nail image of M-size.

Subsequently, in step S194, the system control section 120 checks whether two specified points exist as a focus adjustment point in one image.

Here, the case where two specified points exist as the focus adjustment point in one image corresponds to a case of image data or the like obtained as a result of focus stacking processing by performing a focus bracket image pickup operation, for example.

Note that the focus bracket image pickup operation is an image pickup operation in which plural images are continuously picked up while the focus adjustment position is changed within a set range. The focus stacking processing is processing of combining a plurality of image data acquired by the focus bracket image pickup operation into image data of one image. By applying this focus stacking processing, it is possible to create an image having a deep depth of field in one image (an image which is in focus from a near side to a far side) regardless of the depth of field of a lens.

When the focus bracket image pickup operation for the focus stacking processing is performed, a range to be subjected to the focus adjustment, an interval for changing the focus adjustment position, and the number of images to be picked up are preset. The setting of the focus adjustment range out of the range, the interval and the number described above is to indicate two points at one end and the other end.

The indication of the two points to be checked in the processing of step S194 described above assumes an indication of the focus adjustment range setting in this case.

When two indicated points exist as the focus adjustment point in one image in the processing of step S194 in FIG. 29, the processing proceeds to processing of step S200. When two indicated points do not exist, the processing proceeds to processing of step S195.

In step S200, the system control section 120 creates plural second screen nail images for the dot-by-dot pixel magnification which have respective centers at several points (plural focus adjustment points within the focus adjustment range) between two points. That is, with respect to each of plural images obtained by the focus bracket image pickup operation, images of predetermined areas having centers at the focus adjustment points respectively are created as plural second screen nail images. Thereafter, a series of processing is terminated, and proceeds to the processing of step S180 of FIG. 28.

In step S195, the system control section 120 checks whether a target image is an image (AF image) acquired by using an autofocus (AF) mechanism in the image pickup operation. In the case of an AF image, the processing proceeds to processing of step S196. In the case of a non-AF image (a manual focus (MF) image), the processing proceeds to processing of step S197.

In step S196, the system control section 120 creates a second screen nail image for the dot-by-dot pixel magnification having a center at the AF point. Thereafter, a series of processing is terminated, and proceeds to the processing of step S180 of FIG. 28.

In step S197, the system control section 120 checks whether the magnification live view display has been executed during the image pickup operation. In general, during an image pickup operation based on manual focus (MF; manual focus adjustment), it is usual to perform fine focus adjustment by performing magnified live view display. In this case, an image area where the magnified live view display has been performed can be defined as an image area including focus adjustment points. Therefore, in the processing of this step S197, the presence or absence of magnified live view display under MF is checked.

Here, if the magnified live view display is executed during the image pickup operation in the processing of step S197, the processing proceeds to processing of step S198. When the magnified live view display is not executed during the image pickup operation, the processing proceeds to processing of step S199.

In step S198, the system control section 120 creates a second screen nail image for the dot-by-dot pixel magnification which has a center at a live view magnification point. Thereafter, a series of processing is terminated, and proceeds to the processing of step S180 of FIG. 28.

In step S199, the system control section 120 creates an image of a predetermined area having a center at an image central portion as a second screen nail image for the dot-by-dot pixel magnification. Thereafter, a series of processing is terminated, and proceeds to the processing of step S180 of FIG. 28.

Figure 30:
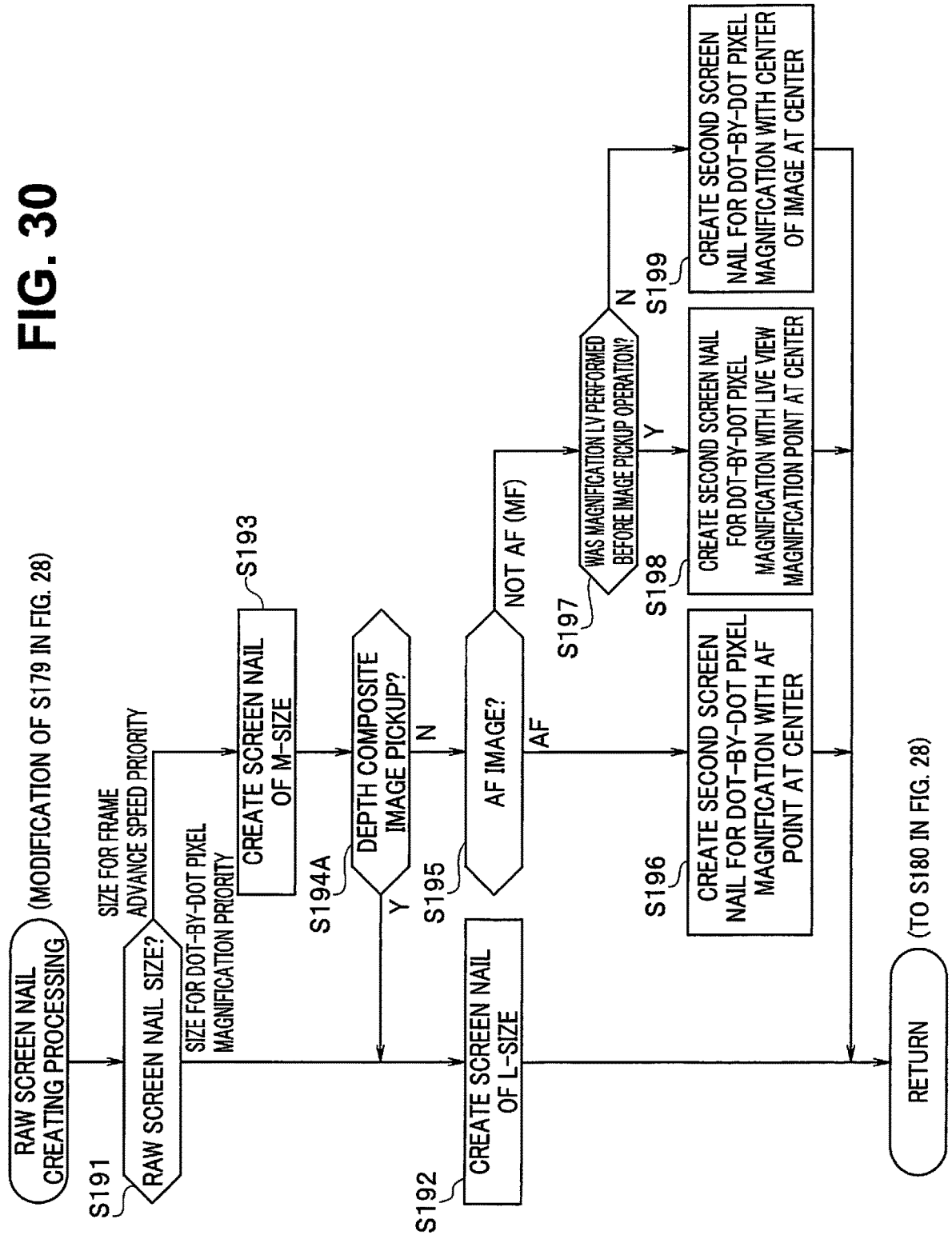
FIG. 30 is a subroutine of a modification of RAW screen nail creation processing of FIG. 29.

FIG. 30 shows a modification of the subroutine of the screen nail creation processing for the RAW image. This modification differs from the processing of FIG. 29 in that it is checked whether an image has been obtained by a focus stacking image pickup operation instead of the processing of step S194 in FIG. 29 (the check processing of two point indication), and a screen nail image of L-size is created in the case of the image obtained by the focus stacking image pickup operation. As a result, with respect to the image obtained by the focus stacking image pickup operation, focus check can be performed by using a larger image, so that it is possible to create an image for which more accurate focus adjustment is secured.

In FIG. 30, the processing of steps S191, S192, and S193 is the same as the processing in FIG. 29 described above.

After the processing of step S193, in step S194A, the system control section 120 checks whether the image is an image obtained by the focus stacking image pickup operation. When the image is an image acquired by the focus stacking image pickup operation, the processing proceeds to the processing of step S192. When the image is not an image acquired by the focus stacking image pickup operation, the processing proceeds to the processing of step S195. The subsequent processing is the same as the processing in FIG. 29.

Returning to FIG. 3, in step S9, the system control section 120 checks whether an image pickup check operation has been performed (whether an image pickup check has been set to ON). This image pickup check ON operation is, for example, an operation of shifting to the reproduction mode right after the image pickup processing. Here, when the image pickup check ON is confirmed, the processing proceeds to processing of step S10. When the image pickup check ON is not confirmed, the processing returns to the processing of step S1 described above.

In step S10, the system control section 120 executes the image pickup check processing. This image pickup check processing is processing corresponding to various operations after shifting to the reproduction mode with the depression operation of the reproducing button 111f as a trigger. Thereafter, the processing returns to the processing of step S1, and the subsequent processing is repeated.

As described above, according to the above-described embodiment, in the image pickup apparatus 100 configured so that the plural (two) display devices 108 and 109 are provided, these plural display devices can be switched and used as necessary, and an image based on image data acquired by an image pickup operation can be magnified and displayed, an image processing section 128 magnifies the image at a predetermined magnification ratio based on an image acquired by the image pickup device 104, and transmits the image to one of the plural display devices 108 and 109. At this time, which one of the plural display devices 108, 109 the image should be transmitted to is specified by switching control (display device switching processing) of the system control section 120 which is performed based on an instruction signal from the eye sensor 110 or the monitor switching button 111y. Furthermore, the system control section 120 performs control of changing a display target image to be displayed by using one of the plural display devices 108, 109 (display image changing processing=frame advance or frame return processing) upon reception of an instruction signal generated by the operation of the right and left buttons of the cross button 111h, the rotating operation of the operation dial 111i, or the touch and slide operation on the touch panel.

In this configuration, when the display image changing operation or the image device switching operation is performed during image display on one of the plural display devices 108, 109, the system control section 120 changes the magnification ratio for the dot-by-dot pixel magnification (first magnification ratio) to one magnification ratio (second magnification ratio) of the magnification ratio series in accordance with the display image changing operation or the image device switching operation, and indicate the magnification ratio.

As described above, the image pickup apparatus 100 of the present embodiment is configured so that the magnification ratio value for the dot-by-dot pixel magnification is first selected from the magnification ratio series.

Accordingly, when an image is displayed at the dot-by-dot pixel magnification on the display device, such a case can be avoided where the display of the image makes it impossible to perform a focus check which is an original main purpose of magnifying display, causing a case where the image is reduced and displayed or the image is displayed without any substantial change from normal one-frame display (display at a magnification ratio of 1×) or the like according to the relationship between the number of pixels of image data as a display target and the number of display pixels of the display device.

The user further can be prevented from misunderstanding that he/she made an erroneous operation because an intended display result was not obtained.

Furthermore, magnification ratio series values based on magnification step (for example, magnification step of about 1.4× or 2×) in which an efficient magnification effect can be obtained are set without setting a corresponding strict magnification ratio value for each frame as a display target. Accordingly, the user can quickly and efficiently change the magnifying display.

Since the magnification ratio setting is automatically performed in consideration of the affinity between the manual setting of the magnification ratio based on the magnification ratio series and the magnifying display function based on the dot-by-dot pixel magnification, the magnification ratio setting has no inconsistency with the magnification ratio value set by the user, and the user has no unnatural feeling under magnifying display.

Secondly, the image pickup apparatus 100 of the present embodiment is configured so that the minimum magnification ratio value and the maximum magnification ratio value are limited with respect to the magnification ratio value for the dot-by-dot pixel magnification.

Accordingly, the limitation of the minimum magnification ratio value makes it possible to prevent appearance of a display meaningless for focus check such as a display which is substantially equal to a reduced display or a normal one-frame display (a display of magnification ratio of 1×) despite of execution of the magnifying display operation, which makes it possible to make a focus check by performing the magnifying display operation irrespective of the image quality mode in the image pickup operation. Even when the definition of display devices is further enhanced in the future, the present invention is adaptable to these display devices in the same way.

By limiting the maximum magnification ratio value so as to make the maximum magnification ratio value suitable for a focus check, it is prevented to perform magnification to the extent that what is being magnified is not recognizable. Furthermore, big change of the magnification ratio can be suppressed by imposing limitations on the minimum magnification ratio value and the maximum magnification ratio value when the plural (for example, two) display devices having different numbers of display pixels are switched and used. Accordingly, it is possible to mitigate a user's unnatural feeling caused by display switching.

When the image pickup apparatus 100 is configured so that a minimum magnification ratio value of a magnification ratio series is set as a minimum magnification ratio value of magnification ratio values for the dot-by-dot pixel magnification, and a maximum magnification ratio value of the magnification ratio series is set as a maximum magnification ratio value of the magnification ratio values for the dot-by-dot pixel magnification, it is possible to reduce the numbers of practically effective magnification values, magnifying steps, and steps of a procedure of changing the magnification ratio value from the minimum magnification ratio value to the maximum magnification ratio value. Therefore, the changing operation can be performed quickly.

Thirdly, the image pickup apparatus 100 of the present embodiment is configured so as to prohibit selection of a magnification ratio value for the dot-by-dot pixel magnification under the magnifying display or at the time of changing the reproduction frame in the reproduction mode. The image pickup apparatus 100 of the present embodiment is also configured so as to prohibit selection of a magnification ratio value for the dot-by-dot pixel magnification when the magnification ratio is changed by a manual operation during the magnifying display at the dot-by-dot pixel magnification.

Accordingly, even when the display device is switched during display of images in the reproduction mode, the user (user) does not have an unnatural feeling. Also, at this time, when the user changes and sets the magnification ratio by the manual operation, the set magnification ratio value is prevented from being reset due to unintended switching of a display device.

Fourthly, the image pickup apparatus 100 of the present embodiment is configured so that one of the magnification ratio values for the dot-by-dot pixel magnification of the back monitor 108 and the EVF 109 or a median value of both the magnification ratio values are taken based on the numbers of display pixels of the back monitor 108 and the EVF 109, and set as a magnification ratio value for the dot-by-dot pixel magnification.

Such a configuration is capable of suppressing an unnatural feeling to be given to the user by the change of the magnification ratio value caused by the switching of the display device.

For example, it is possible to solve such a problem that the eye sensor 110 unintentionally reacts when the user displays an image on the back monitor 108 or the EVF 109 and changes the magnification ratio value by the manual operation to check the image, so that the display device is switched and thus the manually set magnification ratio value is changed or reset.

The display device to be preferentially used to perform the magnifying display at the dot-by-dot pixel magnification is switched by menu setting, so that the image pickup apparatus 100 of the present embodiment is adaptable to a user who uses only one of the back monitor 108 and the EVF 109.

Fifthly, the image pickup apparatus 100 of the present embodiment is configured so that a magnification ratio value for dot-by-dot pixel magnification is selected based on the number of pixels of a screen nail image when the image quality mode of image data as a display target is based on the RAW image, and a magnification ratio value for the dot-by-dot pixel magnification is selected based on the number of pixels of a main image of MEG images when the image quality mode is based on RAW+JPEG.

Even in the case of the RAW image, the focus check can be performed with an appropriate screen nail image. In the case of RAW+JPEG setting, it is also possible to perform the focus check at a magnification ratio value larger than the magnification ratio value of a screen nail image appended to the RAW image by setting the number of pixels of the JPEG image so as to increase the number of pixels.

Sixthly, the image pickup apparatus 100 of the present embodiment is configured so as to activate the EVF 109 by an action of the eye sensor 110 when the user looks into the EVF 109, and to switch to the image pickup mode (switch to the live view display).

Since this configuration restricts the EVF 109 to use in a state where live view display is performed, that is, use in the image pickup mode, even when switching from the back monitor 108 to the EVF 109 is unintentionally performed, the user does not suffer from an unnatural feeling.

Note that just after the live view display is performed on the EVF 109 and the image pickup operation is executed, an image acquired by the image pickup operation which has been just executed is displayed on the EVF 109 (an image pickup check screen). However, the image display at this time is not the magnifying display, but the normal one-frame display (display at the magnification ratio of 1×). Therefore, even when switching from the EVF 109 to the back monitor 108 is unintentionally performed during the display of the image pickup check screen, no unnatural feeling to a display regarding the magnification ratio occur.

As described above, according to the present embodiment, the image pickup apparatus 100 can be configured to be very easy to use.

Note that portions configured by programs can be appropriately replaced with circuits. In the foregoing description of the embodiment, the portions described as "portions" (sections or units) may be configured by dedicated circuits or combining plural general-purpose circuits, and if necessary, may be configured by combining a microcomputer, a processor such as a CPU, and a sequencer such as an FPGA, which operate in accordance with software programmed in advance. It is also possible to design the image pickup apparatus 100 such that an external device takes over some or all of the control. In this case, a wired or wireless communication circuit is interposed. Communication may be performed via Bluetooth (registered trademark), WiFi, a telephone line or the like, and may be performed via USB or the like. Dedicated circuits, general-purpose circuits and a control section may be integrated and configured as an ASIC. Portions which are mechanically controlled in position (for example, a moving portion, etc.) are configured by various actuators, and a coupling mechanism for movement as necessary, and the actuators are operated by a driver circuit. This drive circuit is also controlled by a microcomputer, an ASIC or the like according to a specific program. Such control may be subjected to detailed correction or adjustment according to information outputted by various sensors and peripheral circuits of the sensors.

Each processing sequence described in each embodiment described above can allow change of the procedure insofar as the change does not contradict the characteristic of the processing sequence. Therefore, with respect to the above-described processing sequences, for example, the execution order of the respective processing steps may be changed, plural processing steps may be executed simultaneously with one another, or the order of the respective processing steps may be changed every time a series of processing sequences is executed. That is, with respect to operation flows in the claims, the specification and the drawings, even when description on the operation flows is made by using "first," "next," etc. for the sake of convenience, the description does not mean that it is indispensable to perform the operation flows in this order. Furthermore, needless to say, a portion which does not affect essence of the invention can be appropriately omitted in each step configuring these operation flows.

Among the techniques described herein, most of the controls and functions which have been described mainly with respect to the flowcharts can be often set by software programs, and the foregoing controls and functions can be realized by reading and executing the software programs via a computer. The software programs are electronic data which are wholly or partially stored or recorded in advance as a computer program product in the above-described storage medium, a storage section or the like, specifically, for example, a portable medium such as a nonvolatile memory such as a flexible disk CD-ROM or a hard disk, a storage medium such as a volatile memory in a product manufacturing process. In addition to the above computer program product, the software programs may be distributed or provided at the time of shipment of products or via a portable medium or a communication line. Even after shipment of products, a user can down-load these software programs via a communication network, the Internet or the like, and install the software programs into a computer, or install the software programs from a storage medium into a computer to operate the software programs, whereby it is possible to easily realize the image pickup apparatus of the present embodiment.

The present invention is not limited to the above-described embodiment, and needless to say, various modifications and applications can be carried out without departing from the subject matter of the invention. Furthermore, the above embodiments include inventions at various stages, and various inventions can be extracted by appropriately combining plural disclosed components. For example, even when some components are deleted from all components shown in the above embodiment, a configuration in which these components are deleted can be extracted as an invention insofar as the problem to be solved by the invention can be solved and the effect of the present invention can be obtained. Furthermore, components over different embodiments may be appropriately combined. The present invention is not limited by specific embodiments except that the present invention is limited by the appended claims.

What is claimed is:

1. An image magnification ratio indicating device comprising,
   a processor having hardware,
      the processor being configured to:
         magnify, or not, an image at a predetermined magnification ratio and transmit the image;
         switch an image transmission destination;
         instruct change of an image as a transmission target;
         change a first magnification ratio to a second magnification ratio according to the change of the image as the transmission target or the switching of the image transmission destination and indicate the magnification ratio; and
         prohibit indicating a magnification ratio when a magnified image is under transmission.

2. The image magnification ratio indicating device according to claim 1, wherein the processor selects one magnification ratio corresponding to the first magnification ratio from a plurality of magnification ratios contained in the second magnification ratio.

3. The image magnification ratio indicating device according to claim 1, wherein the first magnification ratio is a magnification ratio for dot-by-dot pixel magnification.

4. The image magnification ratio indicating device according to claim 3, wherein a lower limit value or an upper limit value is restricted with respect to the dot-by-dot pixel magnification.

5. The image magnification ratio indicating device according to claim 1, wherein it is prohibited to indicate a magnification ratio when a magnified image is transmitted and a transmission target image is changed.

6. The image magnification ratio indicating device according to claim 1, wherein it is prohibited to indicate a magnification ratio when the first magnification ratio is indicated.

7. The image magnification ratio indicating device according to claim 1, further comprising a warning device, wherein the warning device warns that a magnification ratio is the first magnification ratio or warns that a magnification ratio is a magnification ratio larger than the first magnification ratio.

8. An image pickup apparatus comprising:
   a processor having hardware,
      the processor being configured to:
         magnify, or not, an image at a predetermined magnification ratio and transmit the image;
         switch an image transmission destination;
         instruct change of an image as a transmission target; and
         change a first magnification ratio to a second magnification ratio according to the change of the image as the transmission target or the switching of the image transmission destination and indicate the magnification ratio;
   an acquiring device configured to acquire an image;
   a plurality of display devices that are different in number of display pixels from one another and receive an image transmitted from the processor to display the image; and
   a magnification ratio changing operation member configured to indicate a second magnification ratio,
   wherein when the magnified image is under transmission and the second magnification ratio is indicated by the magnification ratio changing operation member, the processor prohibits changing the first magnification ratio to the second magnification ratio and indicating the second magnification ratio.

9. The image pickup apparatus according to claim 8, wherein the acquiring device is at least one of an image pickup device, an image recording device and an image communicating device.

10. An image magnification ratio indicating device comprising,
    a processor having hardware,
       the processor being configured to:
          magnify, or not, an image at a predetermined magnification ratio and transmit the image;
          switch an image transmission destination;
          instruct change of an image as a transmission target;
          change a first magnification ratio to a second magnification ratio according to the change of the image as the transmission target and indicate the magnification ratio; and
          prohibit indicating a magnification ratio when a magnified image is under transmission.

11. The image magnification ratio indicating device according to claim 10, further comprising a plurality of display devices that have different numbers of display pixels from one another and display a transmitted image, wherein the processor indicates a magnification ratio according to a number of display pixels of one display device out of the plurality of display devices.

12. The image magnification ratio indicating device according to claim 11, wherein the processor indicates a magnification ratio according to at least one of an average value, a median value, and a barycentric value of numbers of display pixels of the plurality of display devices.

13. An image magnification ratio indicating device comprising,
   a processor having hardware;
      the processor being configured to:
         acquire a plurality of images having different numbers of pixels from one another as a set of images;
         magnify, or not, an image at a predetermined magnification ratio and transmit the image;
         switch an image transmission destination;
         instruct change of a transmission image; and
         change a first magnification ratio to a second magnification ratio according to an image that can be displayed and has a largest number of pixels among the set of images and the change of the transmission image or the switching of the image transmission destination and indicate the magnification ratio.

14. The image magnification ratio indicating device according to claim 13, wherein at least one image of the set of images is a JPEG image, and at least one image of the set of images is a RAW image.

15. The image magnification ratio indicating device according to claim 13, further comprising an image recording device including a first recording device configured to record at least one image of the set of images and a second recording device configured to record other images of the set of images.

16. An image magnification ratio indicating device comprising:
   a processor having hardware;
      the processor being configured to:
         acquire a movie;
         acquire an image;
         magnify, or not, an image at a predetermined magnification ratio and transmit the image;
         switch a transmission destination to which at least one of the movie and the image is transmitted; and
         change a first magnification ratio to a second magnification ratio and indicate a magnification ratio to one transmission destination while stopping transmission of the image and transmitting the movie to another transmission destination, in response to the switching of the transmission destination.

17. The image magnification ratio indicating device according to claim 16, further comprising:
   a first display device and a second display device that are configured to have different numbers of pixels from each other and display a transmitted movie or image; and
   a magnification ratio changing operation member configured to indicate the second magnification ratio.

18. The image magnification ratio indicating device according to claim 17, wherein when the processor performs switching to the second display device while the first display device displays an image, the processor stops transmission of the image and transmits a movie.

* * * * *